(12) United States Patent
Robinson et al.

(10) Patent No.: US 10,488,578 B2
(45) Date of Patent: *Nov. 26, 2019

(54) LIGHT INPUT FOR DIRECTIONAL BACKLIGHT

(71) Applicant: RealD Spark, LLC, Beverly Hills, CA (US)

(72) Inventors: Michael G. Robinson, Boulder, CO (US); Graham J. Woodgate, Henley-on-Thames (GB); Jonathan Harrold, Leamington Spa (GB)

(73) Assignee: RealD Spark, LLC, Beverly Hills, CA (US)

( * ) Notice: Subject to any disclaimer, the term of this patent is extended or adjusted under 35 U.S.C. 154(b) by 181 days.

This patent is subject to a terminal disclaimer.

(21) Appl. No.: 15/658,733

(22) Filed: Jul. 25, 2017

(65) Prior Publication Data

US 2017/0322363 A1    Nov. 9, 2017

Related U.S. Application Data

(63) Continuation of application No. 14/513,120, filed on Oct. 13, 2014, now Pat. No. 9,739,928.

(Continued)

(51) Int. Cl.
*G02B 27/22* (2018.01)
*F21V 8/00* (2006.01)

(52) U.S. Cl.
CPC ......... *G02B 6/0068* (2013.01); *G02B 6/0048* (2013.01); *G02B 6/0066* (2013.01); *G02B 27/22* (2013.01); *G02B 6/0073* (2013.01)

(58) Field of Classification Search
CPC ..... G02B 6/0068; G02B 27/22; G02B 6/0048
See application file for complete search history.

(56) References Cited

U.S. PATENT DOCUMENTS

| | | |
|---|---|---|
| 1,128,979 A | 2/1915 | Hess |
| 1,970,311 A | 8/1934 | Ives |

(Continued)

FOREIGN PATENT DOCUMENTS

| | | |
|---|---|---|
| CN | 1142869 A | 2/1997 |
| CN | 1377453 A | 10/2002 |

(Continued)

OTHER PUBLICATIONS

PCT/US2013/049969 International search report and written opinion of international searching authority dated Oct. 23, 2013.

(Continued)

*Primary Examiner* — Karabi Guharay
(74) *Attorney, Agent, or Firm* — Penny L. Lowry; Nei G.J. Mothew

(57) ABSTRACT

A directional backlight may include a light guiding apparatus including at least one transparent optical waveguide for providing large area collimated illumination from localized light sources. The waveguide is arranged in a first part and a second part with a light injection aperture between the respective parts. Such controlled illumination may provide for efficient, multi-user autostereoscopic displays as well as improved 2D display functionality including high brightness displays and high display efficiency.

25 Claims, 38 Drawing Sheets

Related U.S. Application Data

(60) Provisional application No. 61/890,437, filed on Oct. 14, 2013.

(56) References Cited

U.S. PATENT DOCUMENTS

| | | | |
|---|---|---|---|
| 2,133,121 A | 10/1938 | Stearns |
| 2,247,969 A | 7/1941 | Lemuel |
| 2,480,178 A | 8/1949 | Zinberg |
| 2,810,905 A | 10/1957 | Barlow |
| 3,409,351 A | 11/1968 | Winnek |
| 3,715,154 A | 2/1973 | Bestenreiner |
| 4,057,323 A | 11/1977 | Ward |
| 4,528,617 A | 7/1985 | Blackington |
| 4,542,958 A | 9/1985 | Young |
| 4,804,253 A | 2/1989 | Stewart |
| 4,807,978 A | 2/1989 | Grinberg et al. |
| 4,829,365 A | 5/1989 | Eichenlaub |
| 4,914,553 A | 4/1990 | Hamada et al. |
| 5,278,608 A | 1/1994 | Taylor et al. |
| 5,347,644 A | 9/1994 | Sedlmayr |
| 5,349,419 A | 9/1994 | Taguchi et al. |
| 5,459,592 A | 10/1995 | Shibatani et al. |
| 5,466,926 A | 11/1995 | Sasano et al. |
| 5,510,831 A | 4/1996 | Mayhew |
| 5,528,720 A | 6/1996 | Winston et al. |
| 5,581,402 A | 12/1996 | Taylor |
| 5,588,526 A | 12/1996 | Fantone et al. |
| 5,697,006 A | 12/1997 | Taguchi et al. |
| 5,703,667 A | 12/1997 | Ochiai |
| 5,727,107 A | 3/1998 | Umemoto et al. |
| 5,771,066 A | 6/1998 | Barnea |
| 5,796,451 A | 8/1998 | Kim |
| 5,808,792 A | 9/1998 | Woodgate et al. |
| 5,850,580 A | 12/1998 | Taguchi et al. |
| 5,875,055 A | 2/1999 | Morishima et al. |
| 5,896,225 A | 4/1999 | Chikazawa |
| 5,903,388 A | 5/1999 | Sedlmayr |
| 5,933,276 A | 8/1999 | Magee |
| 5,956,001 A | 9/1999 | Sumida et al. |
| 5,959,664 A | 9/1999 | Woodgate |
| 5,959,702 A | 9/1999 | Goodman |
| 5,969,850 A | 10/1999 | Harrold et al. |
| 5,971,559 A | 10/1999 | Ishikawa et al. |
| 6,008,484 A | 12/1999 | Woodgate et al. |
| 6,014,164 A | 1/2000 | Woodgate et al. |
| 6,023,315 A | 2/2000 | Harrold et al. |
| 6,044,196 A | 3/2000 | Winston et al. |
| 6,055,013 A | 4/2000 | Woodgate et al. |
| 6,061,179 A | 5/2000 | Inoguchi et al. |
| 6,061,489 A | 5/2000 | Ezra et al. |
| 6,064,424 A | 5/2000 | Berkel et al. |
| 6,075,557 A | 6/2000 | Holliman et al. |
| 6,094,216 A | 7/2000 | Taniguchi et al. |
| 6,108,059 A | 8/2000 | Yang |
| 6,118,584 A | 9/2000 | Berkel et al. |
| 6,128,054 A | 10/2000 | Schwarzenberger |
| 6,144,118 A | 11/2000 | Cahill et al. |
| 6,172,723 B1 | 1/2001 | Inoue et al. |
| 6,199,995 B1 | 3/2001 | Umemoto et al. |
| 6,219,113 B1 | 4/2001 | Takahara |
| 6,224,214 B1 | 5/2001 | Martin et al. |
| 6,232,592 B1 | 5/2001 | Sugiyama |
| 6,256,447 B1 | 7/2001 | Laine |
| 6,262,786 B1 | 7/2001 | Perlo et al. |
| 6,295,109 B1 | 9/2001 | Kubo et al. |
| 6,302,541 B1 | 10/2001 | Grossmann |
| 6,305,813 B1 | 10/2001 | Lekson et al. |
| 6,335,999 B1 | 1/2002 | Winston et al. |
| 6,373,637 B1 | 4/2002 | Gulick et al. |
| 6,377,295 B1 | 4/2002 | Woodgate et al. |
| 6,422,713 B1 | 7/2002 | Fohl et al. |
| 6,456,340 B1 | 9/2002 | Margulis |
| 6,464,365 B1 | 10/2002 | Gunn et al. |
| 6,476,850 B1 | 11/2002 | Erbey |
| 6,481,849 B2 | 11/2002 | Martin et al. |
| 6,654,156 B1 | 11/2003 | Crossland et al. |
| 6,663,254 B2 | 12/2003 | Ohsumi |
| 6,724,452 B1 | 4/2004 | Takeda et al. |
| 6,731,355 B2 | 5/2004 | Miyashita |
| 6,736,512 B2 | 5/2004 | Balogh |
| 6,801,243 B1 | 10/2004 | Berkel |
| 6,816,158 B1 | 11/2004 | Lemelson et al. |
| 6,825,985 B2 | 11/2004 | Brown et al. |
| 6,847,354 B2 | 1/2005 | Vranish |
| 6,847,488 B2 | 1/2005 | Travis |
| 6,859,240 B1 | 2/2005 | Brown et al. |
| 6,867,828 B2 | 3/2005 | Taira et al. |
| 6,870,671 B2 | 3/2005 | Travis |
| 6,883,919 B2 | 4/2005 | Travis |
| 7,052,168 B2 | 5/2006 | Epstein et al. |
| 7,058,252 B2 | 6/2006 | Woodgate et al. |
| 7,073,933 B2 | 7/2006 | Gotoh et al. |
| 7,091,931 B2 | 8/2006 | Yoon |
| 7,101,048 B2 | 9/2006 | Travis |
| 7,136,031 B2 | 11/2006 | Lee et al. |
| 7,215,391 B2 | 5/2007 | Kuan et al. |
| 7,215,415 B2 | 5/2007 | Maehara et al. |
| 7,215,475 B2 | 5/2007 | Woodgate et al. |
| 7,227,567 B1 | 6/2007 | Beck et al. |
| 7,239,293 B2 | 7/2007 | Perlin et al. |
| 7,365,908 B2 | 4/2008 | Dolgoff |
| 7,375,886 B2 | 5/2008 | Lipton et al. |
| 7,410,286 B2 | 8/2008 | Travis |
| 7,430,358 B2 | 9/2008 | Qi et al. |
| 7,492,346 B2 | 2/2009 | Manabe et al. |
| 7,528,893 B2 | 5/2009 | Schultz et al. |
| 7,545,429 B2 | 6/2009 | Travis |
| 7,587,117 B2 | 9/2009 | Winston et al. |
| 7,614,777 B2 | 11/2009 | Koganezawa et al. |
| 7,660,047 B1 | 2/2010 | Travis et al. |
| 7,750,981 B2 | 7/2010 | Shestak et al. |
| 7,750,982 B2 | 7/2010 | Nelson et al. |
| 7,771,102 B2 | 8/2010 | Iwasaki |
| 7,798,699 B2 | 9/2010 | Laitinen et al. |
| 7,944,428 B2 | 5/2011 | Travis |
| 7,970,246 B2 | 6/2011 | Travis et al. |
| 7,976,208 B2 | 7/2011 | Travis |
| 8,016,475 B2 | 9/2011 | Travis |
| 8,179,361 B2 | 5/2012 | Sugimoto et al. |
| 8,216,405 B2 | 7/2012 | Emerton et al. |
| 8,223,296 B2 | 7/2012 | Lee et al. |
| 8,251,562 B2 | 8/2012 | Kuramitsu et al. |
| 8,325,295 B2 | 12/2012 | Sugita et al. |
| 8,354,806 B2 | 1/2013 | Travis et al. |
| 8,477,261 B2 | 7/2013 | Travis et al. |
| 8,502,253 B2 | 8/2013 | Min |
| 8,534,901 B2 | 9/2013 | Panagotacos et al. |
| 8,556,491 B2 | 10/2013 | Lee |
| 8,651,725 B2 | 2/2014 | Ie et al. |
| 8,684,588 B2 | 4/2014 | Ajichi et al. |
| 8,714,804 B2 | 5/2014 | Kim et al. |
| 8,752,995 B2 | 6/2014 | Park |
| 8,760,762 B1 | 6/2014 | Kelly et al. |
| 8,926,112 B2 | 1/2015 | Uchiike et al. |
| 8,942,434 B1 | 1/2015 | Karakotsios et al. |
| 9,188,731 B2 | 11/2015 | Woodgate et al. |
| 9,197,884 B2 | 11/2015 | Lee et al. |
| 9,350,980 B2 | 5/2016 | Robinson et al. |
| 9,519,153 B2 | 12/2016 | Robinson et al. |
| 9,739,928 B2 * | 8/2017 | Robinson ............ G02B 6/0068 |
| 2001/0001566 A1 | 5/2001 | Moseley et al. |
| 2001/0050686 A1 | 12/2001 | Allen |
| 2002/0018299 A1 | 2/2002 | Daniell |
| 2002/0113246 A1 | 8/2002 | Nagai et al. |
| 2002/0113866 A1 | 8/2002 | Taniguchi et al. |
| 2003/0046839 A1 | 3/2003 | Oda et al. |
| 2003/0117790 A1 | 6/2003 | Lee et al. |
| 2003/0133191 A1 | 7/2003 | Morita et al. |
| 2003/0137738 A1 | 7/2003 | Ozawa et al. |
| 2003/0137821 A1 | 7/2003 | Gotoh et al. |
| 2004/0008877 A1 | 1/2004 | Leppard et al. |
| 2004/0015729 A1 | 1/2004 | Elms et al. |
| 2004/0021809 A1 | 2/2004 | Sumiyoshi et al. |
| 2004/0042233 A1 | 3/2004 | Suzuki et al. |

(56) References Cited

U.S. PATENT DOCUMENTS

| | | |
|---|---|---|
| 2004/0046709 A1 | 3/2004 | Yoshino |
| 2004/0105264 A1 | 6/2004 | Spero |
| 2004/0108971 A1 | 6/2004 | Waldern et al. |
| 2004/0109303 A1 | 6/2004 | Olczak |
| 2004/0135741 A1 | 7/2004 | Tomisawa et al. |
| 2004/0170011 A1 | 9/2004 | Kim et al. |
| 2004/0263968 A1 | 12/2004 | Kobayashi et al. |
| 2004/0263969 A1 | 12/2004 | Lipton et al. |
| 2005/0007753 A1 | 1/2005 | Hees et al. |
| 2005/0094295 A1 | 5/2005 | Yamashita et al. |
| 2005/0110980 A1 | 5/2005 | Maehara et al. |
| 2005/0135116 A1 | 6/2005 | Epstein et al. |
| 2005/0174768 A1 | 8/2005 | Conner |
| 2005/0180167 A1 | 8/2005 | Hoelen et al. |
| 2005/0190180 A1 | 9/2005 | Jin et al. |
| 2005/0190345 A1 | 9/2005 | Dubin et al. |
| 2005/0237488 A1 | 10/2005 | Yamasaki et al. |
| 2005/0254127 A1 | 11/2005 | Evans et al. |
| 2005/0264717 A1 | 12/2005 | Chien et al. |
| 2005/0274956 A1 | 12/2005 | Bhat |
| 2005/0276071 A1 | 12/2005 | Sasagawa et al. |
| 2005/0280637 A1 | 12/2005 | Ikeda et al. |
| 2006/0012845 A1 | 1/2006 | Edwards |
| 2006/0056166 A1 | 3/2006 | Yeo et al. |
| 2006/0114664 A1 | 6/2006 | Sakata et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0176912 A1 | 8/2006 | Anikitchev |
| 2006/0203200 A1 | 9/2006 | Koide |
| 2006/0215129 A1 | 9/2006 | Alasaarela et al. |
| 2006/0221642 A1 | 10/2006 | Daiku |
| 2006/0227427 A1 | 10/2006 | Dolgoff |
| 2006/0244918 A1 | 11/2006 | Cossairt et al. |
| 2006/0250580 A1 | 11/2006 | Silverstein et al. |
| 2006/0262376 A1 | 11/2006 | Mather et al. |
| 2006/0269213 A1 | 11/2006 | Hwang et al. |
| 2006/0284974 A1 | 12/2006 | Lipton et al. |
| 2006/0291053 A1 | 12/2006 | Robinson et al. |
| 2006/0291243 A1 | 12/2006 | Niioka et al. |
| 2007/0008406 A1 | 1/2007 | Shestak et al. |
| 2007/0013624 A1 | 1/2007 | Bourhill |
| 2007/0025680 A1 | 2/2007 | Winston et al. |
| 2007/0035706 A1 | 2/2007 | Margulis |
| 2007/0035829 A1 | 2/2007 | Woodgate et al. |
| 2007/0035964 A1 | 2/2007 | Olczak |
| 2007/0081110 A1 | 4/2007 | Lee |
| 2007/0085105 A1 | 4/2007 | Beeson et al. |
| 2007/0109400 A1 | 5/2007 | Woodgate et al. |
| 2007/0109401 A1 | 5/2007 | Lipton et al. |
| 2007/0115551 A1 | 5/2007 | Spilman et al. |
| 2007/0115552 A1 | 5/2007 | Robinson et al. |
| 2007/0153160 A1 | 7/2007 | Lee et al. |
| 2007/0183466 A1 | 8/2007 | Son et al. |
| 2007/0188667 A1 | 8/2007 | Schwerdtner |
| 2007/0189701 A1 | 8/2007 | Chakmakjian et al. |
| 2007/0223252 A1 | 9/2007 | Lee et al. |
| 2007/0279554 A1 | 12/2007 | Kowarz et al. |
| 2007/0279727 A1 | 12/2007 | Gandhi et al. |
| 2008/0079662 A1 | 4/2008 | Saishu et al. |
| 2008/0084519 A1 | 4/2008 | Brigham et al. |
| 2008/0086289 A1 | 4/2008 | Brott |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316768 A1 | 12/2008 | Travis |
| 2009/0014700 A1 | 1/2009 | Metcalf et al. |
| 2009/0016057 A1 | 1/2009 | Rinko |
| 2009/0040426 A1 | 2/2009 | Mather et al. |
| 2009/0109705 A1 | 4/2009 | Pakhchyan et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0167651 A1 | 7/2009 | Benitez et al. |
| 2009/0168459 A1 | 7/2009 | Holman et al. |
| 2009/0174700 A1 | 7/2009 | Daiku |
| 2009/0174840 A1 | 7/2009 | Lee et al. |
| 2009/0190072 A1 | 7/2009 | Nagata et al. |
| 2009/0190079 A1 | 7/2009 | Saitoh |
| 2009/0207629 A1 | 8/2009 | Fujiyama et al. |
| 2009/0225380 A1 | 9/2009 | Schwerdtner et al. |
| 2009/0278936 A1 | 11/2009 | Pastoor et al. |
| 2009/0290203 A1 | 11/2009 | Schwerdtner |
| 2009/0315915 A1 | 12/2009 | Dunn et al. |
| 2010/0034987 A1 | 2/2010 | Fujii et al. |
| 2010/0040280 A1 | 2/2010 | McKnight |
| 2010/0053771 A1 | 3/2010 | Travis et al. |
| 2010/0053938 A1 | 3/2010 | Kim et al. |
| 2010/0091093 A1 | 4/2010 | Robinson |
| 2010/0091254 A1 | 4/2010 | Travis et al. |
| 2010/0165598 A1 | 7/2010 | Chen et al. |
| 2010/0177387 A1 | 7/2010 | Travis et al. |
| 2010/0182542 A1 | 7/2010 | Nakamoto et al. |
| 2010/0188438 A1 | 7/2010 | Kang |
| 2010/0188602 A1 | 7/2010 | Feng |
| 2010/0214135 A1 | 8/2010 | Bathiche et al. |
| 2010/0220260 A1 | 9/2010 | Sugita et al. |
| 2010/0231498 A1 | 9/2010 | Large et al. |
| 2010/0271838 A1 | 10/2010 | Yamaguchi |
| 2010/0277575 A1 | 11/2010 | Ismael et al. |
| 2010/0278480 A1 | 11/2010 | Vasylyev |
| 2010/0289870 A1 | 11/2010 | Leister |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0302135 A1 | 12/2010 | Larson et al. |
| 2010/0309296 A1 | 12/2010 | Harrold et al. |
| 2010/0321953 A1 | 12/2010 | Coleman et al. |
| 2010/0328438 A1 | 12/2010 | Ohyama et al. |
| 2011/0013417 A1 | 1/2011 | Saccomanno et al. |
| 2011/0019112 A1 | 1/2011 | Dolgoff |
| 2011/0032483 A1 | 2/2011 | Hruska et al. |
| 2011/0032724 A1 | 2/2011 | Kinoshita |
| 2011/0043142 A1 | 2/2011 | Travis et al. |
| 2011/0043501 A1 | 2/2011 | Daniel |
| 2011/0044056 A1 | 2/2011 | Travis et al. |
| 2011/0044579 A1 | 2/2011 | Travis et al. |
| 2011/0051237 A1 | 3/2011 | Hasegawa et al. |
| 2011/0187293 A1 | 8/2011 | Travis |
| 2011/0187635 A1 | 8/2011 | Lee et al. |
| 2011/0188120 A1 | 8/2011 | Tabirian et al. |
| 2011/0199459 A1 | 8/2011 | Barenbrug et al. |
| 2011/0211142 A1 | 9/2011 | Kashiwagi et al. |
| 2011/0216266 A1 | 9/2011 | Travis |
| 2011/0221998 A1 | 9/2011 | Adachi et al. |
| 2011/0228183 A1 | 9/2011 | Hamagishi |
| 2011/0228562 A1 | 9/2011 | Travis et al. |
| 2011/0235359 A1 | 9/2011 | Liu et al. |
| 2011/0242150 A1 | 10/2011 | Song et al. |
| 2011/0242277 A1 | 10/2011 | Do et al. |
| 2011/0255303 A1 | 10/2011 | Nichol et al. |
| 2011/0267563 A1 | 11/2011 | Shimizu |
| 2011/0285927 A1 | 11/2011 | Schultz et al. |
| 2011/0292321 A1 | 12/2011 | Travis et al. |
| 2011/0310232 A1 | 12/2011 | Wilson et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0056971 A1 | 3/2012 | Kumar et al. |
| 2012/0062991 A1 | 3/2012 | Mich et al. |
| 2012/0063166 A1 | 3/2012 | Panagotacos et al. |
| 2012/0075285 A1 | 3/2012 | Oyagi et al. |
| 2012/0081920 A1 | 4/2012 | Ie et al. |
| 2012/0086776 A1 | 4/2012 | Lo |
| 2012/0092435 A1 | 4/2012 | Wohlert |
| 2012/0106193 A1 | 5/2012 | Kim et al. |
| 2012/0127573 A1 | 5/2012 | Robinson et al. |
| 2012/0162966 A1 | 6/2012 | Kim et al. |
| 2012/0169838 A1 | 7/2012 | Sekine |

(56) References Cited

U.S. PATENT DOCUMENTS

| | | |
|---|---|---|
| 2012/0206050 A1 | 8/2012 | Spero |
| 2012/0236484 A1 | 9/2012 | Miyake |
| 2012/0243204 A1 | 9/2012 | Robinson |
| 2012/0243261 A1 | 9/2012 | Yamamoto et al. |
| 2012/0293721 A1 | 11/2012 | Ueyama |
| 2012/0299913 A1 | 11/2012 | Robinson et al. |
| 2012/0327172 A1 | 12/2012 | El-Saban et al. |
| 2013/0101253 A1 | 4/2013 | Popovich et al. |
| 2013/0127861 A1 | 5/2013 | Gollier |
| 2013/0135588 A1 | 5/2013 | Popovich et al. |
| 2013/0156265 A1 | 6/2013 | Hennessy |
| 2013/0169701 A1 | 7/2013 | Whitehead et al. |
| 2013/0230136 A1 | 9/2013 | Sakaguchi et al. |
| 2013/0235561 A1 | 9/2013 | Etienne et al. |
| 2013/0294684 A1 | 11/2013 | Lipton et al. |
| 2013/0307831 A1 | 11/2013 | Robinson et al. |
| 2013/0307946 A1 | 11/2013 | Robinson et al. |
| 2013/0308339 A1 | 11/2013 | Woodgate et al. |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0009508 A1 | 1/2014 | Woodgate et al. |
| 2014/0016354 A1 | 1/2014 | Lee et al. |
| 2014/0022619 A1 | 1/2014 | Woodgate et al. |
| 2014/0036361 A1 | 2/2014 | Woodgate et al. |
| 2014/0041205 A1 | 2/2014 | Robinson et al. |
| 2014/0043323 A1 | 2/2014 | Sumi |
| 2014/0098558 A1 | 4/2014 | Vasylyev |
| 2014/0126238 A1 | 5/2014 | Kao et al. |
| 2014/0240344 A1 | 8/2014 | Tomono et al. |
| 2014/0240828 A1 | 8/2014 | Robinson et al. |
| 2014/0289835 A1 | 9/2014 | Varshaysky et al. |
| 2014/0340728 A1 | 11/2014 | Taheri |
| 2014/0368602 A1 | 12/2014 | Woodgate et al. |
| 2015/0116212 A1 | 4/2015 | Freed et al. |
| 2015/0268479 A1 | 9/2015 | Woodgate et al. |
| 2015/0334365 A1 | 11/2015 | Tsubaki et al. |
| 2015/0339512 A1 | 11/2015 | Son et al. |

FOREIGN PATENT DOCUMENTS

| | | |
|---|---|---|
| CN | 1454329 A | 11/2003 |
| CN | 1466005 A | 1/2004 |
| CN | 1487332 A | 4/2004 |
| CN | 1678943 A | 10/2005 |
| CN | 1696788 A | 11/2005 |
| CN | 1823292 A | 8/2006 |
| CN | 1826553 A | 8/2006 |
| CN | 1866112 A | 11/2006 |
| CN | 1910399 A | 2/2007 |
| CN | 2872404 | 2/2007 |
| CN | 1307481 | 3/2007 |
| CN | 101029975 A | 9/2007 |
| CN | 101049028 A | 10/2007 |
| CN | 200983052 | 11/2007 |
| CN | 101114080 A | 1/2008 |
| CN | 101142823 A | 3/2008 |
| CN | 101266338 A | 9/2008 |
| CN | 100449353 | 1/2009 |
| CN | 101364004 A | 2/2009 |
| CN | 101598863 B | 12/2009 |
| CN | 100591141 | 2/2010 |
| CN | 101660689 A | 3/2010 |
| CN | 102147079 A | 8/2011 |
| CN | 202486493 U | 10/2012 |
| EP | 0653891 A1 | 5/1995 |
| EP | 0721131 A2 | 7/1996 |
| EP | 0830984 A2 | 3/1998 |
| EP | 0833183 A1 | 8/1998 |
| EP | 0860729 A2 | 8/1998 |
| EP | 0939273 A1 | 9/1999 |
| EP | 0656555 B1 | 3/2003 |
| EP | 1394593 A1 | 3/2004 |
| EP | 1736702 A1 | 12/2006 |
| EP | 2003394 A2 | 12/2008 |
| EP | 2219067 A1 | 8/2010 |
| EP | 2451180 A2 | 5/2012 |
| EP | 1634119 B1 | 8/2012 |
| GB | 2405542 | 2/2005 |
| JP | H07270792 | 10/1995 |
| JP | H08211334 | 8/1996 |
| JP | H08237691 A | 9/1996 |
| JP | H08254617 | 10/1996 |
| JP | H08070475 | 12/1996 |
| JP | H08340556 | 12/1996 |
| JP | H1042315 A | 2/1998 |
| JP | H0142556 A | 5/1998 |
| JP | H11242908 A | 9/1999 |
| JP | 2000048618 A | 2/2000 |
| JP | 2000069504 A | 3/2000 |
| JP | 2000131683 A | 5/2000 |
| JP | 2000200049 A | 7/2000 |
| JP | 2001093321 A | 4/2001 |
| JP | 2001281456 | 10/2001 |
| JP | 2002049004 A | 2/2002 |
| JP | 2003215349 A | 7/2003 |
| JP | 2003215705 A | 7/2003 |
| JP | 2004112814 A | 4/2004 |
| JP | 2004265813 A | 9/2004 |
| JP | 2004319364 A | 11/2004 |
| JP | 2005116266 | 4/2005 |
| JP | 2005135844 A | 5/2005 |
| JP | 2005181914 A | 7/2005 |
| JP | 2005183030 A | 7/2005 |
| JP | 2005203182 A | 7/2005 |
| JP | 2005259361 A | 9/2005 |
| JP | 2006004877 A | 1/2006 |
| JP | 2006010935 A | 1/2006 |
| JP | 2006031941 A | 2/2006 |
| JP | 2006310269 A | 11/2006 |
| JP | 2007094035 A | 4/2007 |
| JP | 3968742 B2 | 8/2007 |
| JP | 2007273288 A | 10/2007 |
| JP | 2007286652 | 11/2007 |
| JP | 2008204874 A | 9/2008 |
| JP | 2010160527 A | 7/2010 |
| JP | 2011192468 A | 9/2011 |
| JP | 2011216281 A | 10/2011 |
| JP | 2012060607 A | 3/2012 |
| JP | 2013015619 | 1/2013 |
| JP | 2013502693 | 1/2013 |
| JP | 2013540083 | 10/2013 |
| KR | 20030064258 | 7/2003 |
| KR | 20090932304 | 12/2009 |
| KR | 20110006773 A | 1/2011 |
| KR | 20110017918 A | 2/2011 |
| KR | 20110067534 A | 6/2011 |
| KR | 20120048301 A | 5/2012 |
| KR | 20120049890 A | 5/2012 |
| KR | 20130002646 A | 1/2013 |
| KR | 20140139730 | 12/2014 |
| TW | 200528780 A | 9/2005 |
| WO | 1994006249 A1 | 3/1994 |
| WO | 1995020811 A1 | 8/1995 |
| WO | 1995027915 A1 | 10/1995 |
| WO | 1998021620 A1 | 5/1998 |
| WO | 1999011074 A1 | 3/1999 |
| WO | 2001027528 A1 | 4/2001 |
| WO | 2001061241 A1 | 8/2001 |
| WO | 2001079923 A1 | 10/2001 |
| WO | 2008038539 A1 | 4/2008 |
| WO | 2008045681 A1 | 4/2008 |
| WO | 2009098809 A1 | 8/2009 |
| WO | 2010021926 A2 | 2/2010 |
| WO | 2011020962 A1 | 2/2011 |
| WO | 2011022342 A2 | 2/2011 |
| WO | 2011068907 A1 | 6/2011 |
| WO | 2011149739 A2 | 12/2011 |
| WO | 2012158574 A1 | 11/2012 |
| WO | 2014130860 A1 | 8/2014 |

(56) References Cited

FOREIGN PATENT DOCUMENTS

OTHER PUBLICATIONS

PCT/US2013/063125 International search report and written opinion of international searching authority dated Jan. 20, 2014.
PCT/US2013/063133 International search report and written opinion of international searching authority dated Jan. 20, 2014.
PCT/US2013/077288 International search report and written opinion of international searching authority dated Apr. 18, 2014.
PCT/US2014/017779 International search report and written opinion of international searching authority dated May 28, 2014.
PCT/US2014/042721 International search report and written opinion of international searching authority dated Oct. 10, 2014.
PCT/US2014/057860 International Preliminary Report on Patentability dated Apr. 5, 2016.
PCT/US2014/057860 International search report and written opinion of international searching authority dated Jan. 5, 2015.
PCT/US2014/060312 International search report and written opinion of international searching authority dated Jan. 19, 2015.
PCT/US2014/060368 International search report and written opinion of international searching authority dated Jan. 14, 2015.
PCT/US2014/065020 International search report and written opinion of international searching authority dated May 21, 2015.
PCT/US2015/000327 International search report and written opinion of international searching authority dated Apr. 25, 2016.
PCT/US2015/021583 International search report and written opinion of international searching authority dated Sep. 10, 2015.
PCT/US2015/038024 International search report and written opinion of international searching authority dated Dec. 30, 2015.
PCT/US2015/054523 International search report and written opinion of international searching authority dated Mar. 18, 2016.
PCT/US2016/027297 International search report and written opinion of international searching authority dated Jul. 26, 2017.
PCT/US2016/027350 International search report and written opinion of the international searching authority dated Jul. 25, 2016.
PCT/US2016/034418 International search report and written opinion of the international searching authority dated Sep. 7, 2016.
PCT/US2016/056410 International search report and written opinion of the international searching authority dated Jan. 25, 2017.
PCT/US2016/058695 International search report and written opinion of international searching authority dated Feb. 28, 2017.
PCT/US2016/061428 International search report and written opinion of international searching authority dated Jan. 20, 2017.
Robinson et al., U.S. Appl. No. 14/751,878 entitled "Directional privacy display" filed Jun. 26, 2015.
Robinson et al., U.S. Appl. No. 15/097,750 entitled "Wide angle imaging directional backlights" filed Apr. 13, 2016.
Robinson et al., U.S. Appl. No. 15/098,084 entitled "Wide angle imaging directional backlights" filed Apr. 13, 2016.
Robinson et al., U.S. Appl. No. 15/165,960 entitled "Wide Angle Imaging Directional Backlights" filed Apr. 13, 2016.
Robinson et al., U.S. Appl. No. 15/290,543 entitled "Wide angle imaging directional backlights" filed Oct. 11, 2016.
Robinson, U.S. Appl. No. 13/300,293 entitled "Directional flat illuminators" filed Nov. 18, 2011.
RU-2013122560 First office action dated Jan. 22, 2014.
RU-2013122560 Second office action dated Apr. 10, 2015.
RU-201401264 Office action dated Jan. 18, 2017.
Tabiryan et al., "The Promise of Diffractive Waveplates," Optics and Photonics News, vol. 21, Issue 3, pp. 40-45 (Mar. 2010).
Travis, et al. "Backlight for view-sequential autostereo 3D", Microsoft E&DD Applied Sciences, (date unknown), 25 pages.
Travis, et al. "Collimated light from a waveguide for a display," Optics Express, vol. 17, No. 22, pp. 19714-19719 (2009).
Viola and Jones, "Rapid Object Detection using a Boosted Cascade of Simple Features", pp. 1-9 CVPR 2001.
Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.
Zach et al., "A Duality Based Approach for Realtime TV-L1 Optical Flow", Pattern Recognition (Proc. DAGM), 2007, pp. 214-223.
AU-2014218711 Examination report No. 1 dated Mar. 20, 2017.
CN-201380026050.0 Chinese 2nd Office Action of the State Intellectual Property Office of P.R. dated Apr. 1, 2017.
CN-201480023023.2 Office second action dated May 11, 2017.
JP-2015-512879_1st_OA_translated_dated_20170411.
JP-2015-512896 1st Office Action (translated) dated Apr. 27, 2017.
PCT/US2017/012203 International search report and written opinion of international searching authority dated Apr. 18, 2017.
EP-14853532.1 European Extended Search Report of European Patent Office dated May 23, 2017.
EP-13791437.0 European first office action dated Aug. 30, 2016.
EP-13822472.0 European Extended Search Report of European Patent Office dated Mar. 2, 2016.
EP-13843659.7 European Extended Search Report of European Patent Office dated May 10, 2016.
EP-13844510.1 European Extended Search Report of European Patent Office dated May 13, 2016.
EP-13865893.5 European Extended Search Report of European Patent Office dated Oct. 6, 2016.
EP-14754859.8 European Extended Search Report of European Patent Office dated Oct. 14, 2016.
EP-14813739.1 European Extended Search Report of European Patent Office dated Jan. 25, 2017.
EP-16150248.9 European Extended Search Report of European Patent Office dated Jun. 16, 2016.
Ho, "Random Decision Forests", Proceedings of the 3rd International Conference on Document Analysis and Recognition, Montreal, QC, pp. 278-282, Aug. 14-16, 1995.
Ian Sexton et al: "Stereoscopic and autostereoscopic display-systems",—IEEE Signal Processing Magazine, May 1, 1999 (May 1, 1999 ), pp. 85-99, XP055305471, Retrieved from the Internet: RL:http://ieeexplore.ieee.org/iel5/79/16655/00768575.pdf [retrieved on Sep. 26, 2016].
JP 2015-512794 1st Office Action (translated) dated Feb. 14, 2017.
JP 2015-512810 1st Office Action (translated) dated Feb. 7, 2017.
JP 2015-512887 1st Office Action (translated) dated Feb. 7, 2017.
JP 2015-512905 1st Office Action (translated) dated Feb. 7, 2017.
JP-2009538527 Reasons for rejection dated Jul. 17, 2012 with translation.
JP-200980150139.1 1st Office Action dated Nov. 2, 2014.
JP-200980150139.1 2d Office Action dated May 4, 2015.
JP-2013540083 Notice of reasons for rejection of Jun. 30, 2015.
JP-2013540083 Notice of reasons for rejection with translation dated Jun. 21, 2016.
Kalantar, et al. "Backlight Unit With Double Surface Light Emission," J. Soc. Inf. Display, vol. 12, Issue 4, pp. 379-387 (Dec. 2004).
Kononenko et al., "Learning to Look Up: Realtime Monocular Gaze Correction Using Machine Learning", Computer Vision and Pattern Recognition, pp. 4667-4675, 2015.
KR-20117010839 1st Office action (translated) dated Aug. 28, 2015.
KR-20117010839 2d Office action (translated) dated Apr. 28, 2016.
KR-20137015775 Office action (translated) dated Oct. 18, 2016.
Languy et al., "Performance comparison of four kinds of flat nonimaging Fresnel lenses made of polycarbonates and polymethyl methacrylate for concentrated photovoltaics", Optics Letters, 36, pp. 2743-2745.
Lipton, "Stereographics: Developers' Handbook", Stereographic Developers Handbook, Jan. 1, 1997, XP002239311, p. 42-49.
Lipton: "Stereoscopic Composition Lenny Lipton", Feb. 15, 2009 (Feb. 15, 2009), XP055335930, Retrieved from the Internet: URL:https://lennylipton.wordpress.com/2009/02/15/stereoscopic-composition/ [retrieved on Jan. 17, 2017].
Lowe, "Distinctive Image Features from Scale-Invariant Keypoints", International Journal of Computer Vision 60 (2), pp. 91-110, 2004.
Lucio et al: "RGBD Camera Effects", Aug. 1, 2012 (Aug. 1, 2012), XP055335831, SIBGRAPI—Conference on Graphics, Patterns and Images Retrieved from the Internet: URL:https://www.researchgate.net/profile/Leandro Cruz/publication/233398182 RGBD Camera Effects/links/0912150a2922010eb2000000.pdf [retrieved on Jan. 17, 2017].
Marjanovic, M.,"Interlace, Interleave, and Field Dominance," http://www.mir.com/DMG/interl.html, pp. 1-5 (2001).

(56) References Cited

OTHER PUBLICATIONS

Ozuysal et al., "Fast Keypoint recognition in Ten Lines of Code", Computer Vision and Pattern Recognition, pp. 1-8, 2007.
PCT/US2007/85475 International preliminary report on patentability dated May 26, 2009.
PCT/US2007/85475 International search report and written opinion dated Apr. 10, 2008.
PCT/US2009/060686 international preliminary report on patentability dated Apr. 19, 2011.
PCT/US2009/060686 international search report and written opinion of international searching authority dated Dec. 10, 2009.
PCT/US2011/061511 International Preliminary Report on Patentability dated May 21, 2013.
PCT/US2011/061511 International search report and written opinion of international searching authority dated Jun. 29, 2012.
PCT/US2012/037677 International search report and written opinion of international searching authority dated Jun. 29, 2012.
PCT/US2012/042279 International search report and written opinion of international searching authority dated Feb. 26, 2013.
PCT/US2012/052189 International search report and written opinion of the international searching authority dated Jan. 29, 2013.
PCT/US2013/041192 International search report and written opinion of international searching authority dated Aug. 28, 2013.
PCT/US2013/041228 International search report and written opinion of international searching authority dated Aug. 23, 2013.
PCT/US2013/041235 International search report and written opinion of international searching authority dated Aug. 23, 2013.
PCT/US2013/041237 International search report and written opinion of international searching authority dated May 15, 2013.
PCT/US2013/041548 International search report and written opinion of international searching authority dated Aug. 27, 2013.
PCT/US2013/041619 International search report and written opinion of international searching authority dated Aug. 27, 2013.
PCT/US2013/041655 International search report and written opinion of international searching authority dated Aug. 27, 2013.
PCT/US2013/041683 International search report and written opinion of international searching authority dated Aug. 27, 2013.
PCT/US2013/041697 International search report and written opinion of international searching authority dated Aug. 23, 2013.
PCT/US2013/041703 International search report and written opinion of international searching authority dated Aug. 27, 2013.
3M™ ePrivacy Filter software professional version; http://www.cdw.com/shop/products/3M-ePrivacy-Filter-software-professional-version/3239412.aspx?cm_mmc=ShoppingFeeds-_-ChannelIntelligence-_-Software-_-3239412_3MT%20ePrivacy%20Filter%20software%20professional%20version_3MF-EPFPRO&cpncode=37-7582919&srccode=cii_10191459#PO; Copyright 2007-2016.
AU-2011329639 Australia Patent Examination Report No. 1 dated Mar. 6, 2014.
AU-2013262869 Australian Office Action of Australian Patent Office dated Feb. 22, 2016.
AU-2015258258 Australian Office Action of Australian Patent Office dated Jun. 9, 2016.
Bahadur, "Liquid crystals applications and uses," World Scientific, vol. 1, pp. 178 (1990).
Beato: "Understanding Comfortable stereography", Dec. 31, 2011 (Dec. 31, 2011), XP055335952, Retrieved from the Internet: URL:http://64.17.134.112/Affonso Beato/Understanding Comfortable Stereography.html [retrieved-on Jan. 17, 2017].
Braverman: "The 3D Toolbox : News", Aug. 13, 2010 (Aug. 13, 2010), XP055336081, Retrieved from the Internet: URL:http://www.dashwood3d.com/blog/the-3d-toolbox/ [retrieved on Jan. 17, 2017].
CA-2817044 Canadian office action dated Jul. 14, 2016.
CN-201180065590.0 Office first action dated Dec. 31, 2014.
CN-201180065590.0 Office fourth action dated Jan. 4, 2017.
CN-201180065590.0 Office second action dated Oct. 21, 2015.
CN-201180065590.0 Office Third action dated Jun. 6, 2016.
CN-201280034488.9 2d Office Action from the State Intellectual Property Office of P.R. China dated Mar. 22, 2016.
CN-201280034488.9 1st Office Action from the State Intellectual Property Office of P.R. China dated Jun. 11, 2015.
CN-201380026045.X Chinese First Office Action of Chinese Patent Office dated Aug. 29, 2016.
CN-201380026046.4 Chinese 1st Office Action of the State Intellectual Property Office of P.R. China dated Oct. 24, 2016.
CN-201380026047.9 Chinese 1st Office Action of the State Intellectual Property Office of P.R. dated Dec. 18, 2015.
CN-201380026047.9 Chinese 2d Office Action of the State Intellectual Property Office of P.R. dated Jul. 12, 2016.
CN-201380026050.0 Chinese 1st Office Action of the State Intellectual Property Office of P.R. dated Jun. 3, 2016.
CN-201380026058.7 Chinese 1st Office Action of the State Intellectual Property Office of P.R. China dated Nov. 2, 2016.
CN-201380026059.1 Chinese 2nd Office Action of the State Intellectual Property Office of P.R. dated Feb. 22, 2017.
CN-201380026059.1 Chinese 1st Office Action of the State Intellectual Property Office of P.R. dated Apr. 25, 2016.
CN-201380026076.5 Office first action dated May 11, 2016.
CN-201380049451.8 Chinese Office Action of the State Intellectual Property Office of P.R. dated Apr. 5, 2016.
CN-201380063047.6 Chinese Office Action of the State Intellectual Property Office of P.R. China dated Oct. 9, 2016.
CN-201380063055.0 Chinese 1st Office Action of the State Intellectual Property Office of P.R. dated Jun. 23, 2016.
CN-201380073381.X Chinese Office Action of the State Intellectual Property Office of P.R. China dated Nov. 16, 2016.
CN-201480023023.2 Office action dated Aug. 12, 2016.
Cootes et al., "Active Appearance Models", IEEE Trans. Pattern Analysis and Machine Intelligence, 23(6):681-685, 2001.
Cootes et al., "Active Shape Models—Their Training and Application" Computer Vision and Image Understanding 61(1):38-59 Jan. 1995.
Dalal et al., "Histogram of Oriented Gradients for Human Detection", Computer Vision and Pattern Recognition, pp. 886-893, 2005.
Drucker et al., "Support Vector Regression Machines", Advances in Neural Information Processing Systems 9, pp. 155-161, NIPS 1996.
EP-07864751.8 European Search Report dated Jun. 1, 2012.
EP-07864751.8 Supplementary European Search Report dated May 29, 2015.
EP-09817048.3 European Search Report dated Apr. 29, 2016.
EP-11842021.5 Office Action dated Dec. 17, 2014.
EP-11842021.5 Office Action dated Oct. 2, 2015.
EP-11842021.5 Office Action dated Sep. 2, 2016.
EP-13758536.0 European Extended Search Report of European Patent Office dated Feb. 4, 2016.
EP-13790013.0 European Extended Search Report of European Patent Office dated Jan. 26, 2016.
EP-13790141.9 European Extended Search Report of European Patent Office dated Feb. 11, 2016.
EP-13790195.5 European Extended Search Report of European Patent Office dated Mar. 2, 2016.
EP-13790267.2 European Extended Search Report of European Patent Office dated Feb. 25, 2016.
EP-13790274.8 European Extended Search Report of European Patent Office dated Feb. 8, 2016.
EP-13790775.4 European Extended Search Report of European Patent Office dated Oct. 9, 2015.
EP-13790775.4 Office Action dated Aug. 29, 2016.
EP-13790809.1 European Extended Search Report of European Patent Office dated Feb. 16, 2016.
EP-13790942.0 European Extended Search Report of European Patent Office dated May 23, 2016.
EP-13791332.3 European Extended Search Report of European Patent Office dated Feb. 1, 2016.
EP-13791437.0 European Extended Search Report of European Patent Office dated Oct. 14, 2015.

* cited by examiner

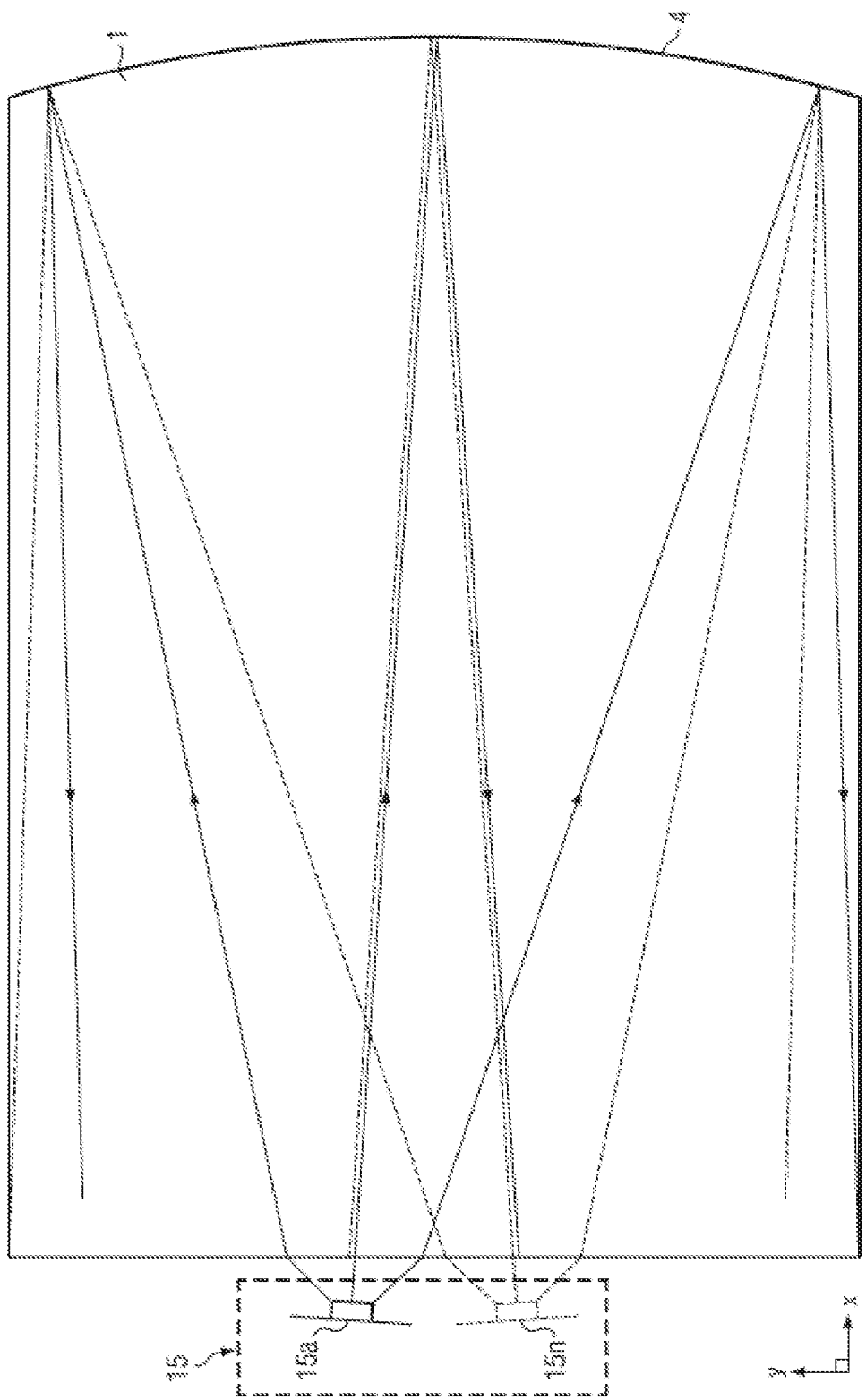

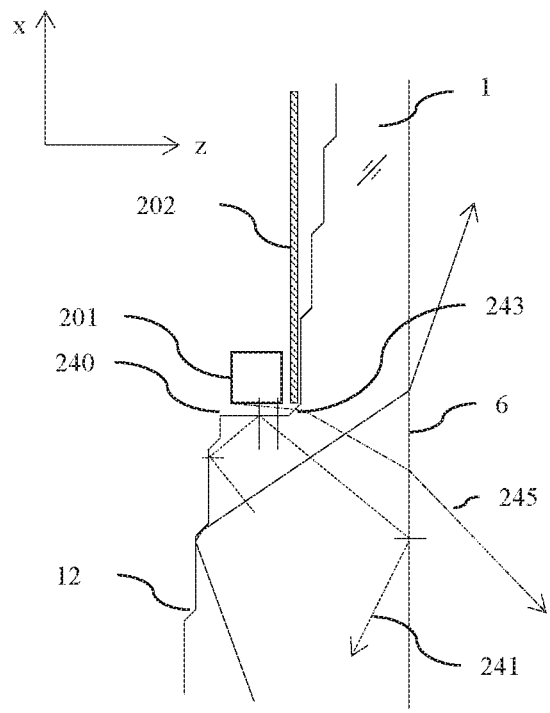
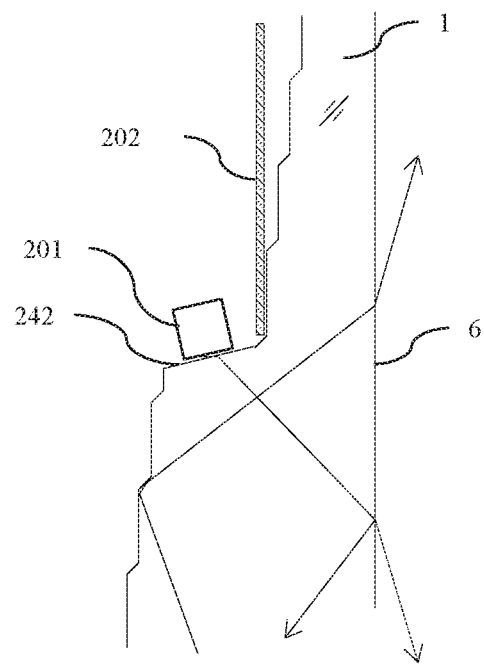
FIG. 16A                FIG. 16B
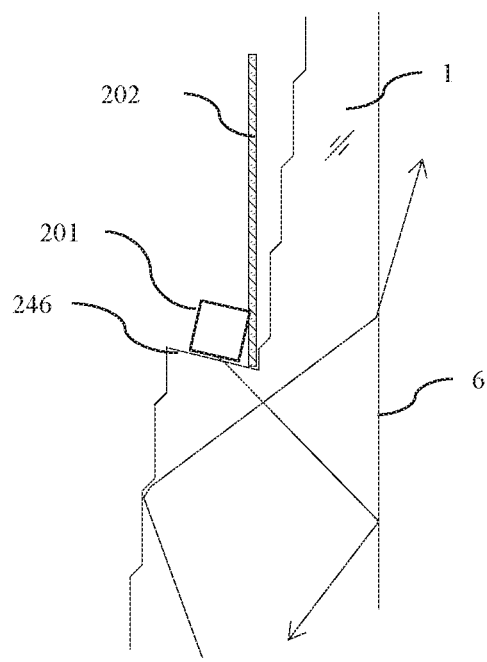
FIG. 16C

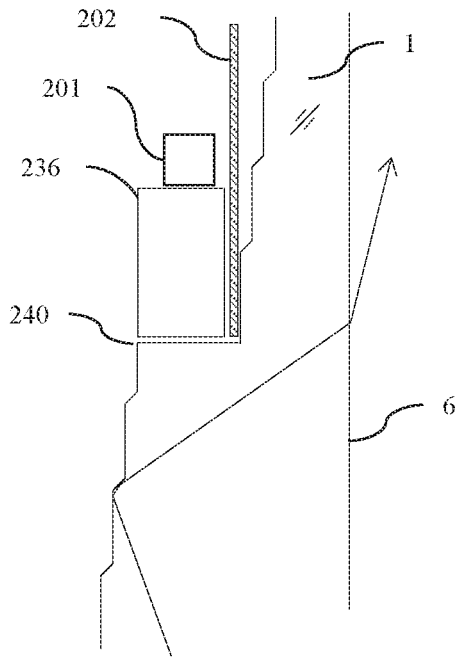
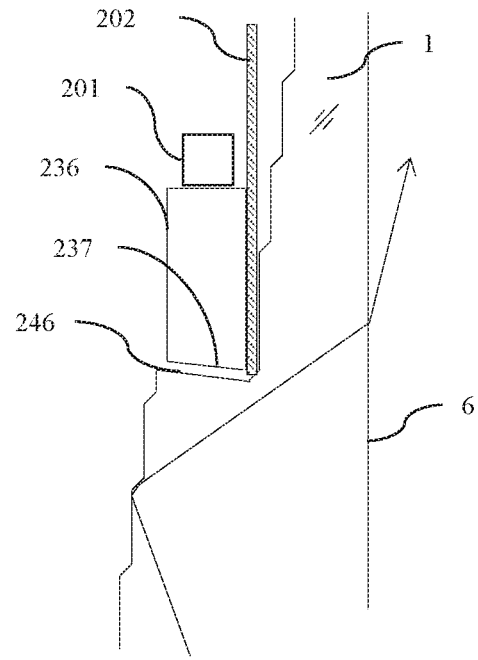
FIG. 16D                FIG. 16E
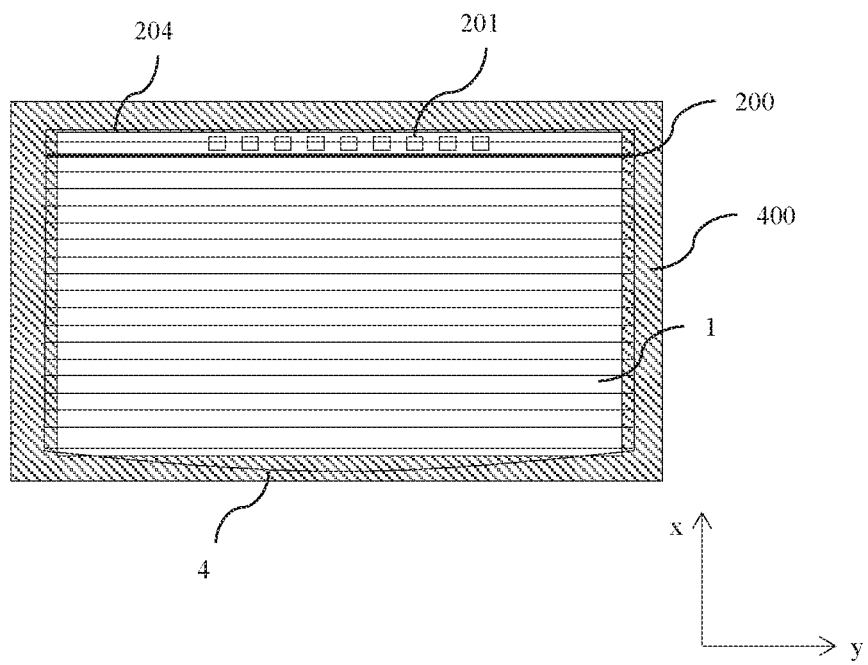
FIG. 17

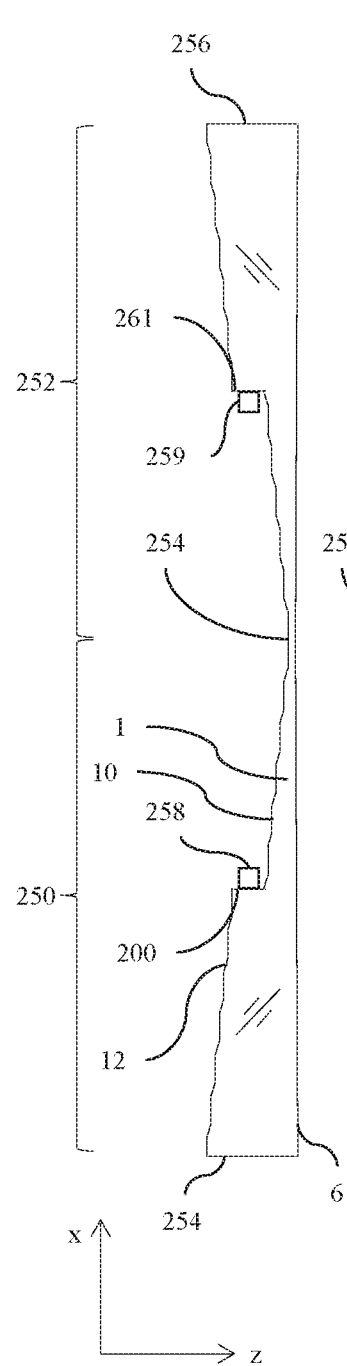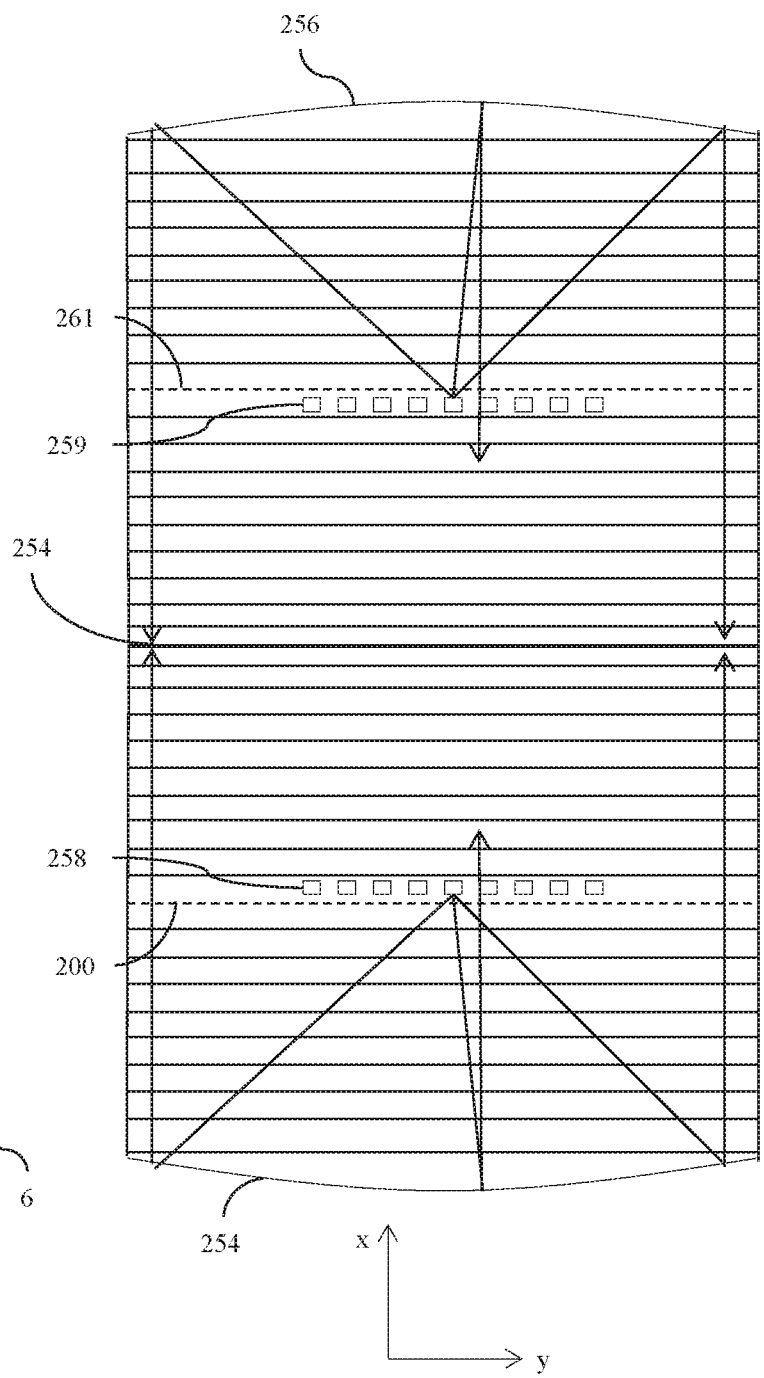
FIG. 31A
FIG. 31B

LIGHT INPUT FOR DIRECTIONAL BACKLIGHT

CROSS-REFERENCE TO RELATED APPLICATIONS

This application is related to and claims priority to U.S. Provisional Application No. 61/890,437, entitled "Light input for directional backlight," filed Oct. 14, 2013, which is herein incorporated by reference in its entirety. This application is also related to U.S. patent application Ser. No. 13/300,293, entitled "Directional flat illuminators," filed Nov. 18, 2011, U.S. patent application Ser. No. 14/186,862, entitled "Directional backlight," filed Feb. 21, 2014, U.S. patent application Ser. No. 13/838,936, entitled "Directional backlight," filed Mar. 15, 2013, all of which are herein incorporated by reference in their entireties.

TECHNICAL FIELD

This disclosure generally relates to illumination of spatial light modulators, and more specifically relates to directional backlights for providing large area illumination from localized light sources for use in 2D, 3D, and/or autostereoscopic display devices.

BACKGROUND

Spatially multiplexed autostereoscopic display devices typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such display devices have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can include addressing electronics in the spatial light modulator.

BRIEF SUMMARY

According to a first aspect of the present disclosure, there is provided a directional backlight which may include a waveguide comprising first and second, opposed guide surfaces for guiding input light along the waveguide, at least one light source arranged to generate the input light at a predetermined input position in a lateral direction across the waveguide, the waveguide further comprising a reflective end for reflecting the input light back through the waveguide, the second guide surface being arranged to deflect the input light after reflection from the reflective end as output light through the first guide surface, and the waveguide being arranged to direct the output light into an optical window in an output direction that is positioned in a lateral direction in dependence on the input position of the input light, the at least one light source being arranged to inject the input light into the waveguide through the second guide surface partway along the waveguide. The second guide surface may comprise at least two parts each extending partway along the waveguide, being separated approximately perpendicular to the lateral direction by an input aperture, the at least one light source being arranged to inject the input light through the input aperture. The at least one light source may be disposed behind one of the parts of the second guide surface. The directional backlight may further comprise a light shield arranged between the at least one light source and the one of the parts of the second guide surface behind which the at least one light source is disposed. The directional backlight may further comprise a respective rear reflector arranged behind each of the parts of the second guide surface, each rear reflector comprising an array of reflective facets arranged to reflect light from the at least one light source, that is transmitted through a plurality of facets of the waveguide, back through the waveguide to exit through the first guide surface into said optical windows. The input aperture may comprise an input facet extending between the two parts of the second guide surface, the at least one light source being arranged along the input facet. The directional backlight may further comprise an injection waveguide portion arranged between the at least one light source and the input aperture to guide input light from the at least one light source to the input aperture for injection of the input light through the input aperture. The injection waveguide portion may be a separate element from the waveguide. The injection waveguide portion may be index matched with the waveguide. The injection waveguide portion may be formed integrally with the waveguide. The two parts of the second guide surface may overlap in a direction along the waveguide.

The directional backlight may further comprise a light combiner arranged between the injection waveguide portion and the input aperture, and a further at least one light source arranged to generate input light at a predetermined input position in a lateral direction across the waveguide, the further at least one light source being arranged to inject the input light into the waveguide through the light combiner, the further at least one light source being closer to the reflective end than the first-mentioned at least one light source. The directional backlight may further comprise a further at least one light source arranged to generate input light at a predetermined input position in a lateral direction across the waveguide, the further at least one light source being arranged to inject the input light into the waveguide through the second guide surface partway along the waveguide at a position that is different from the first mentioned at least one light source. The waveguide may have a facing end facing the reflective end, and the directional backlight further may comprise a further at least one light source that is arranged to inject further input light through the facing end into the waveguide. The directional backlight may further comprise plural sets of a waveguide and at least one light source each arranged in the same manner, the waveguides being tiled. The waveguides may include waveguides that are tiled in a direction perpendicular to the lateral direction with their ends opposite from the reflective end abutting. The first and second waveguides may be integrally formed.

The directional backlight may further comprise a respective rear reflector arranged behind each of the parts of the second guide surface, each rear reflector comprising an array of reflective facets arranged to reflect light from the at least one light source, that is transmitted through the plurality of facets of the waveguide, back through the waveguide to exit through the first guide surface into said optical windows, the rear reflectors extending continuously behind the abutting ends. The waveguides may include waveguides that are tiled in the lateral direction. The waveguides that are tiled in the lateral direction may be connected by a hinge allowing folding of the waveguides. The first guide surface may be arranged to guide light by total internal reflection and the second guide surface may comprise a plurality of light extraction features oriented to reflect light guided through the waveguide in directions allowing exit through the first guide surface as the output light and intermediate regions between the light extraction features that are arranged to direct light through the waveguide without extracting it. The second guide surface may have a stepped shape comprising facets, that are said light extraction features, and the intermediate regions. The light extraction features may have positive optical power in the lateral direction. The first guide surface may be arranged to guide light by total internal reflection and the second guide surface may be substantially planar and inclined at an angle to reflect light in directions that break the total internal reflection for outputting light through the first guide surface, and the display device may further comprise a deflection element extending across the first guide surface of the waveguide for deflecting light towards the normal to the spatial light modulator. The reflective end may have positive optical power in the lateral direction. The at least one light source may comprise an array of light sources arranged to generate the input light at respective input positions in a lateral direction across the waveguide. The array alight sources may be arranged in a curve.

According to a second aspect of the present disclosure, there is provided a display device which may include a directional backlight according to the first aspect and a transmissive spatial light modulator arranged to receive the output light from the first guide surface and to modulate it to display an image.

According to a third aspect of the present disclosure, there is provided a display apparatus which may include a directional backlight; and a transmissive spatial light modulator arranged to receive the output light from the first guide surface and to modulate it to display an image, and a control system arranged to selectively operate the light sources to direct light into varying optical windows corresponding to said output directions. The display apparatus may be an autostereoscopic display apparatus wherein the control system may be further arranged to control the display device to display temporally multiplexed left and right images and synchronously to direct the displayed images into optical windows in positions corresponding to left and right eyes of an observer. The control system may further comprise a sensor system arranged to detect the position of an observer across the display device, and the control system may be arranged to selectively operate the light sources to direct the output light into at least one optical window selected in dependence on the detected position of the observer.

Advantageously the light from the array of light sources can be directed to the mirror of the waveguide to achieve substantially efficient and uniform illumination across the mirror independently of the aspect ratio of the output of the waveguide. Thus the aspect ratio of the input illumination path can be greater than the aspect ratio of the output of the waveguide. The waveguide can be a stepped type waveguide using light extraction features or can use extraction by means of loss of total internal reflection. Visibility of the light input facet can be substantially eliminated. Further displays with very small bezel can be achieved by hiding light emitting element array behind the waveguide. The waveguide can be combined with gain reflection films to achieve hiding of light emitting element arrays combined with increase in display brightness and polarization recirculation. Displays with optical windows arranged at different window plane distances can be arranged, to achieve extended longitudinal viewing freedom. Arrays of tiled waveguides can be arranged to achieve large display size with desirable luminance levels from conventional light emitting elements. Display cross talk can be reduced in autostereoscopic display by means of synchronizing display illumination with illumination of respective waveguide tiles. Further foldable displays with low seam size and desirable aspect ratios can be provided. Such displays can be arranged to provide autostereoscopic 2D images to hide 2D image plane behind the display surface, further reducing visibility of seams in the display.

The various aspects of the present invention and the various features thereof may be applied together in any combination.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. patent application Ser. No. 13/300,293, which is herein incorporated by reference, in its entirety.

Embodiments herein may provide directional backlights for autostereoscopic displays, high efficiency displays, high brightness displays for use in brightly lit environments with low power consumption and privacy displays. High image contrast may be achieved in brightly lit environments. The efficiency and uniformity of displays with differing aspect ratios may be optimized. Bezel size may be reduced in comparison to edge lit waveguides and waveguides of large size may be provided suitable for display illumination with desirable levels of brightness. Display aberrations may be reduced and LED size may be optimized for a desirable optical window pitch. Further viewing freedom of directional displays may be enhanced. Foldable displays with reduced visibility of seam between parts of the foldable display may be achieved.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 1A is a schematic diagram illustrating a front view of light propagation in one embodiment of a directional display device, in accordance with the present disclosure;

FIGS. 16A-16E are schematic diagrams illustrating side views of mid-valve light input surfaces, in accordance with the present disclosure;

FIG. 17 is a schematic diagram illustrating a front view of a directional display including a directional backlight comprising a mid-valve light input surface arranged to reduce bezel size, in accordance with the present disclosure;

FIG. 31A is a schematic diagram illustrating a side view of a further tiled directional light valve comprising mid-valve light input structures, in accordance with the present disclosure;

FIG. 31B is a schematic diagram illustrating a front view of a further tiled directional light valve comprising mid-valve light input structures, in accordance with the present disclosure;

DETAILED DESCRIPTION

Figure 1B:
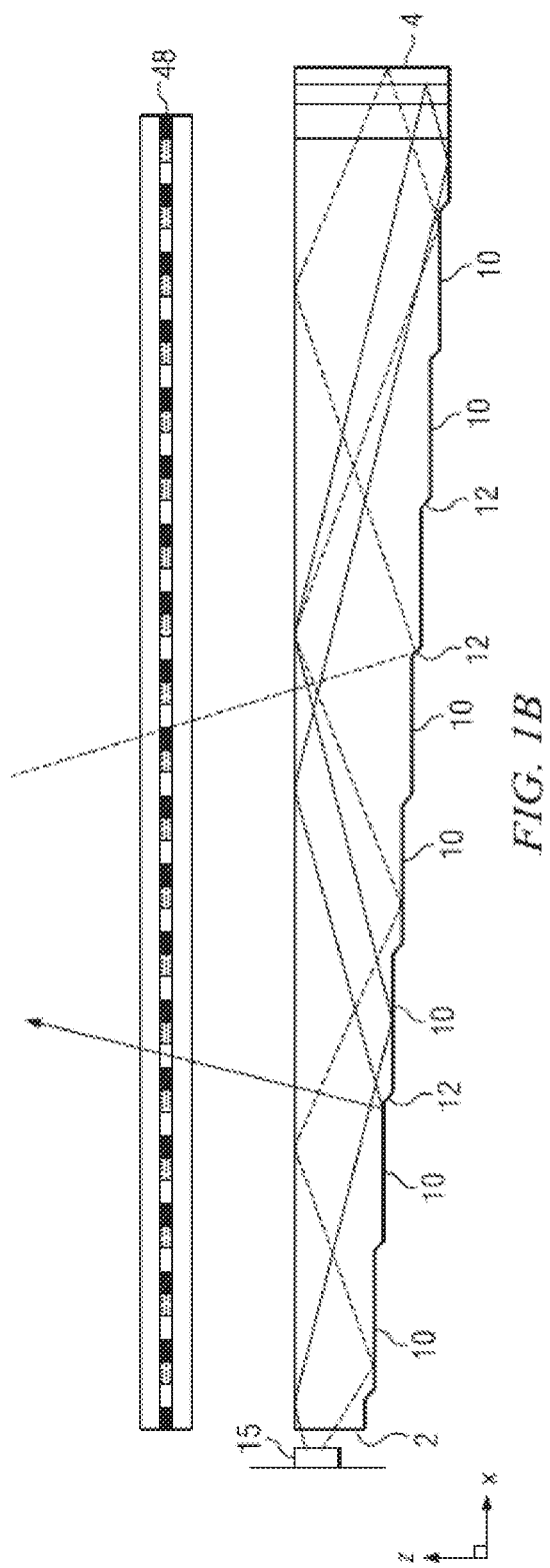
FIG. 1B is a schematic diagram illustrating a side view of light propagation in one embodiment of the directional display device of FIG. 1A, in accordance with the present disclosure.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may employ a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple optical windows in at least one axis. Each optical window is substantially formed as an image in at least one axis of a light source by the imaging system of the imaging directional backlight. An imaging system may be formed to image multiple light sources to respective viewing windows. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kälil Käläntär et al., *Backlight Unit With Double Surface Light Emission*, J. Soc. Inf. Display, Vol. 12, issue 4, pp. 379-387 (December 2004), Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Latnbertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (even though spatial light modulators may be sometimes generally referred to as a "light valve" in the art). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in U.S. patent application Ser. No. 13/300,293, which is herein incorporated by reference in its entirety.

As used herein, examples of an imaging directional backlight include a stepped waveguide imaging directional backlight, a folded imaging directional backlight, a wedge type directional backlight, or an optical valve.

Additionally, as used herein, a stepped waveguide imaging directional backlight may be an optical valve. A stepped waveguide is a waveguide for an imaging directional backlight including a waveguide for guiding light, further including a first light guiding surface; and a second light guiding surface, opposite the first light guiding surface, further including a plurality of guiding features interspersed with a plurality of extraction features arranged as steps.

Moreover, as used, a folded imaging directional backlight may be at least one of a wedge type directional backlight, or an optical valve.

In operation, light may propagate within an exemplary optical valve in a first direction from an input end to a reflective end and may be transmitted substantially without loss. Light may be reflected at the reflective end and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a nominal window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. patent application Ser. No. 13/300,293 which may be referred to herein as an "optical valve" or "optical valve directional backlight," all of which are herein incorporated by reference in their entirety.

The present disclosure provides stepped waveguide imaging directional backlights in which light may reflect back and forth between the internal faces of, for example, a stepped waveguide which may include a first guide surface and a second guide surface comprising a plurality of light extraction features and intermediate regions. As the light travels along the length of the stepped waveguide, the light may not substantially change angle of incidence with respect to the first and second guide surfaces and so may not reach the critical angle of the medium at these internal surfaces. Light extraction may be advantageously achieved by a light extraction features which may be facets of the second guide surface (the step "risers") that are inclined to the intermediate regions (the step "treads"). Note that the light extraction features may not be part of the light guiding operation of the stepped waveguide, but may be arranged to provide light extraction from the structure. By contrast, a wedge type imaging directional backlight may allow light to guide within a wedge profiled waveguide having continuous internal surfaces. Thus, the stepped waveguide (optical valve) is thus not a wedge type imaging directional backlight.

FIG. 1A is a schematic diagram illustrating a front view of light propagation in one embodiment of a directional display device, and FIG. 1B is a schematic diagram illustrating a side view of light propagation in the directional display device of FIG. 1A.

FIG. 1A illustrates a front view in the xy plane of a directional backlight of a directional display device, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illuminator elements 15a through 15n are light sources that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM (spatial light modulator) 48, extraction features 12, intermediate regions 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1 by total internal reflection (TIR). The first guide surface is planar. The second guide surface has a plurality of light extraction features 12 facing the reflective end 4 and inclined to reflect at least some of the light guided back through the waveguide 1 from the reflective end in directions that break the total internal reflection at the first guide surface and allow output through the first guide surface, for example, upwards in FIG. 1B, that is supplied to the SLM 48.

In this example, the light extraction features 12 are reflective facets, although other reflective features may be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape including of the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window. The optical windows may be used individually or in groups as viewing windows.

In the present disclosure an optical window may correspond to the image of a single light source in the window plane, being a nominal plane in which optical windows form across the entirety of the display device. Alternatively, an optical window may correspond to the image of a group of light sources that are driven together. Advantageously, such groups of light sources may increase uniformity of the optical windows of the array 121.

By way of comparison, a viewing window is a region in the window plane wherein light is provided comprising image data of substantially the same image from across the display area. Thus a viewing window may be formed from a single optical window or from plural optical windows, under the control of the control system.

The SLM 48 extends across the waveguide is transmissive and modulates the light passing therethrough. Although the SLM 48 may be a liquid crystal display (LCD) but this is merely by way of example, and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of optical windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of input end 2, x=0, of the stepped waveguide 1. The light may propagate along +x in a first direction, within the stepped waveguide 1, while at the same time, the light may fan out in the xy plane and upon reaching the reflective end 4 that is curved to have a positive optical power in the lateral direction, may substantially or entirely fill the curved end side 4. While propagating, the light may spread out to a set of angles in the xz plane up to, but not exceeding the critical angle of the guide material. The extraction features 12 that link the intermediate regions 10 of the second guide surface of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the reflective end 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (UR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input end 2 then enables light to exit from the entire first guide surface 6 and propagate at different external angles, as illustrated in FIG. 1A.

Figure 2A:
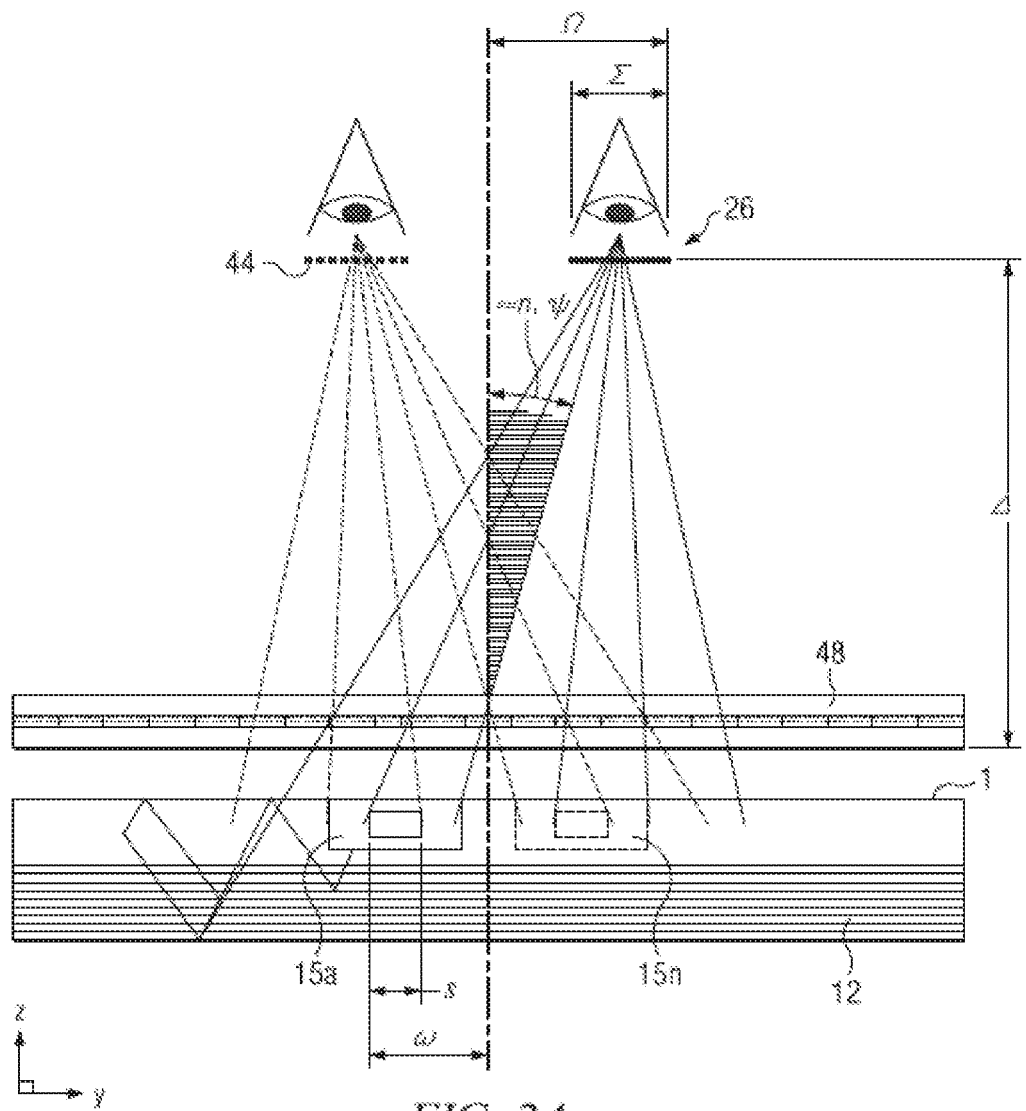
FIG. 2A is a schematic diagram illustrating in a top view of light propagation in another embodiment of a directional display device, in accordance with the present disclosure.
Figure 2B:
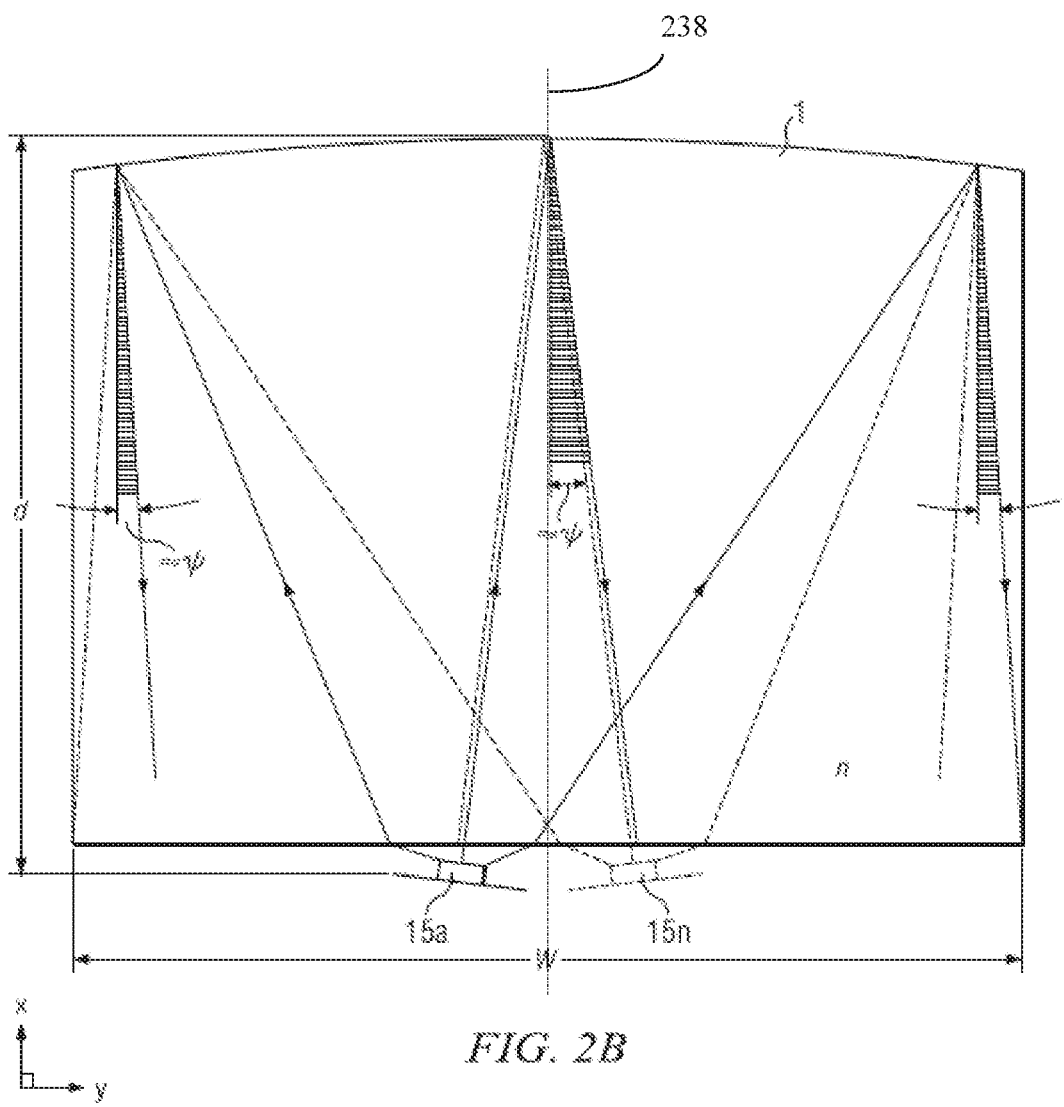
FIG. 2B is a schematic diagram illustrating light propagation in a front view of the directional display device of FIG. 2A, in accordance with the present disclosure.
Figure 2C:
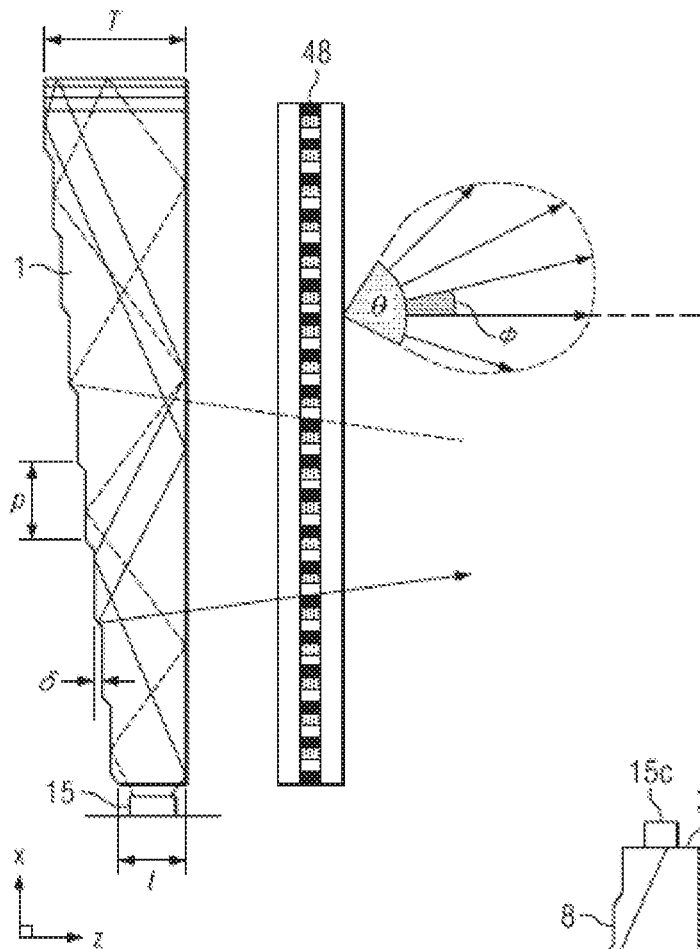
FIG. 2C is a schematic diagram illustrating light propagation in a side view of the directional display device of FIG. 2A, in accordance with the present disclosure.

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG.

2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. Viewing window 26 may comprise an array of optical windows 260 and viewing window 44 may comprise an array of optical windows 440, wherein each optical window is formed by a single illuminator of the array 15. Thus multiple illuminators may be arranged to form viewing windows 26 and 44. In FIG. 2A, the viewing window 26 is shown as formed by a single illuminator 15a and may thus comprise a single optical window 260. Similarly, the viewing window 44 is shown as formed by a single illuminator 15n and may thus comprise a single optical window 440. In this way, 3D may be viewed when the head of a viewer is approximately centrally aligned. Movement to the side away from the central position may result in the scene collapsing onto a 2D image.

The reflective end 4 may have positive optical power in the lateral direction across the waveguide. In embodiments in which typically the reflective end 4 has positive optical power, the optical axis may be defined with reference to the shape of the reflective end 4, for example being a line that passes through the center of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. In the present embodiments that typically comprise a substantially cylindrical reflecting surface at end 4, the optical axis 238 is a line that passes through the center of curvature of the surface at end 4 and coincides with the axis of reflective symmetry of the side 4 about the x-axis. The optical axis 238 is typically coincident with the mechanical axis of the waveguide 1. The cylindrical reflecting surface at end 4 may typically be a spherical profile to optimize performance for on-axis and off-axis viewing positions. Other profiles may be used.

Figure 3:
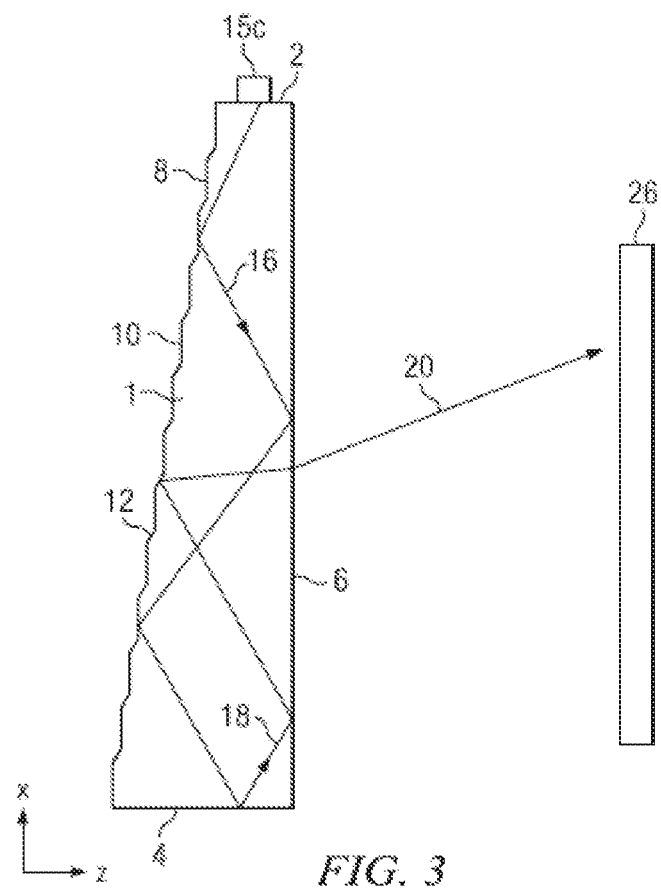
FIG. 3 is a schematic diagram illustrating in a side view of a directional display device, in accordance with the present disclosure.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input end 2, a reflective end 4, a first guide surface 6 which may be substantially planar, and a second guide surface 8 which includes intermediate regions 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first guide surface 6 and total internal reflection by the intermediate regions 10 of the second guide surface 8, to the reflective end 4, which may be a mirrored surface. Although reflective end 4 may be a mirrored surface and may reflect light, it may in some embodiments also be possible for light to pass through reflective end 4.

Continuing the discussion of FIG. 3, light ray 18 reflected by the reflective end 4 may be further guided in the stepped waveguide 1 by total internal reflection at the reflective end 4 and may be reflected by extraction features 12. Light rays 18 that are incident on extraction features 12 may be substantially deflected away from guiding modes of the stepped waveguide 1 and may be directed, as shown by ray 20, through the first guide surface 6 to an optical pupil that may form a viewing window 26 of an autostereoscopic display. The width of the viewing window 26 may be determined by at least the size of the illuminator, number of illuminator elements 15n illuminated, output design distance and optical power in the reflective end 4 and extraction features 12. The height of the viewing window may be primarily determined by the reflection cone angle of the extraction features 12 and the illumination cone angle input at the input end 2. Thus each viewing window 26 represents a range of separate output directions with respect to the surface normal direction of the spatial light modulator 48 that intersect with a window plane 106 at the nominal viewing distance.

Figure 4A:
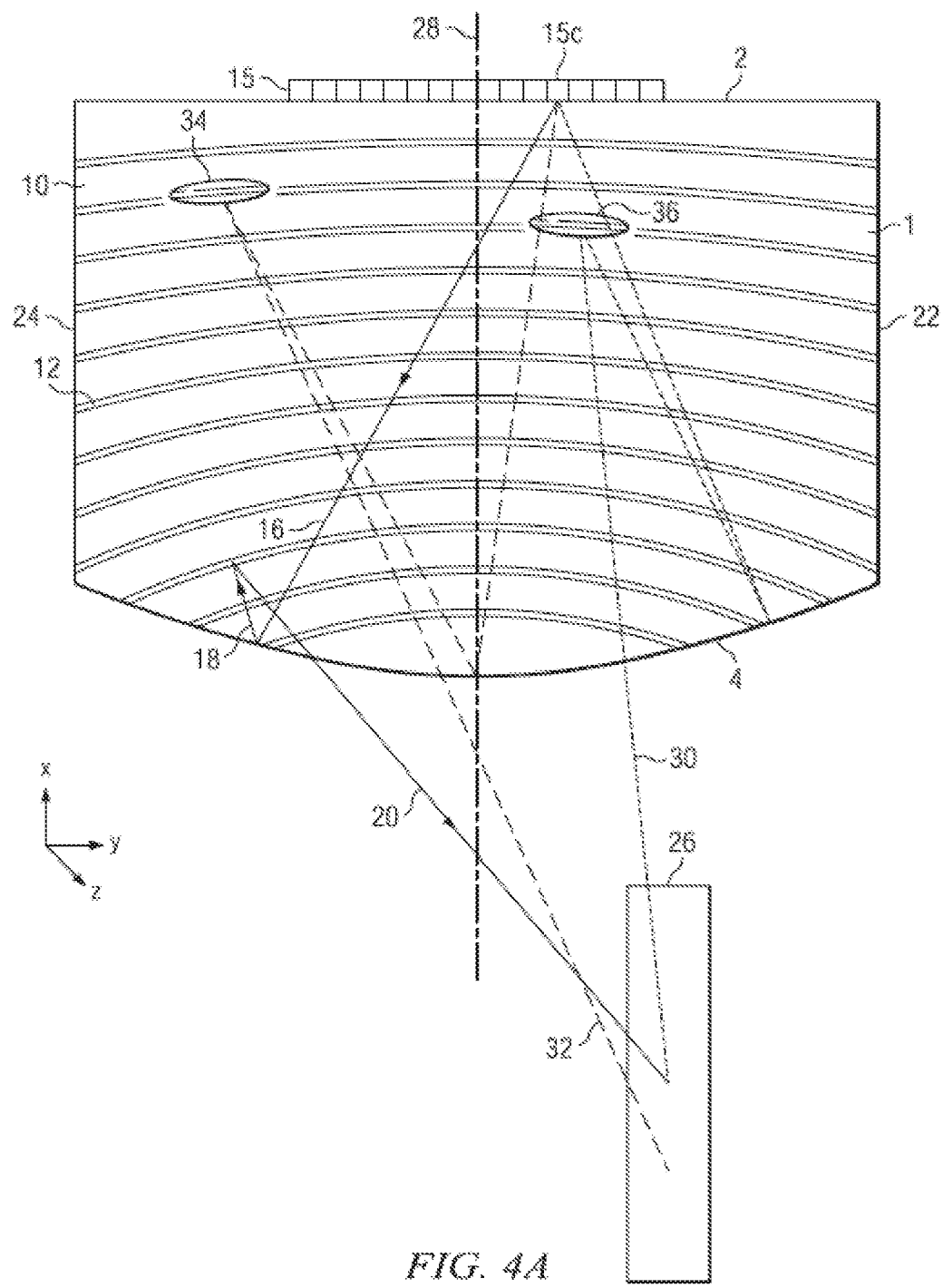
FIG. 4A is schematic diagram illustrating in a front view, generation of a viewing window in a directional display device and including curved light extraction features, in accordance with the present disclosure.

FIG. 4A is a schematic diagram illustrating in front view a directional display device which may be illuminated by a first illuminator element and including curved light extraction features. Further, FIG. 4A shows in front view further guiding of light rays from illuminator element 15c of illuminator array 15, in the stepped waveguide 1 having an optical axis 28. In FIG. 4A, the directional backlight may include the stepped waveguide 1 and the light source illuminator array 15. Each of the output rays are directed from the input end 2 towards the same optical window 260 from the respective illuminator 15c. The light rays of FIG. 4A may exit the reflective end 4 of the stepped waveguide 1. As shown in FIG. 4A, ray 16 may be directed from the illuminator element 15c towards the reflective end 4. Ray 18 may then reflect from a light extraction feature 12 and exit the reflective end 4 towards the optical window 260. Thus light ray 30 may intersect the ray 20 in the optical window 260, or may have a different height in the viewing window as shown by ray 32. Additionally, in various embodiments, sides 22, 24 of the waveguide 1 may be transparent, mirrored, or blackened surfaces. Continuing the discussion of FIG. 4A, light extraction features 12 may be elongate, and the orientation of light extraction features 12 in a first region 34 of the second guide surface 8 (shown in FIG. 3, but not shown in FIG. 4A) may be different to the orientation of light extraction features 12 in a second region 36 of the second guide surface 8. Similar to other embodiments discussed herein, for example as illustrated in FIG. 3, the light extraction features of FIG. 4A may alternate with the intermediate regions 10. As illustrated in FIG. 4A, the stepped waveguide 1 may include a reflective surface on reflective end 4. In one embodiment, the reflective end of the stepped waveguide 1 may have positive optical power in a lateral direction across the stepped waveguide 1.

In another embodiment, the light extraction features 12 of each directional backlight may have positive optical power in a lateral direction across the waveguide.

In another embodiment, each directional backlight may include light extraction features 12 which may be facets of the second guide surface. The second guide surface may have regions alternating with the facets that may be arranged to direct light through the waveguide without substantially extracting it.

Figure 4B:
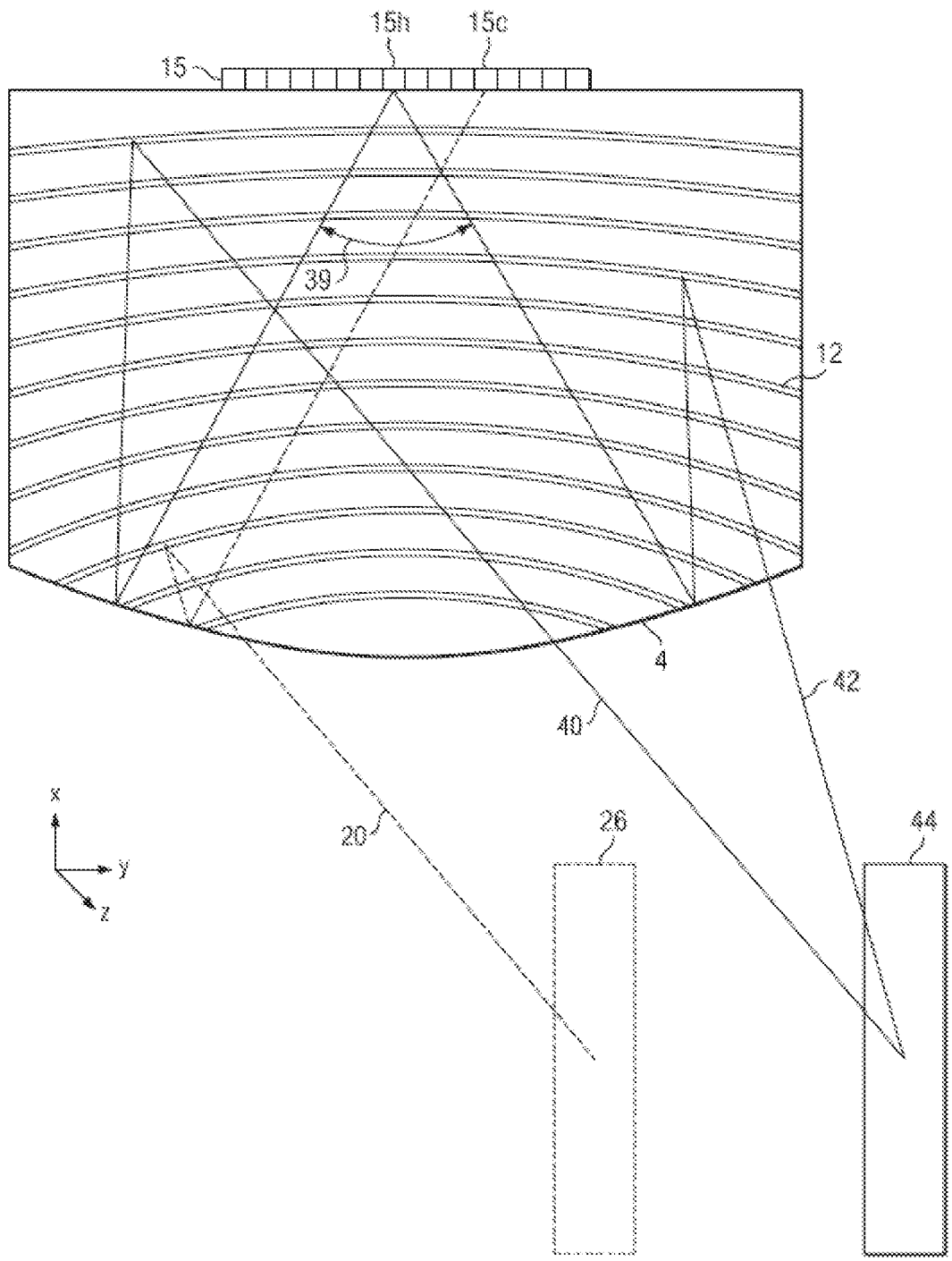
FIG. 4B is a schematic diagram illustrating in a front view, generation of a first and a second viewing window in a directional display device and including curved light extraction features, in accordance with the present disclosure.

FIG. 4B is a schematic diagram illustrating in front view a directional display device which may illuminated by a second illuminator element. Further, FIG. 4B shows the light rays 40, 42 from a second illuminator element 15*h* of the illuminator array 15. The curvature of the reflective surface on the reflective end 4 and the light extraction features 12 cooperatively produce a second optical window 440 laterally separated from the optical window 260 with light rays from the illuminator element 15*h*.

Advantageously, the arrangement illustrated in FIG. 4B may provide a real image of the illuminator element 15*c* at an optical window 260 in which the real image may be formed by cooperation of optical power in reflective end 4 and optical power which may arise from different orientations of elongate light extraction features 12 between regions 34 and 36, as shown in FIG. 4A. The arrangement of FIG. 4B may achieve improved aberrations of the imaging of illuminator element 15*c* to lateral positions in viewing window 26. Improved aberrations may achieve an extended viewing freedom for an autostereoscopic display while achieving low cross talk levels.

Figure 5:
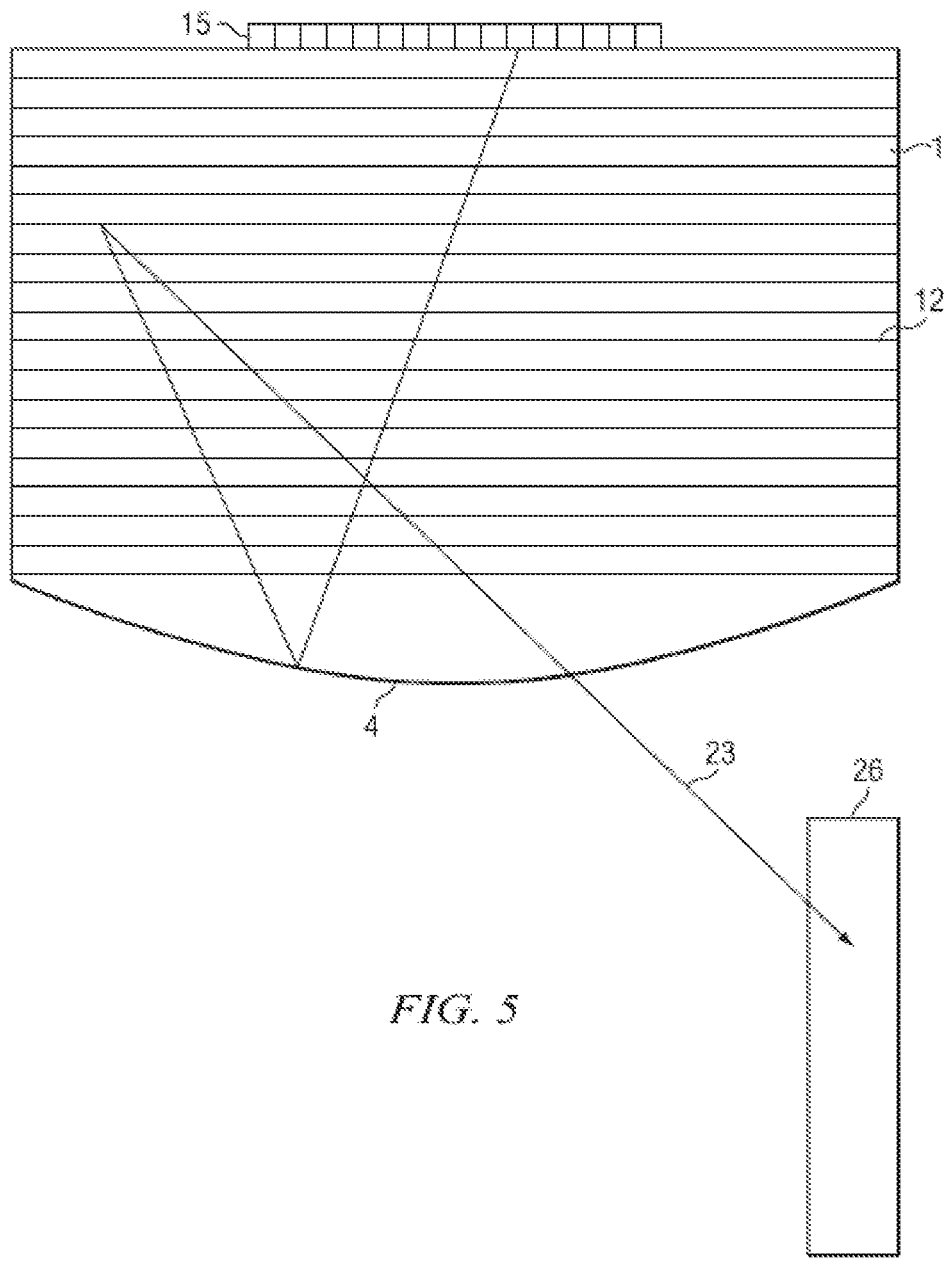
FIG. 5 is a schematic diagram illustrating generation of a first viewing window in a directional display device including linear light extraction features, in accordance with the present disclosure.

FIG. 5 is a schematic diagram illustrating in front view an embodiment of a directional display device having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B. The optical axis 321 of the directional waveguide 1 may be the optical axis direction of the surface at the reflective end 4. The optical power of the reflective end 4 is arranged to be across the optical axis direction, thus rays incident on the reflective end 4 will have an angular deflection that varies according to the lateral offset 319 of the incident ray from the optical axis 321.

Figure 6A:
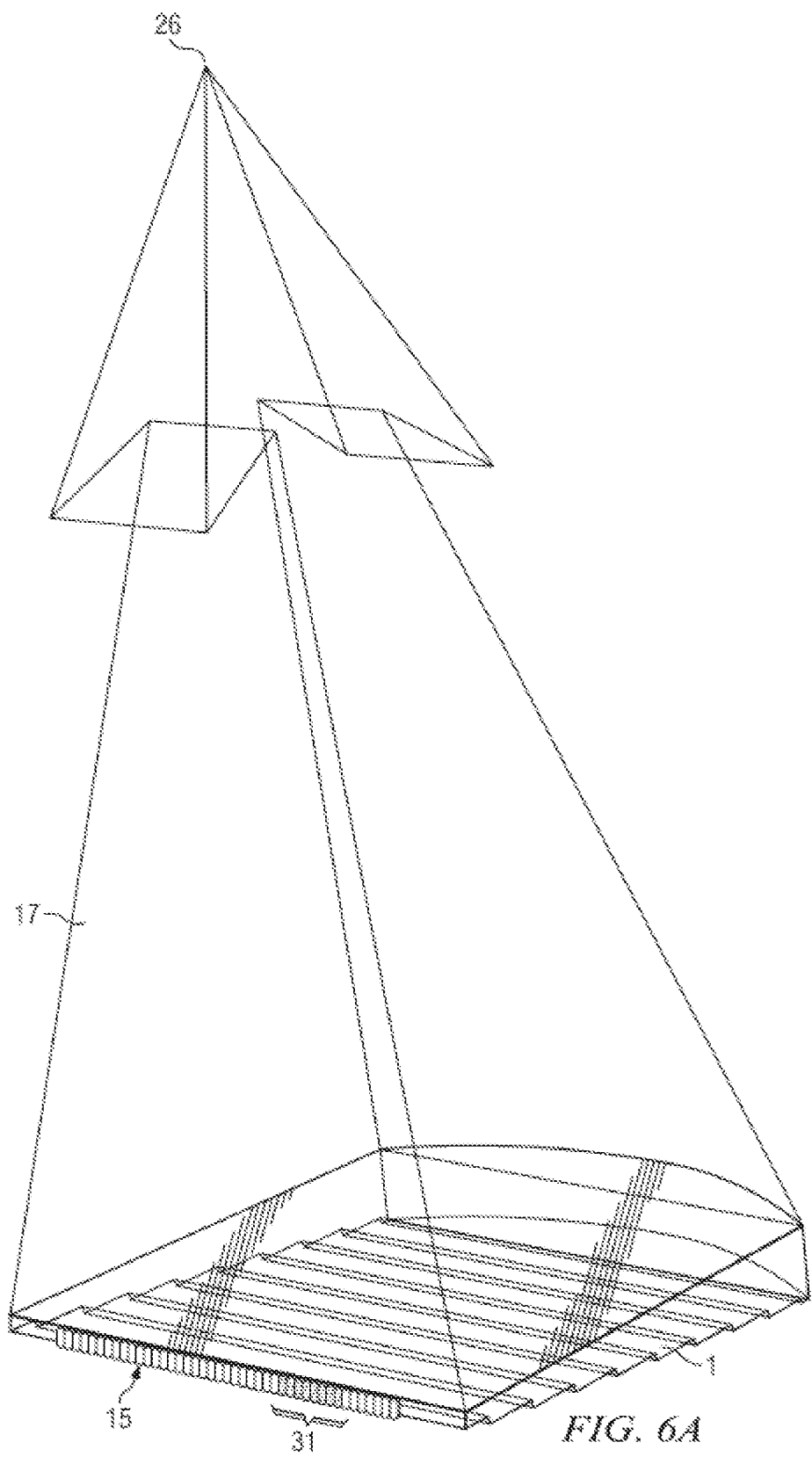
FIG. 6A is a schematic diagram illustrating one embodiment of the generation of a first viewing window in a time multiplexed directional display device, in accordance with the present disclosure.
Figure 6B:
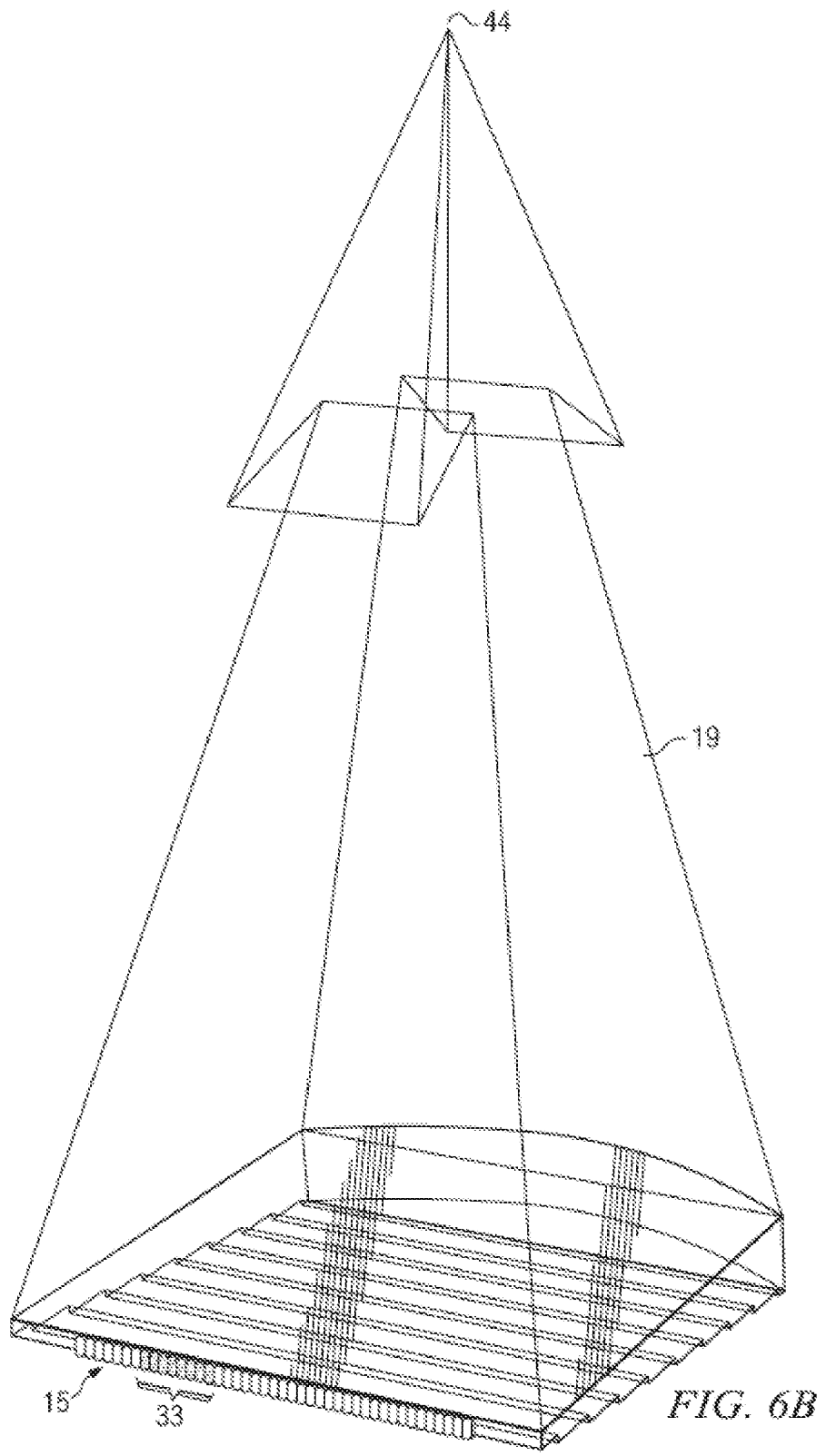
FIG. 6B is a schematic diagram illustrating another embodiment of the generation of a second viewing window in a time multiplexed directional display device in a second time slot, in accordance with the present disclosure.
Figure 6C:
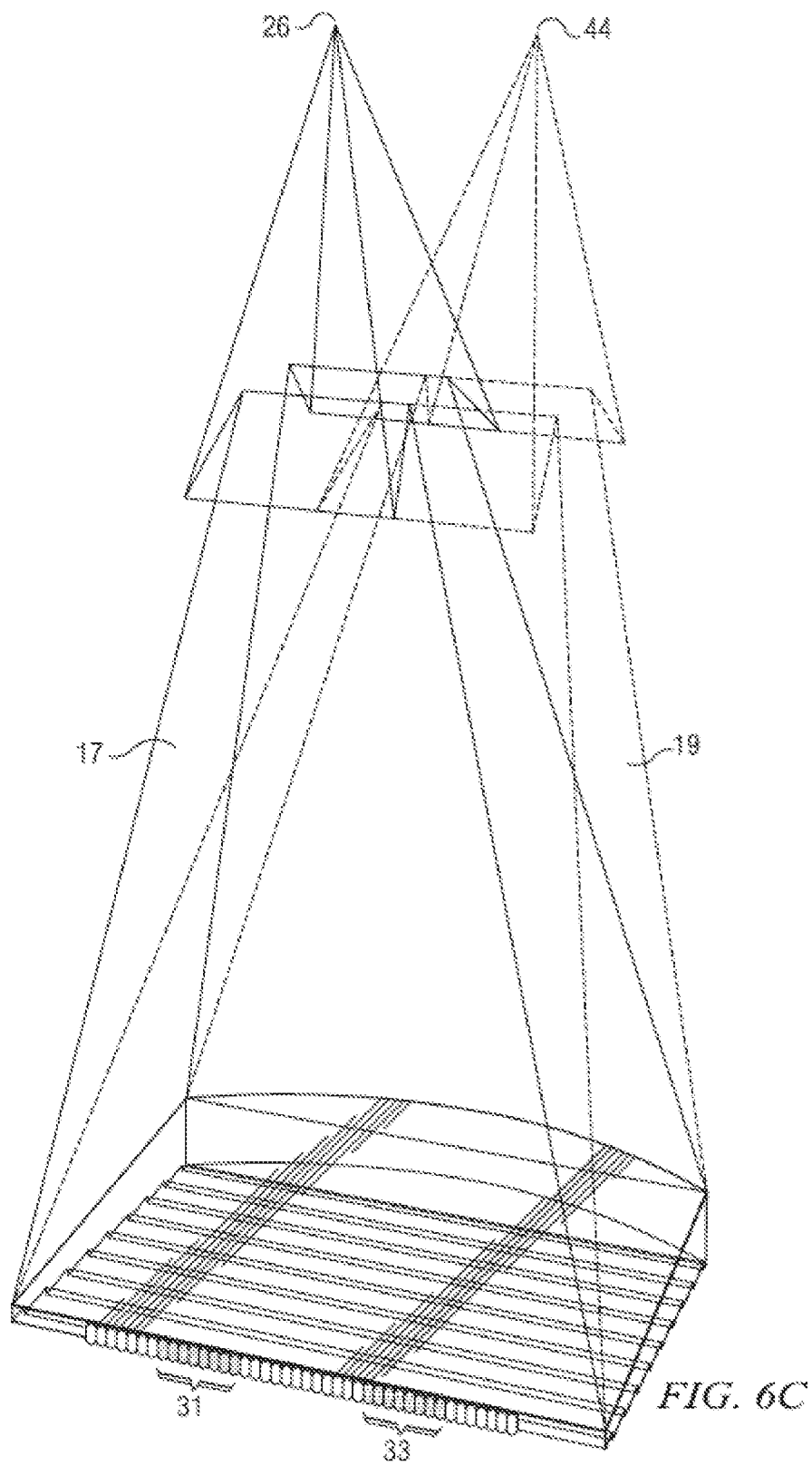
FIG. 6C is a schematic diagram illustrating another embodiment of the generation of a first and a second viewing window in a time multiplexed directional display device, in accordance with the present disclosure.

FIG. 6A is a schematic diagram illustrating one embodiment of the generation of a first viewing window in a time multiplexed imaging directional display device in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional display device. Further, FIG. 6A shows schematically the generation of viewing window 26 from stepped waveguide 1. Illuminator element group 31 in illuminator array 15 may provide a light cone 17 directed towards a viewing window 26 that may comprise a single optical window 260 or an array of optical windows 260. FIG. 6B shows schematically the generation of viewing window 44. Illuminator element group 33 in illuminator array 15 may provide a light cone 19 directed towards viewing window 44 (that may comprise a single optical window 440 or an array of optical windows 440). In cooperation with a time multiplexed display, viewing windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all the imaging directional backlights described herein. Note that illuminator element groups 31, 33 each include one or more illumination elements from illumination elements 15*a* to 15*n*, where n is an integer greater than one.

Figure 7:
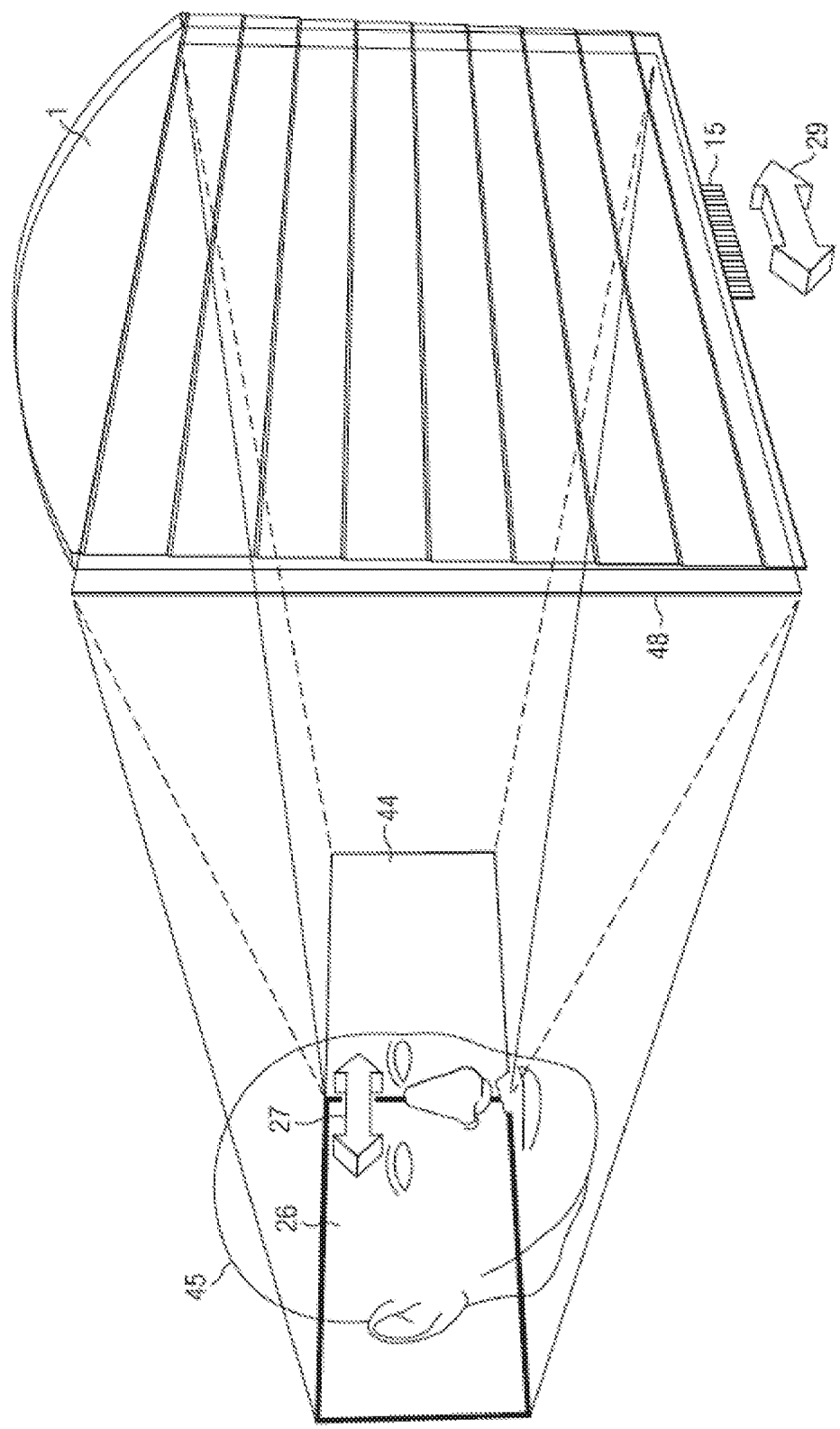
FIG. 7 is a schematic diagram illustrating an observer tracking autostereoscopic directional display device, in accordance with the present disclosure.

FIG. 7 is a schematic diagram illustrating one embodiment of an observer tracking autostereoscopic display apparatus including a time multiplexed directional display device. As shown in FIG. 7, selectively turning on and off illuminator elements 15*a* to 15*n* along axis 29 provides for directional control of viewing windows 26, 44. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all the imaging directional backlights described herein.

Figure 8:
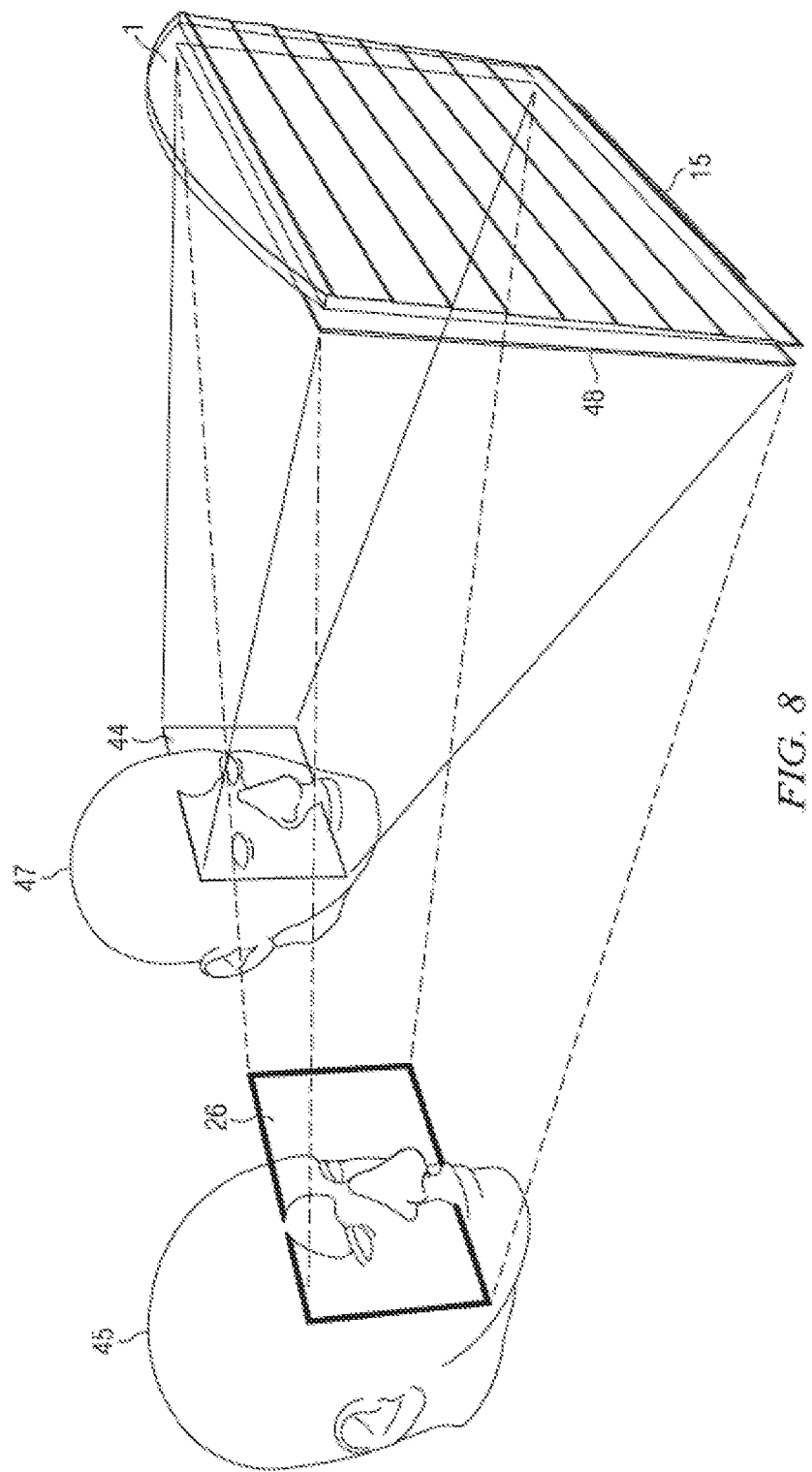
FIG. 8 is a schematic diagram illustrating a multi-viewer directional display device, in accordance with the present disclosure.

FIG. 8 is a schematic diagram illustrating one embodiment of a multi-viewer directional display device as an example including an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images may be displayed in sequence and in synchronization with sources whose light is directed toward the two viewers one image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in viewing window 26 will perceive a first image while an observer with both eyes in viewing window 44 will perceive a second image.

Figure 9:
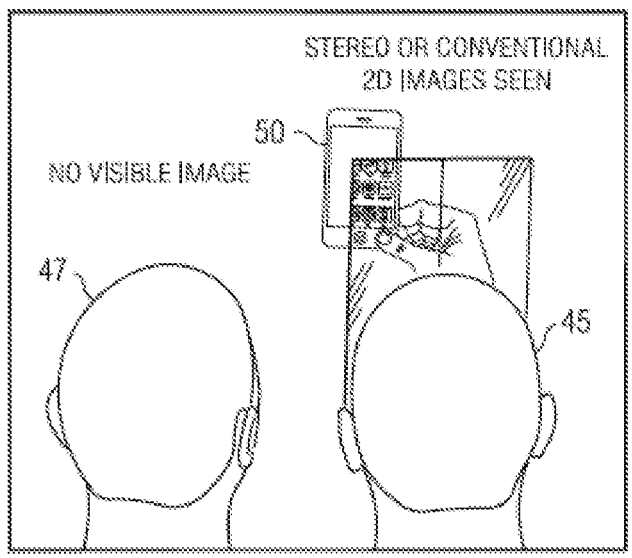
FIG. 9 is a schematic diagram illustrating a privacy directional display device, in accordance with the present disclosure.

FIG. 9 is a schematic diagram illustrating a privacy directional display device which includes an imaging directional backlight. 2D display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
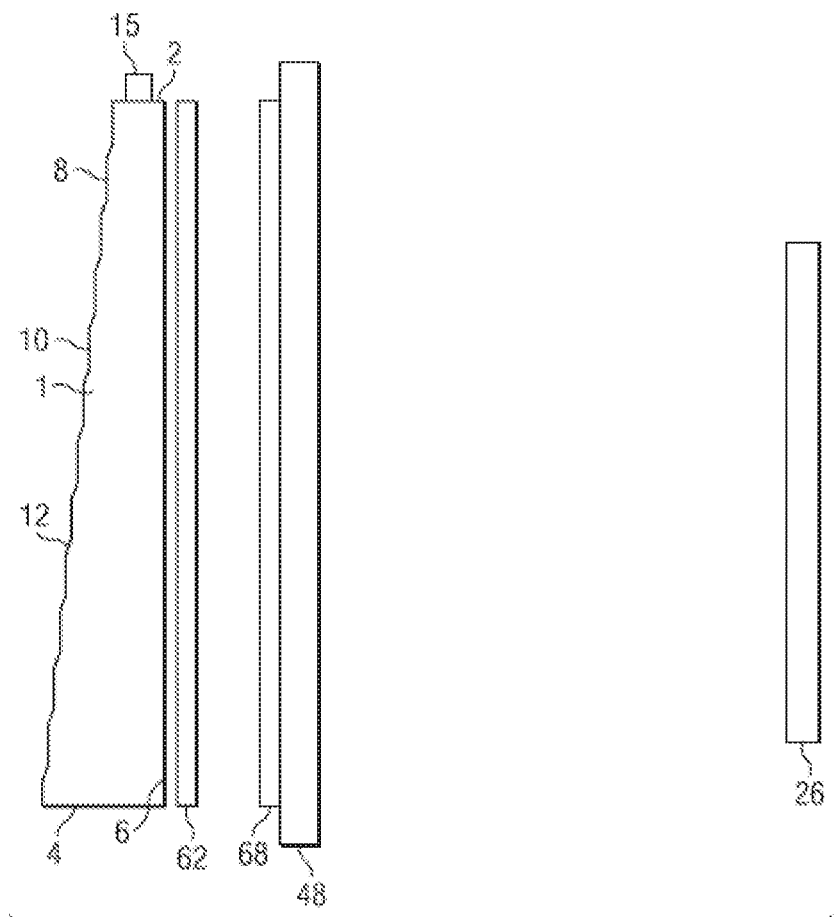
FIG. 10 is a schematic diagram illustrating in side view, the structure of a directional display device, in accordance with the present disclosure.

FIG. 10 is a schematic diagram illustrating in side view the structure of a time multiplexed directional display device as an example including an imaging directional backlight. Further, FIG. 10 shows in side view an autostereoscopic directional display device, which may include the stepped waveguide 1 and a Fresnel lens 62 arranged to provide the viewing window 26 for a substantially collimated output across the stepped waveguide 1 output surface. A vertical diffuser 68 may be arranged to extend the height of the viewing window 26 further and to achieve blurring in directions in the vertical direction, for example, parallel to the x-axis, while minimizing blurring in directions in the lateral direction, for example, y axis. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner, in one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

Thus, FIGS. 1 to 10 variously describe: a waveguide 1, a directional backlight comprising such a waveguide 1 and an illuminator array 15, and a directional display device including such a directional backlight and an SLM 48. As such the various features disclosed above with reference to FIGS. 1 to 10 may be combined in any combination.

Figure 11:
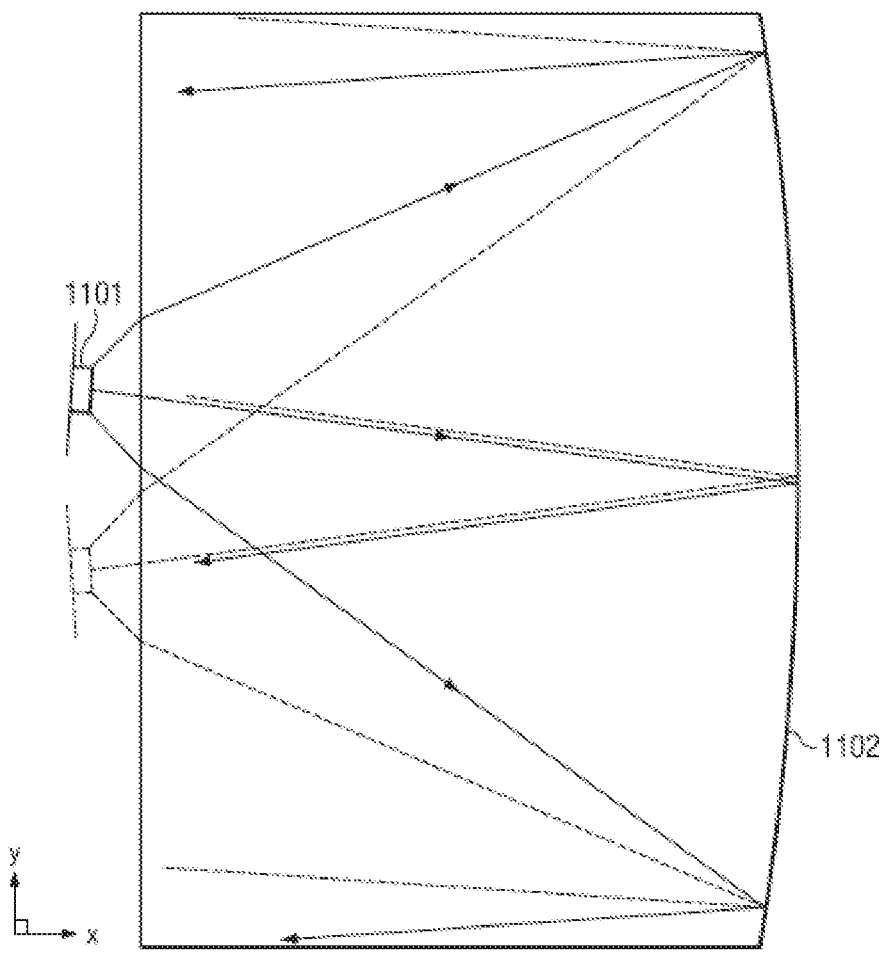
FIG. 11 is a schematic diagram illustrating a front view of a wedge type directional backlight, in accordance with the present disclosure.
Figure 12:
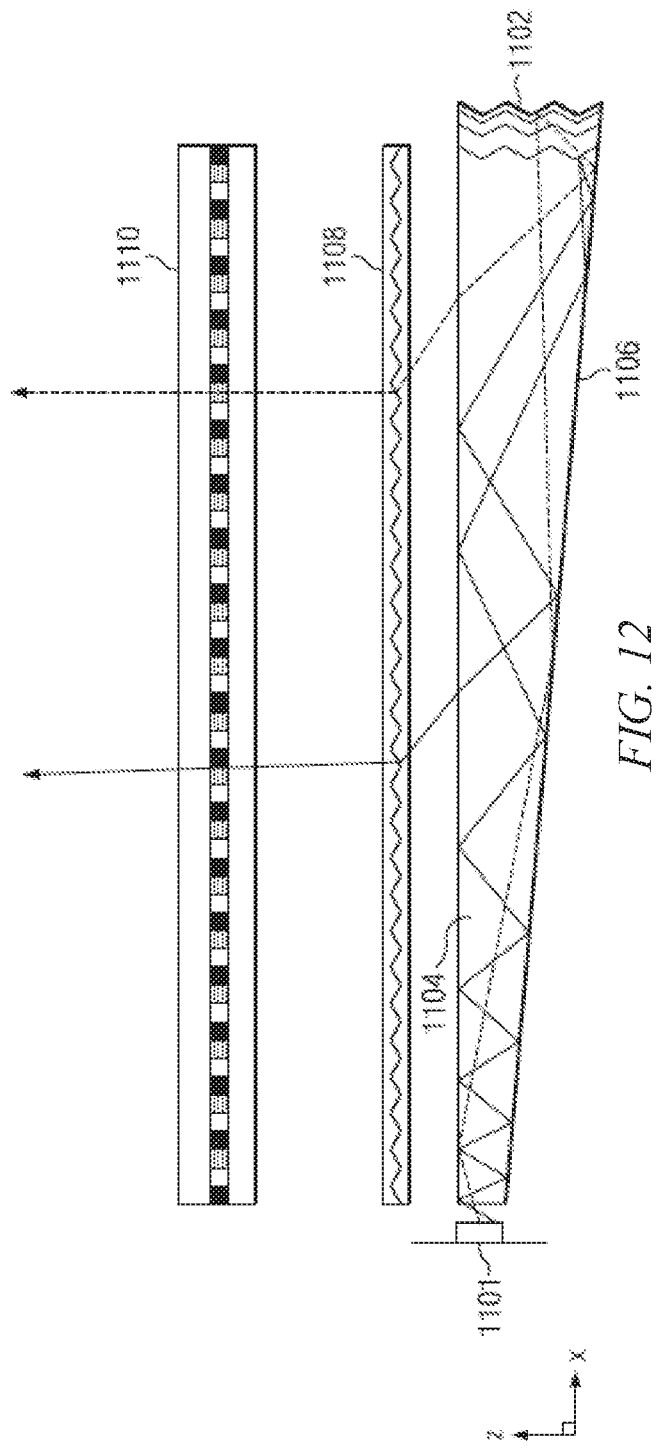
FIG. 12 is a schematic diagram illustrating a side view of a wedge type directional display device, in accordance with the present disclosure.

FIG. 11 is a schematic diagram illustrating a front view of another imaging directional backlight, as illustrated, a wedge type directional backlight, and FIG. 12 is a schematic diagram illustrating a side view of a similar wedge type directional display device. A wedge type directional backlight is generally discussed by U.S. Pat. No. 7,660,047 and entitled "Flat Panel Lens," which is herein incorporated by reference in its entirety. The structure may include a wedge type waveguide 1104 with a bottom surface which may be preferentially coated with a reflecting layer 1106 and with an end corrugated surface 1102, which may also be preferentially coated with a reflecting layer 1106. As shown in FIG. 12, light may enter the wedge type waveguide 1104 from local sources 1101 and the light may propagate in a first direction before reflecting off the end surface. Light may exit the wedge type waveguide 1104 while on its return path and may illuminate a display panel 1110. By way of comparison with an optical valve, a wedge type waveguide provides extraction by a taper that reduces the incidence angle of propagating light so that when the light is incident at the critical angle on an output surface, it may escape. Escaping light at the critical angle in the wedge type waveguide propagates substantially parallel to the surface until deflected by a redirection layer 1108 such as a prism array. Errors or dust on the wedge type waveguide output surface may change the critical angle, creating stray light and uniformity errors. Further, an imaging directional backlight that uses a mirror to fold the beam path in the wedge type directional backlight may employ a faceted mirror that biases the light cone directions in the wedge type waveguide. Such faceted mirrors are generally complex to fabricate and may result in illumination uniformity errors as well as stray light.

The wedge type directional backlight and optical valve further process light beams in different ways. In the wedge type waveguide, light input at an appropriate angle will output at a defined position on a major surface, but light rays will exit at substantially the same angle and substantially parallel to the major surface. By comparison, light input to a stepped waveguide of an optical valve at a certain angle may output from points across the first side, with output angle determined by input angle. Advantageously, the stepped waveguide of the optical valve may not require further light re-direction films to extract light towards an observer and angular non-uniformities of input may not provide non-uniformities across the display surface.

There follows a description of some directional display apparatuses including a directional display device and a control system, wherein the directional display device includes a directional backlight including a waveguide and an SLM. In the following description, the waveguides, directional backlights and directional display devices are based on and incorporate the structures of FIGS. 1 to 12 above. Except for the modifications and/or additional features which will now be described, the above description applies equally to the following waveguides, directional backlights and display devices, but for brevity will not be repeated.

Figure 13:
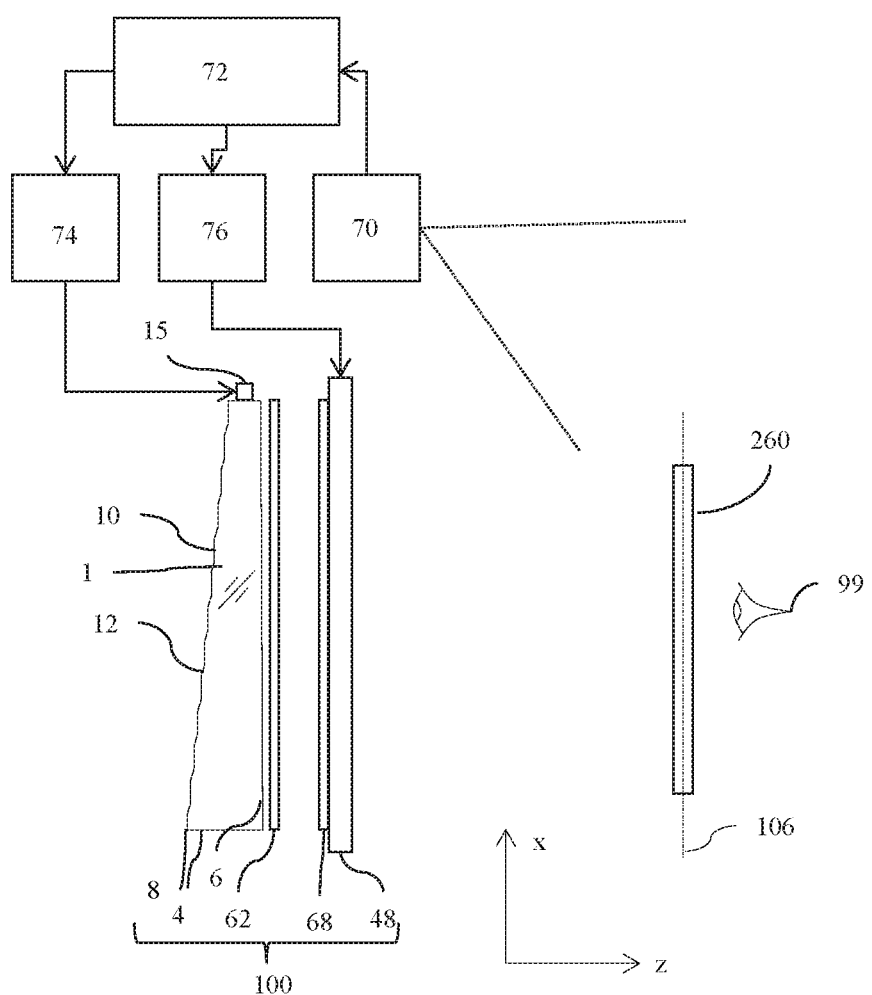
FIG. 13 is a schematic diagram illustrating a control system for an observer tracking directional display apparatus, in accordance with the present disclosure.

FIG. 13 is a schematic diagram illustrating a directional display apparatus comprising a display device 100 and a control system. The arrangement and operation of the control system will now be described and may be applied, changing those elements which may be appropriately changed, to each of the display devices disclosed herein. As illustrated in FIG. 13, a directional display device 100 may include a directional backlight device that may itself include a stepped waveguide 1 and a light source illuminator array 15. As illustrated in FIG. 13, the stepped waveguide 1 includes a light directing side 8, a reflective end 4, guiding features 10 and light extraction features 12. The directional display device 100 may further include an SLM 48.

The waveguide 1 is arranged as described above. The reflective end 4 converges the reflected light. A Fresnel lens 62 may be arranged to cooperate with reflective end 4 to achieve viewing windows 26 at a viewing plane 106 observed by an observer 99. A transmissive SLM 48 may be arranged to receive the light from the directional backlight. Further a diffuser 68 may be provided to substantially remove Moiré beating between the waveguide 1 and pixels of the SLM 48 as well as the Fresnel lens structure 62. Diffuser 68 may be an asymmetric diffuser arranged to provide diffusion in the vertical direction, such as the x-axis, that is greater than the diffusion in the lateral direction, such as the y-axis. Advantageously the display uniformity can be increased and the cross talk between adjacent viewing windows minimized The control system may comprise a sensor system arranged to detect the position of the observer 99 relative to the display device 100. The sensor system comprises a position sensor 70, such as a camera, and a head position measurement system 72 that may for example comprise a computer vision image processing system. The control system may further comprise an illumination controller 74 and an image controller 76 that are both supplied with the detected position of the observer supplied from the head position measurement system 72.

The illumination controller 74 selectively operates the illuminator elements 15 to direct light to into the viewing windows 26 in cooperation with waveguide 1. The illumination controller 74 selects the illuminator elements 15 to be operated in dependence on the position of the observer detected by the head position measurement system 72, so that the viewing windows 26 into which light is directed are in positions corresponding to the left and right eyes of the observer 99. In this manner, the lateral output directionality of the waveguide 1 corresponds with the observer position.

The image controller 76 controls the SLM 48 to display images. To provide an autostereoscopic display, the image controller 76 and the illumination controller 74 may operate as follows. The image controller 76 controls the SLM 48 to display temporally multiplexed left and right eye images. The illumination controller 74 operate the light sources 15 to direct light into respective viewing windows in positions corresponding to the left and right eyes of an observer synchronously with the display of left and right eye images. In this manner, an autostereoscopic effect is achieved using a time division multiplexing technique.

In comparison to directional backlights that comprise light injection at one end, it may be desirable to achieve optimized efficiency of illumination of display area, reduced bezel size and large display sizes with desirable levels of illuminance. As will be described herein such results may be achieved with mid-valve and mid-wedge injection embodiments.

Figure 14A:
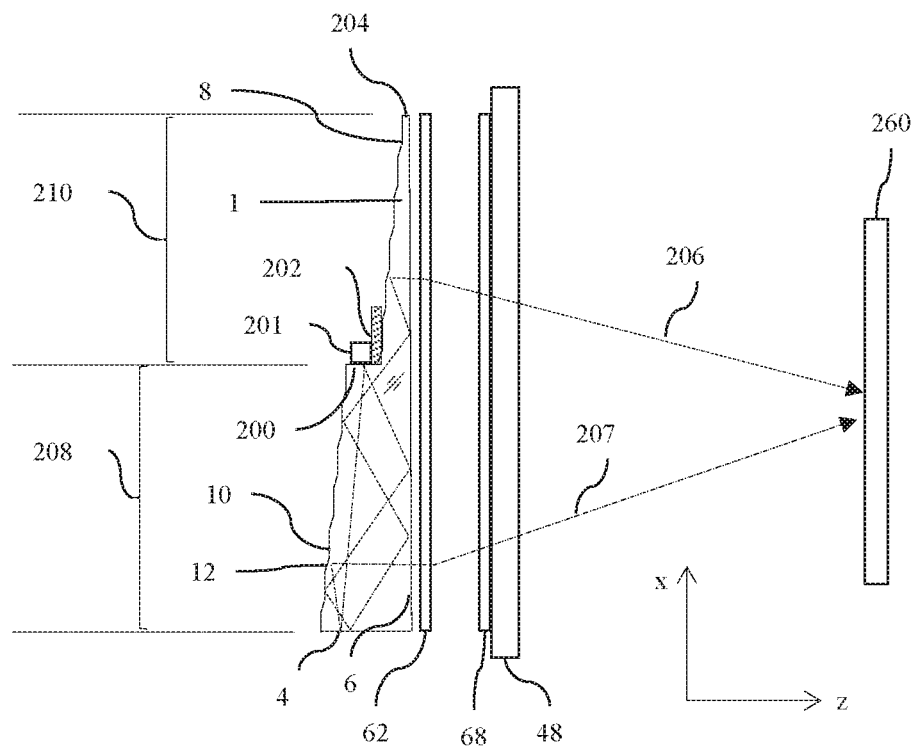
FIG. 14A is a schematic diagram illustrating a side view of a directional display including a directional backlight comprising a mid-valve light input surface, in accordance with the present disclosure.
Figure 14B:
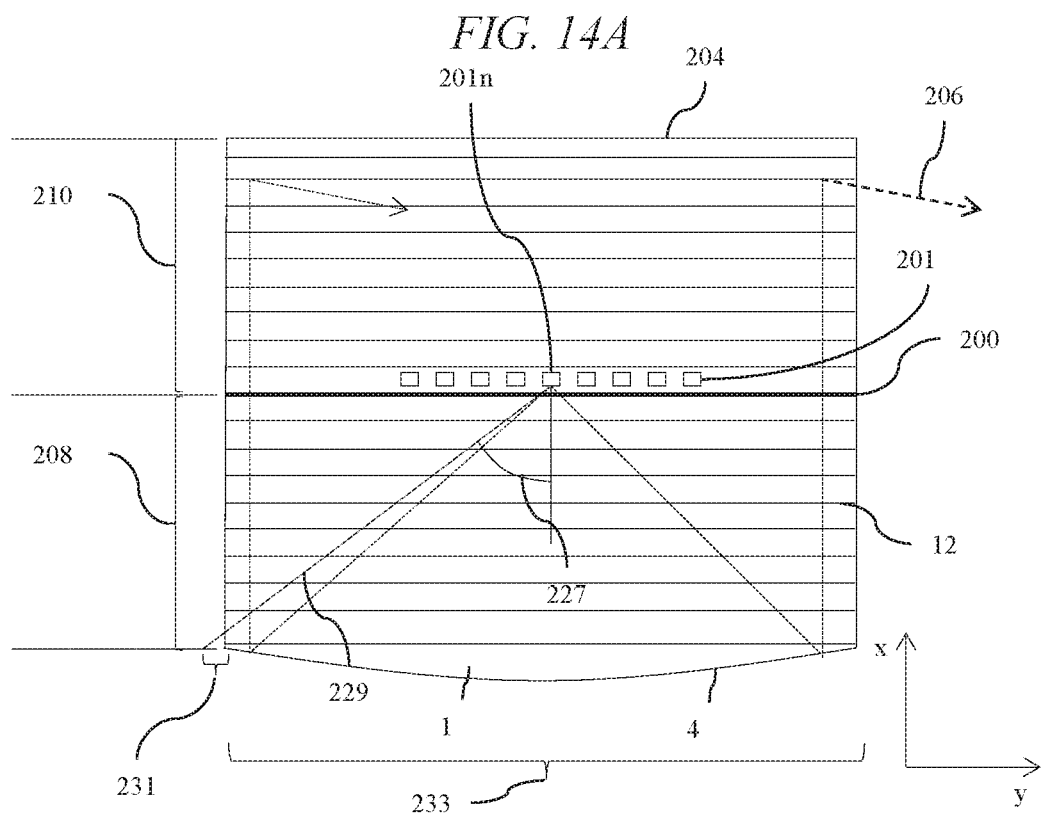
FIG. 14B is a schematic diagram illustrating a front view of a directional display including a directional backlight comprising a mid-valve light input surface, in accordance with the present disclosure.

FIG. 14A is a schematic diagram illustrating a side view of a directional display including a directional backlight comprising a mid-valve light input surface and FIG. 14B is a schematic diagram illustrating a front view of a directional display including a directional backlight comprising a mid-valve light input surface. The directional backlight may include a waveguide 1 comprising first guide surface 6 and second, opposed guide surface 8 for guiding input light along the waveguide 1 similar to that shown in FIG. 2C for example. The first guide surface 6 is arranged to guide light by total internal reflection and the second guide surface 8 comprises a plurality of light extraction features 12 oriented to reflect light guided through the wave guide 1 in directions allowing exit through the first guide surface 6 as the output light and intermediate regions 10 between the light extraction features 12 that are arranged to direct light through the waveguide 1 without extracting it. The second guide surface 8 may have a stepped shape comprising facets 12, which may be the light extraction features, and the intermediate regions 10. The reflective end 4 has positive optical power in the lateral direction such as the y-axis. Transmissive spatial light modulator 48 is arranged to receive the output light from the first guide surface 6 and to modulate it to display an image. The at least one light source may comprise an array of light sources arranged to generate the input light at respective input positions in a lateral direction across the waveguide. The array of light sources may be arranged in a curve.

An array 201 of at least one light source is arranged to generate the input light at different input positions in a lateral direction (y-axis) across the waveguide 1. In the present embodiments, the light source will typically be arranged, however as will be described one light source may be arranged.

Further at least one light source may be arranged to generate the input light at a predetermined input position in a lateral direction across the waveguide 1. The waveguide 1 further comprises a reflective end 4 for reflecting the input light back through the waveguide 1, the second guide surface 8 being arranged to deflect the input light after reflection from the reflective end 4 as output light through the first guide surface 6, and the waveguide 1 being arranged to direct the output light into an optical window 260 in an output direction that is positioned in a lateral direction, such as the y axis, in dependence on the input position of the input light. The at least one light source of the array 201 is arranged to inject the input light into the waveguide 1 through the second guide surface 8 partway along the waveguide 1.

The second guide surface may comprise at least two parts 208, 210 each extending partway along the waveguide 1, being separated perpendicular to the lateral direction for example, the z-axis, by an input aperture, the at least one light source of the array 201 being arranged to inject the input light through the input aperture. The input aperture comprises an input facet 200 extending between the two parts 208, 210 of the second guide surface 8, the array 201 of at least one light source being arranged along the input facet 200.

The array 201 of at least one light source is disposed behind one of the parts 210 of the second guide surface 8 and a light shield 202 is arranged between the array 201 of at least one light source and the one of the parts 210 of the second guide surface 8 behind which the array 201 of at least one light source is disposed. Light can thus be input into the waveguide 1 at a position that is not at one end 204 of the waveguide 1. In operation light rays 206 from light source 201n of the array 201 can be directed substantially without loss along the waveguide 1 to the reflective end 4, and returned along the waveguide through the first part 208 and second part 210 to a light extraction facet 12 of the second part 210 at which point it is directed to optical window 260. Other rays 207 may be extracted in the first part 208 and directed to the same optical window 260.

The at least one light source of array 201 may have a Lambertian output and so some light may be directed from the array directly to the second part 210 of the waveguide 1 and may further be scattered by the features of the surface 8 and facet 200. It is desirable to minimize or remove visibility of such sources of stray light. The direct visibility of the light emitting elements of the array 201 to observers 99 at the optical windows 260 can be minimized by providing the light shield 202, and thus stray light artifacts from the facet can be reduced, providing an illumination seam of minimal size and with high uniformity between the parts 208, 210 of the waveguide 1.

It may be desirable to achieve efficient illumination of displays with varying aspect ratios. Typically the at least one light source of array 15 such as LEDs may be arranged to operate in air and achieve a substantially Lambertian variation of luminous intensity with viewing angle. Such LEDs incident on a waveguide will typically refract to produce a cone of light with limiting rays 229 at the critical angle 227 of the material of the waveguide. It is desirable that the aperture 233 of the reflective end 4 is filled by light from the array 15 with a relatively small overfill 231 to optimize efficiency. The aspect ratio of such illumination condition, given by the ratio of aperture 233 to part 208 height is close to 16:9. Larger aspect ratios can be achieved by incorporating diffusers at the input aperture; however such diffusers can also create light loss.

In some embodiments it may be desirable to achieve smaller aspect ratios, for example 1:1 aspect ratios for use in foldable displays as will be described below. Such displays may provide a large overfill 231 if the at least one light source was arranged at the end 204 of the waveguide and so may be inefficiently illuminated. The present embodiments can provide array 201 to be positioned at a controlled distance from the end 4 that is independent of total waveguide length and thus achieve placement of array 201 to achieve efficient illumination in displays with small aspect ratios.

It may further be desirable to reduce the size of LEDs that may be appropriate to provide desirable optical window 260 pitch. This may be achieved by providing achieve larger array 201 magnification to the viewing windows 260 by providing array 201 between the ends 204, 4 than may be achieved if the at least one light source are arranged at the end 204. Thus the present embodiments can achieve larger optical window 260 pitch for a given light source size, reducing light source cost and enabling further tuning of optical window geometry for given display conditions.

Such a directional backlight can be used in cooperation with the control system of FIG. 13 so that a control system may be arranged to selectively operate the at least one light source of the array 15 to direct light into varying optical windows 260 corresponding to said output directions.

The control system may be further arranged to control the display device 48 to display temporally multiplexed left and right images and synchronously to direct the displayed images into viewing windows in positions corresponding to left and right eyes of an observer to achieve autostereoscopic operation of the display.

The directional backlight of the present embodiments may direct light into a smaller cone of light than a conventional 2D backlight. It has been appreciated that such displays may be arranged to provide display luminance for a given power consumption that is much higher than the luminance that can be achieved in a conventional 2D backlight for the same power consumption. In an illustrative example, a 4" diagonal display using two 50 lumen LEDs running at 1.2 W total power consumption and a 6.5% LCD panel transmission has been demonstrated to achieve a luminance of greater than 2000 nits display luminance compared to a conventional 2D display backlight that can achieve a 500 nit luminance for the same power consumption. Further, reducing the backlight power consumption can achieve a given display luminance for lower power than a conventional 2D backlight. Thus a 500 nit luminance may be provided by the present directional backlight with a power consumption of 300 mW. The control system may thus be arranged to direct a high brightness 2D image or a low power consumption 2D image The control system may further comprise a sensor system arranged to detect the position of an observer across the display device, and the control system may be arranged to selectively operate the at least one light source of the array 15 to direct the displayed left and right images into viewing windows 26 in positions corresponding to left and right eyes of an observer being performed in dependence on the detected position of the observer.

Figure 15A:
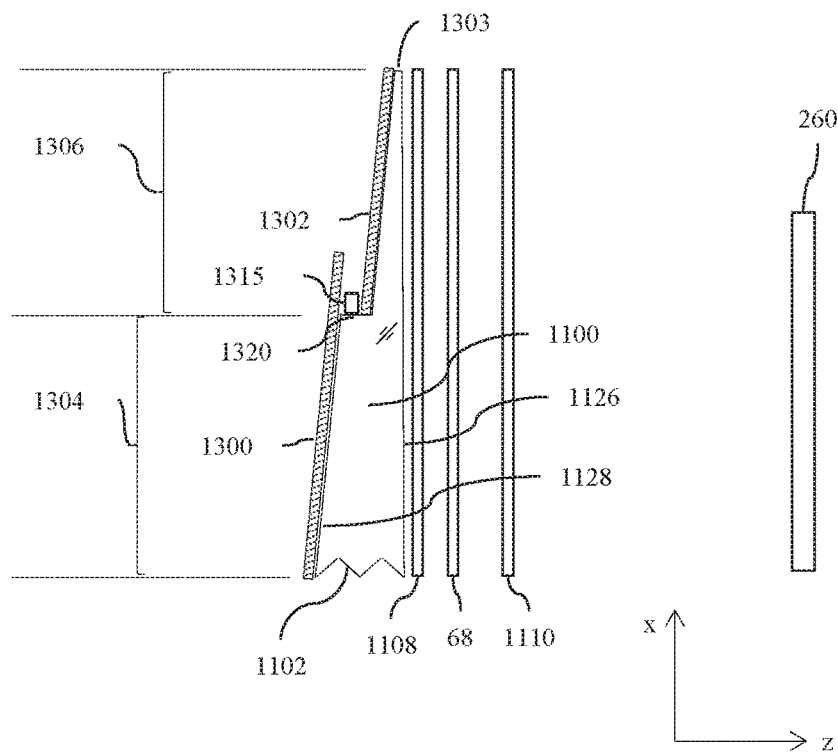
FIG. 15A is a schematic diagram illustrating a side view of a directional display including a directional backlight comprising a mid-wedge light input surface, in accordance with the present disclosure.
Figure 15B:
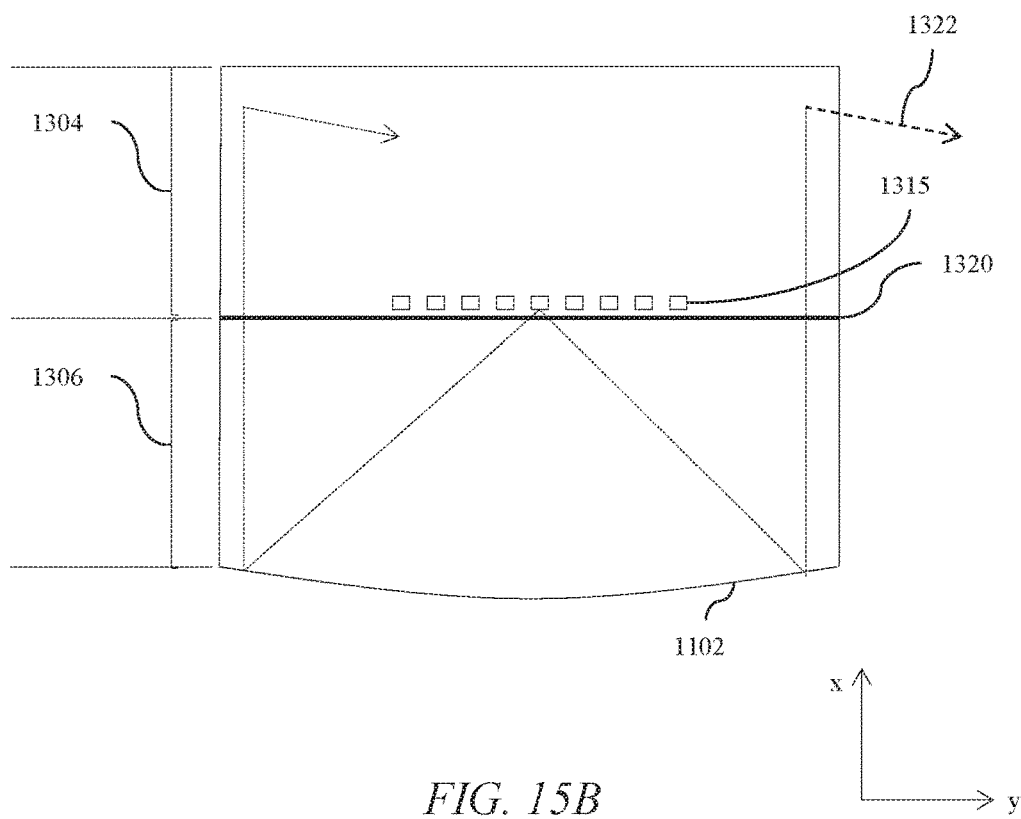
FIG. 15B is a schematic diagram illustrating a front view of a directional display including a directional backlight comprising a mid-wedge light input surface, in accordance with the present disclosure.

FIGS. 15A-15B are schematic diagrams illustrating a front view and a side view respectively of a directional display including a directional backlight comprising a mid-wedge light input facet 1320. Such a directional backlight operates in a similar manner to that illustrated in FIG. 12. A first guide 1126 surface is arranged to guide light by total internal reflection and the second guide surface 1128 is substantially planar and inclined at an angle to reflect light in directions that break the total internal reflection for outputting light through the first guide surface 1126, and the display device further comprises a deflection element 1108 extending across the first guide surface 1126 of the waveguide 1100 for deflecting light towards the normal to the spatial light modulator 1110. Input aperture is provided by a facet 1320 and an array 1315 of at least one light source is arranged to direct light rays 1322 to viewing window 260. First part 1306 of the waveguide 1100 may be provided with a planar mirror 1300 and second part 1306 may further be provided with planar mirror 1302. The mirrors may operate to direct light transmitted through the rear of the waveguide 1100 back in the direction of the light deflection element 1108 and to the optical window 260. In operation the mirror 1302 may further provide a light shield between the at least one light source of the array 1315 to observers at the viewing windows 260. A light absorbing shield may be arranged between the array 1315 and the mirror 1302 to further reduce stray light from the array 1315.

FIGS. 16A-16E are schematic diagrams illustrating side views of mid-valve light input surfaces in the region of the input aperture for light injection. The arrangements as shown are with respect to mid-valve injection embodiments, however may also be applied to mid-wedge injection embodiments. As shown in FIG. 16A, the array 201 may be arranged with an input facet at the input aperture that is substantially planar and orthogonal to the planar light guiding surface 6. High angle light rays 241 in principle may be guided within the waveguide 1. However, features 243 with imperfections and feature roundness may provide stray light rays 245 that may be directed towards the optical windows 260 and create a seam artifact in the region of the input aperture.

FIGS. 1613 and 16C, illustrate that the facets 242, 246 may be rotated so that off-axis rays are directed slightly off-axis which may advantageously move the position of the stray light in the system away from the optimum viewing position so that the seam visibility is reduced for desirable viewing angles.

FIGS. 16D and 16E illustrate that the directional backlight further comprises an injection waveguide portion 236 arranged between the array 201 of at least one light source and the input aperture to guide input light from the at least one light source to the input aperture for injection of the input light through the input aperture. The injection waveguide portion 236 may be a separate element from the waveguide 1. The input facet 246 may be arranged with a tilt that is aligned to the tilt of the output facet 237 of the waveguide 236 and said tilt may be further arranged to direct stray light away from viewing windows, for example to the rear of the directional backlight. Such an arrangement may advantageously further reduce the visibility of the stray light seam from the array 201. In particular the region of highest light source intensity and thus stray light is hidden from the observer 99 by the light shield 202.

FIG. 17 is a schematic diagram illustrating a front view of a directional display including a directional backlight comprising a mid-valve light input surface arranged to reduce bezel size. In comparison to arrangements in which the light source array 201 is arranged at the end 2 of the waveguide, as shown in FIG. 2C for example, the array 201 can be placed under the waveguide 1, and thus the bezel 400 of the backlight can be further reduced. Further the array 201 can be arranged under the thinnest portion of the waveguide 1, achieving a compact design for displays such as mobile displays.

Figure 18A:
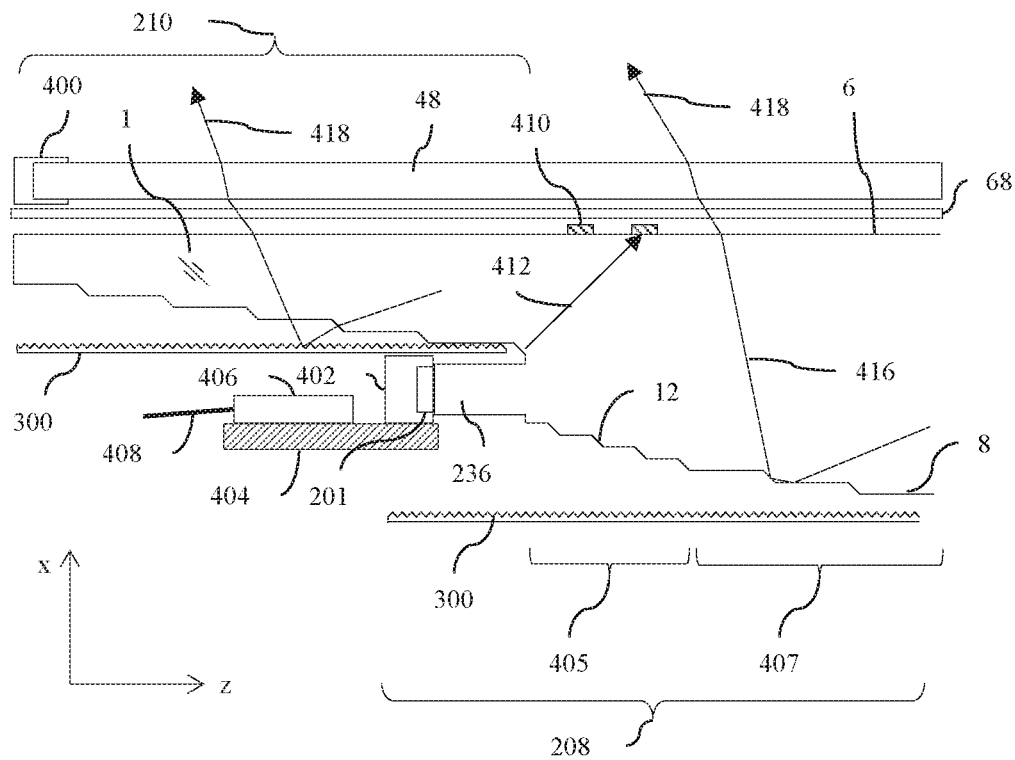
FIGS. 18A-18C are schematic diagrams illustrating side views of a directional display including a directional backlight comprising a mid-valve light input structures, in accordance with the present disclosure.
Figure 18B:
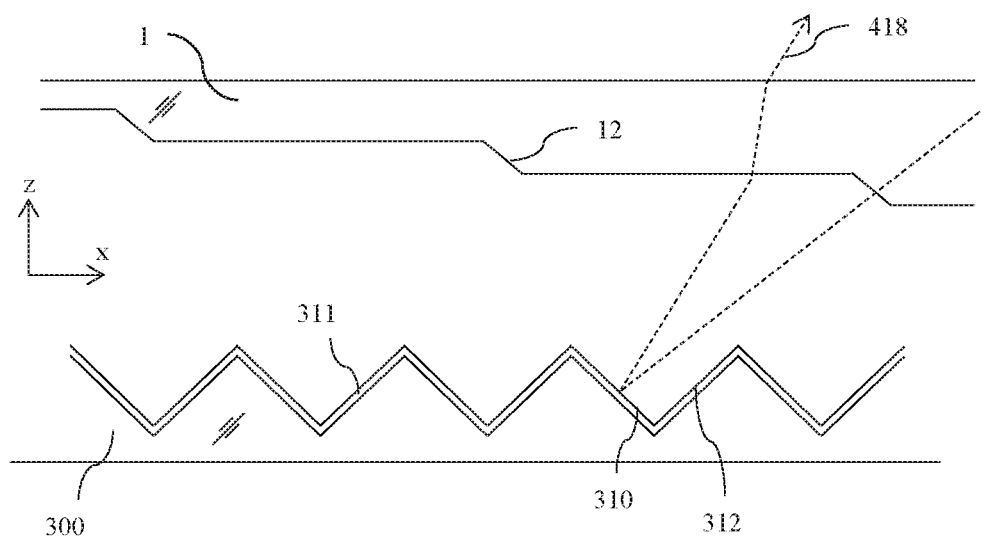
Figure 18C:
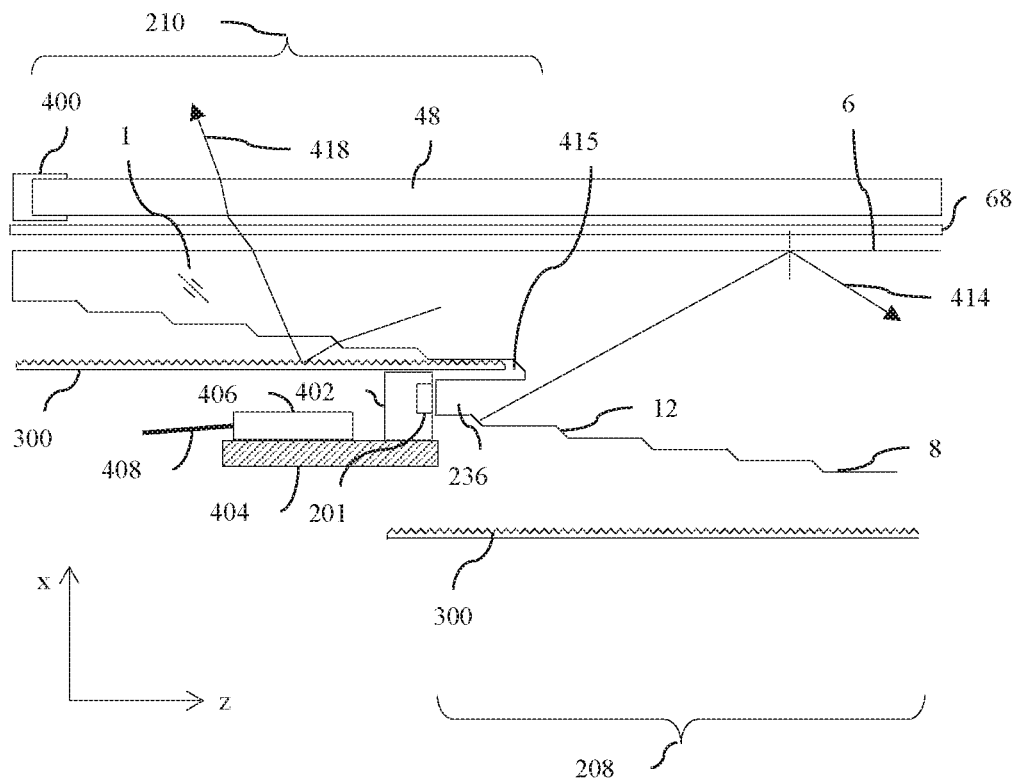

FIGS. 18A-18C are schematic diagrams illustrating side views of a directional display including a directional backlight comprising mid-valve light input structures and operation of rear reflectors. Rear reflectors are described in co-pending U.S. patent application Ser. No. 13/939,053 (RealD Ref. No.: 95194936.335001) herein incorporated by reference in its entirety. A respective rear reflector 300 is arranged behind each of the parts 208, 210 of the second guide surface 8, each rear reflector 300 comprising an array of reflective facets 310 arranged to reflect light rays 418 from the array 201 of at least one light source, that is transmitted through the plurality of facets 12 of the waveguide 1, back through the waveguide 1 to exit through the first guide surface 6 into said optical windows 260. As illustrated in FIG. 18B, in operation light rays 418 that are transmitted by light extraction features 12 are incident on reflective facets 310 are redirected through the waveguide 1 towards the optical windows 260. Rear reflector 312 may further comprise facets 312 to achieve a prismatic film structure that can also advantageously be arranged to achieve polarization recirculation and increased brightness. The rear reflector may be formed by means of known fabrication methods including casting or embossing and may have a metallic layer 311 formed on its surface. Such a reflector may advantageously achieve increased display luminance in comparison to arrangements with no rear reflector. Further the rear reflector can provide functions of light shield 202 and increase uniformity in the x-z plane.

FIG. 18A further shows that the injection waveguide portion 236 may be index matched with the waveguide 1 or may be formed integrally with the waveguide 1. Thus the aperture for light injection may not comprise a physical surface. Array 201 may be mounted in package 402 on a metal clad printed circuit board 404 with connector 460 and cable 408. Board 404 may be arranged behind the waveguide and so may be increased in size without increasing the bezel 400 size. The board 404 can be arranged to achieve improved heat-sinking characteristics in comparison to arrangements wherein the array is arranged at the end 2 of the waveguide 1. Thus the efficiency of the light emitting elements of array 201 can be increased.

In the region 405 near to the input aperture and waveguide 236, the spatial density of light extraction features 12 may be increased in comparison to the spatial density of light extraction features in other regions 407. Further light absorbing features 410 may be incorporated on the light guiding surface 6. Features 410 may be arranged to reduce the intensity of stray light 412 from near the input aperture and the increased feature 12 density in region 405 may be arranged to compensate the amount of light directed from features 12 and reflector 300, achieving increased display uniformity in the region near the light injection aperture.

FIG. 18C illustrates a further embodiment wherein the features 12 extend to the waveguide 236 to further achieve high uniformity for off-axis features. Thus slot 415 is arranged to receive rear reflector 300 for the second portion 210. Advantageously the uniformity in the region of the light injection aperture may be increased.

Figure 19:
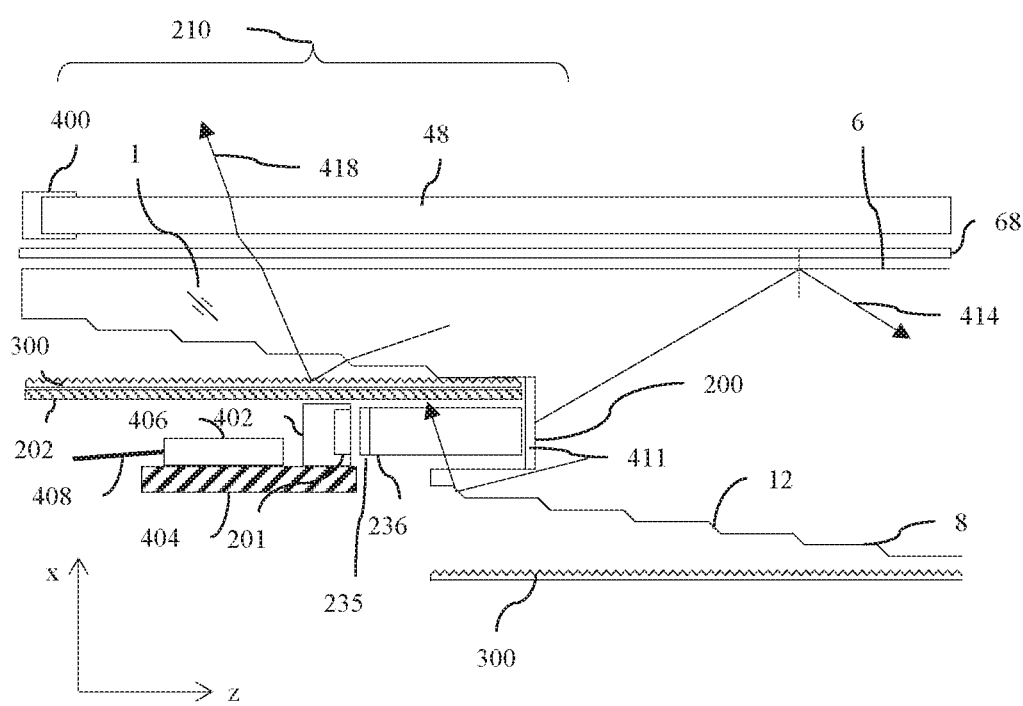
FIG. 19 is a schematic diagram illustrating side views of a directional display including a directional backlight comprising a mid-valve light input structures, in accordance with the present disclosure.

FIG. 19 is a schematic diagram illustrating a side view of a further directional display including a directional backlight which may include mid-valve light input structures. The two parts 208, 210 of the second guide surface 8 overlap in a direction along the waveguide 1. A further light shield 202 may be arranged to achieve a flat rear reflector 300 and to prevent light transmission through the reflector film 300 in the second part 210. Waveguide 236 may comprise an input layer 235 that may comprise at least one of a diffuser, color filter, reflector or other light management layer. Such layers may advantageously be used in combination or individually to increase display brightness, reduce cross talk, improve display spatial uniformity or improve viewing window 26 angular uniformity. A further layer 411 may be arranged at the input aperture between the input facet 200 and waveguide 236. Such a layer may be comprise at least one of a diffuser, color filter or other light management layer and may be arranged to reduce the visibility of stray light at the illumination seam.

Figure 20:
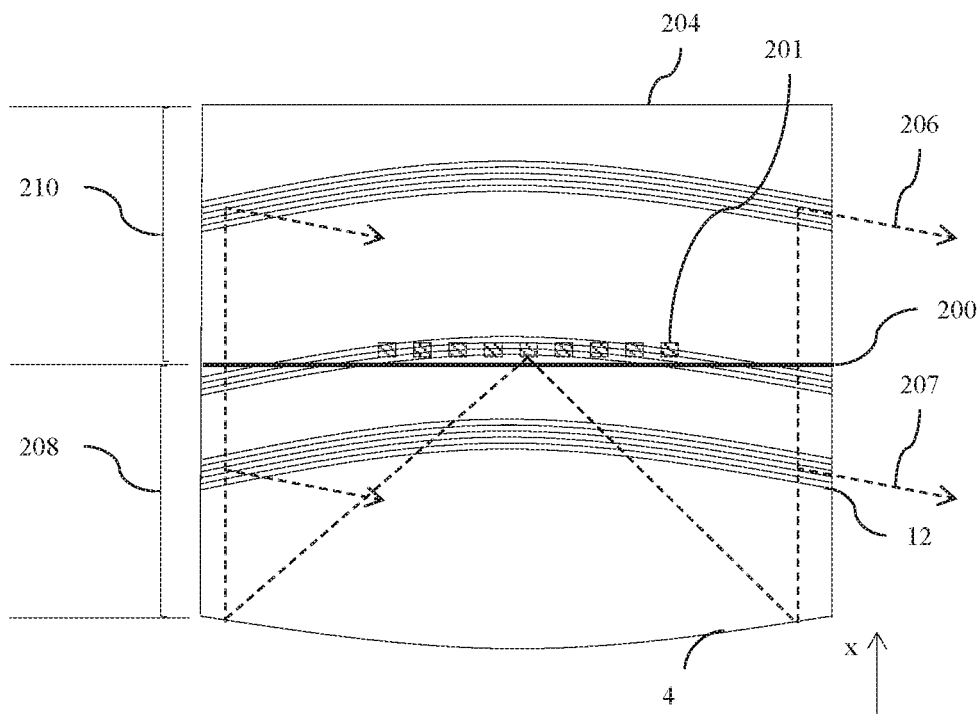
FIGS. 20-21 are schematic diagrams illustrating front views of directional backlights comprising mid-valve light input structures, in accordance with the present disclosure.
Figure 21:
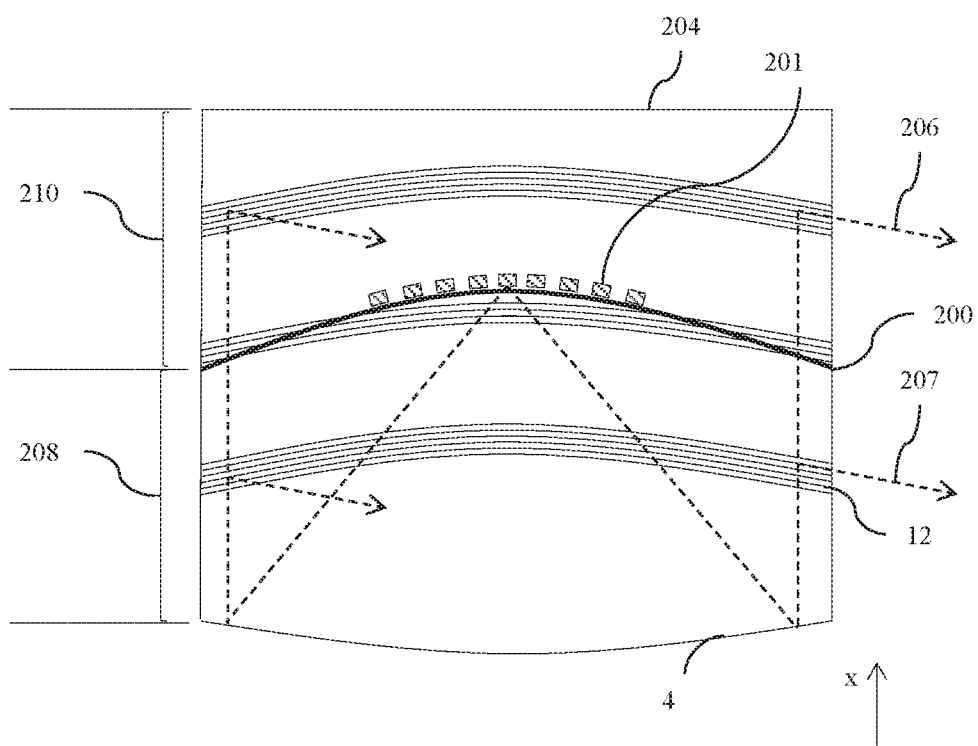

FIGS. 20-21 are schematic diagrams illustrating front views of directional backlights comprising mid-valve light input structures. The light extraction features 12 may be curved in a similar manner to FIG. 4A and thus have positive optical power in the lateral direction, so that Fresnel lens 62 is not required in a directional backlight. FIG. 20 illustrates that the input facet 200 at the input aperture may be linear whereas FIG. 21 shows that the input facet 200 may have a curved shape that may compensate for field aberrations of the end 4 and curved extraction features 12. Advantageously the optical aberrations of the directional backlight maybe reduced for off-axis optical windows, increasing the viewing freedom of the display.

The longitudinal viewing freedom of a directional display is determined at least by the optical window 260 size, interocular separation of viewers 99, nominal distance of the window plane 106, display width and optical aberrations. It is desirable to further increase the longitudinal viewing freedom of directional displays.

The present embodiments teach a stepped structure to illuminate a display area after a second pass through the light guide plate 1. Such structures with a return reflected path advantageously benefit from the hidden fan out of the light propagating from the input facet 200 to the reflective end 4. The present embodiments advantageously achieve reduced visibility of the input facets 200.

Figure 22:
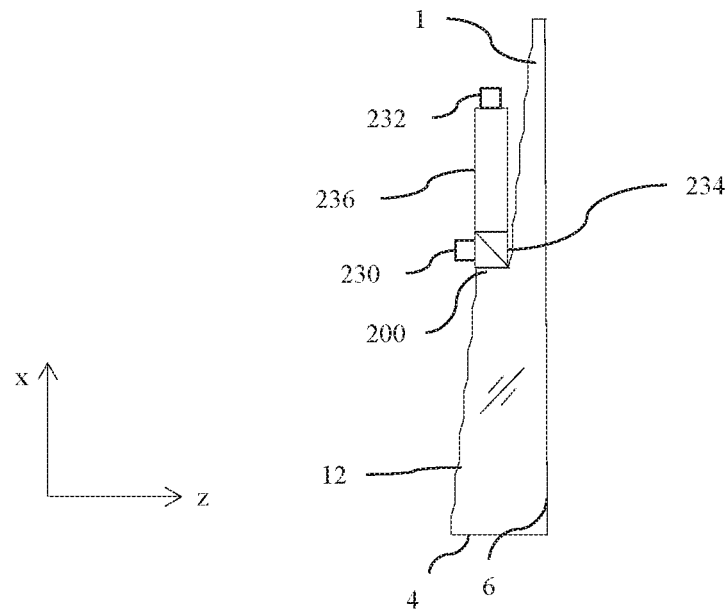
FIG. 22 is a schematic diagram illustrating side views of a directional backlight comprising a further mid-valve light input structure, in accordance with the present disclosure.

FIG. 22 is a schematic diagram illustrating side views of a directional backlight comprising a further mid-valve light input structure. A light combiner 234 is arranged between an array 232 of at least one light source, the injection waveguide portion 236, the input aperture, and a further array 230 of at least one light source arranged to generate input light at different input positions in a lateral direction across the waveguide 1, the at least one light source of the further array 230 being arranged to inject the input light into the waveguide through the light combiner, the further array of at least one light source being closer to the reflective end 4 than the first-mentioned array 232 of at least one light source. Advantageously at least one light source 232 can be arranged at two different distances from the reflective end 4, and thus optical windows may be achieved at two different distances from the directional backlight. As will be described, such windows can be used to extend longitudinal viewing freedom.

Figure 23:
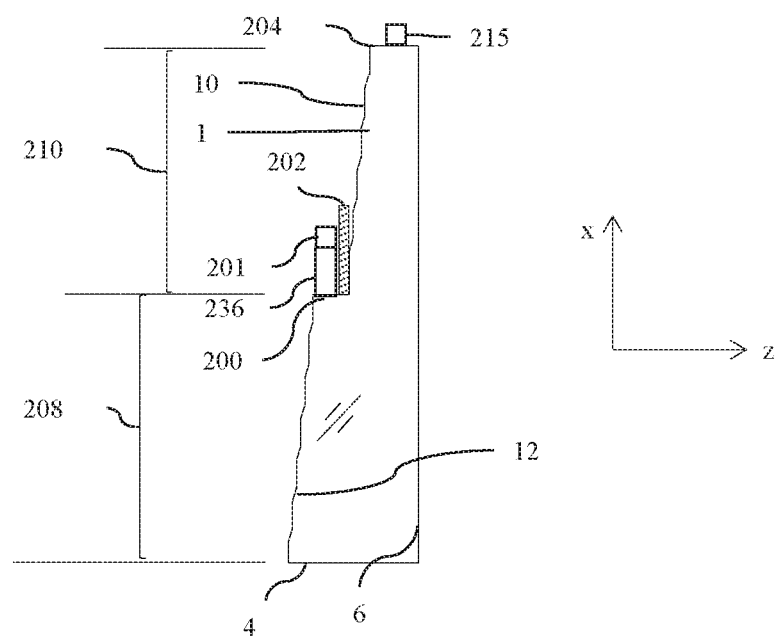
FIG. 23 is a schematic diagram illustrating side views of directional backlights comprising mid-valve light input structures and end-valve input structures, in accordance with the present disclosure.
Figure 24:
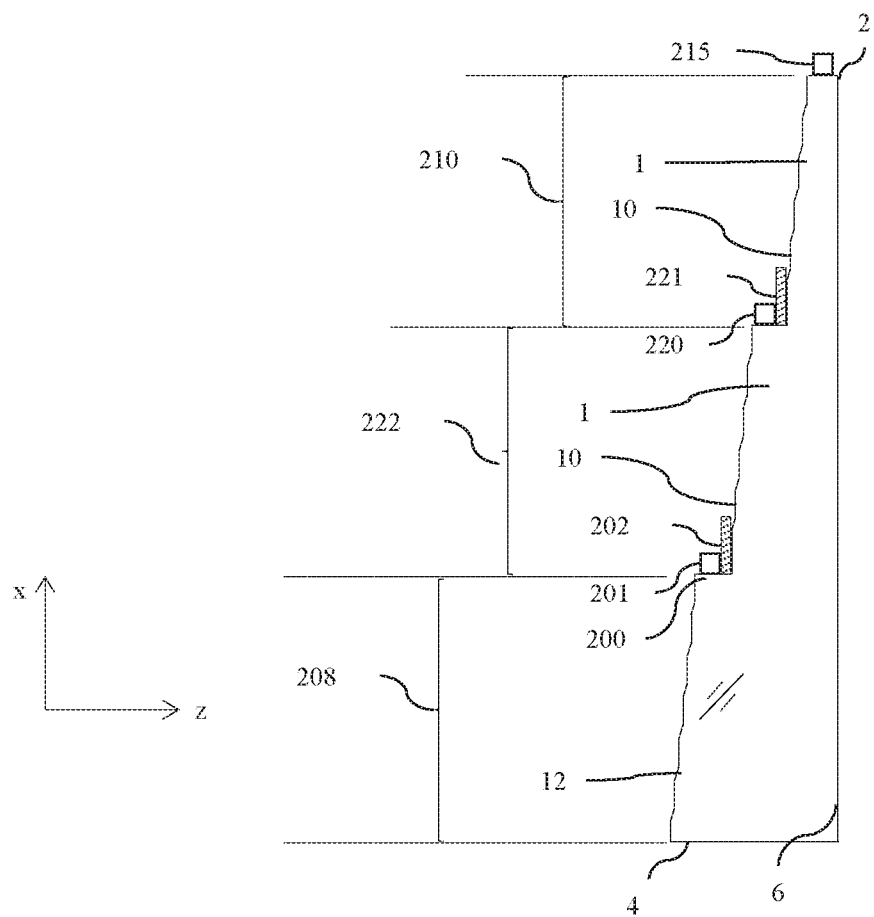
FIG. 24 is a schematic diagram illustrating side views of directional backlights comprising mid-valve light input structures and end-valve input structures, in accordance with the present disclosure.

FIGS. 23-24 are schematic diagrams illustrating side views of directional backlights comprising mid-valve light input structures and end-valve input structures. In FIG. 23 the waveguide 1 has a facing end 2 facing the reflective end 4, and the directional backlight further comprises a further array of at least one light source 215 that is arranged to inject further input light through the facing end 2 into the waveguide 1. The directional backlight may further comprise a further array 201 of at least one light source arranged to generate input light at different input positions in a lateral direction across the waveguide 1, the at least one light source of the further array 201 being arranged to inject the input light into the waveguide 1 through the second guide surface 8 at a position partway along the waveguide 1 at a position that is different from the first mentioned array 215 of at least one light source. FIG. 24 incorporates further section 222 comprising input light source 220 and light shield 221. Thus optical windows may be formed in three different window planes and different respective distances from the backlight.

Figure 25:
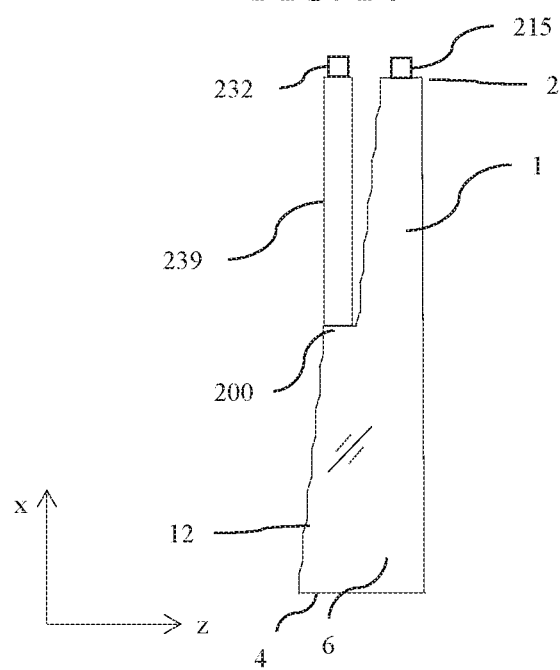
FIG. 25 is a schematic diagram illustrating side views of directional backlights comprising mid-valve light input structures and end-valve input structures, in accordance with the present disclosure.

FIG. 25 is a schematic diagram illustrating a side view of a directional backlight incorporating a waveguide 239 arranged to direct light from array 232 of at least one light source to the waveguide 1 by way of facet 200 arranged at the waveguide input aperture. Such an arrangement can achieve overlapping optical windows with increased brightness in comparison to the arrangements of FIGS. 10 and 14A. Further the optical windows may be offset so that the resolution of window control for a given light source pitch can be increased. Advantageously cross talk and observer flicker for moving observers can be reduced.

Figure 26:
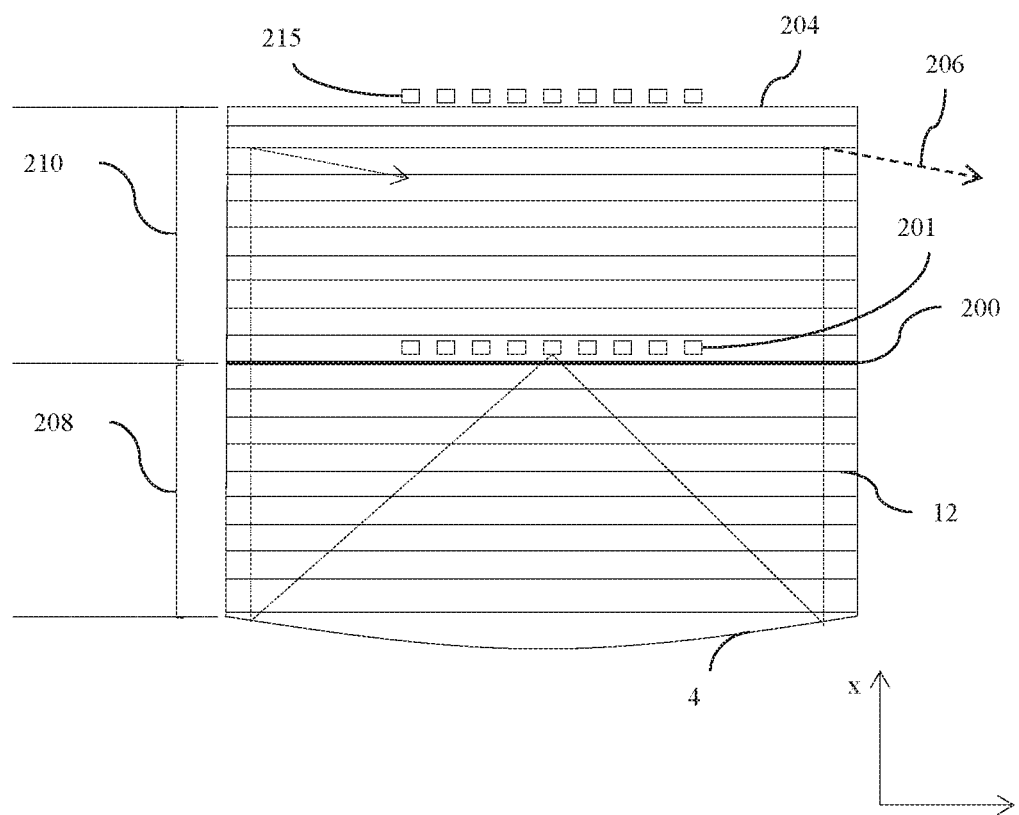
FIG. 26 is a schematic diagram illustrating a front view of the arrangement of FIG. 23, in accordance with the present disclosure.
Figure 27:
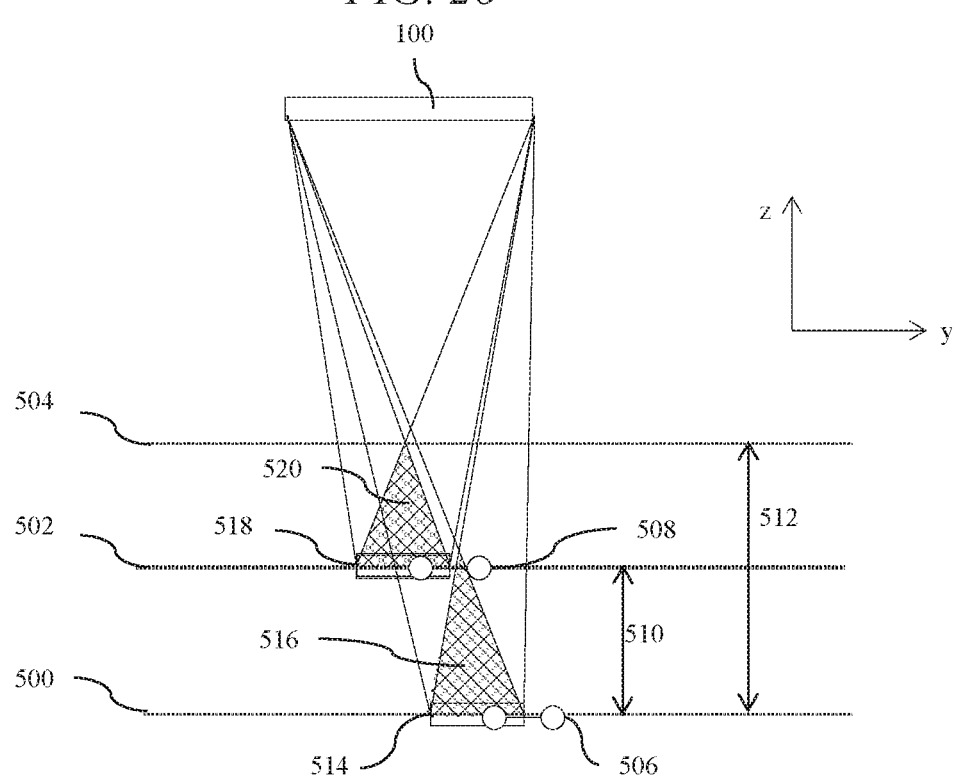
FIG. 27 is a schematic diagram illustrating a top view of viewing windows that may be achieved by the arrangement of FIG. 26, in accordance with the present disclosure.

FIG. 26 is a schematic diagram illustrating a front view of the arrangement of FIG. 23 and FIG. 27 is a schematic diagram illustrating a top view of viewing windows that may be achieved by the arrangement of FIG. 26. Array 201 may be arranged to achieve optical window 514 in window plane 500 for nominal viewer position 506. For observer position 508 array 215 may be arranged to achieve optical window 518 in window plane 502 at a different longitudinal distance, in the z direction, from a display 100 incorporating the directional backlight of FIG. 23. Maximum longitudinal viewing freedom 510 forward from window 514 is shown by region 516 and similarly region 520 indicates the maximum longitudinal viewing freedom for optical window 518, achieving a maximum longitudinal freedom as indicated by line 504. By switching illumination from array 215 to array 201 in correspondence with known observer position, the total longitudinal viewing freedom can thus be increased from distance 510 to distance 512. Advantageously such a display can be more conveniently operated in different viewing environments.

Figure 28:
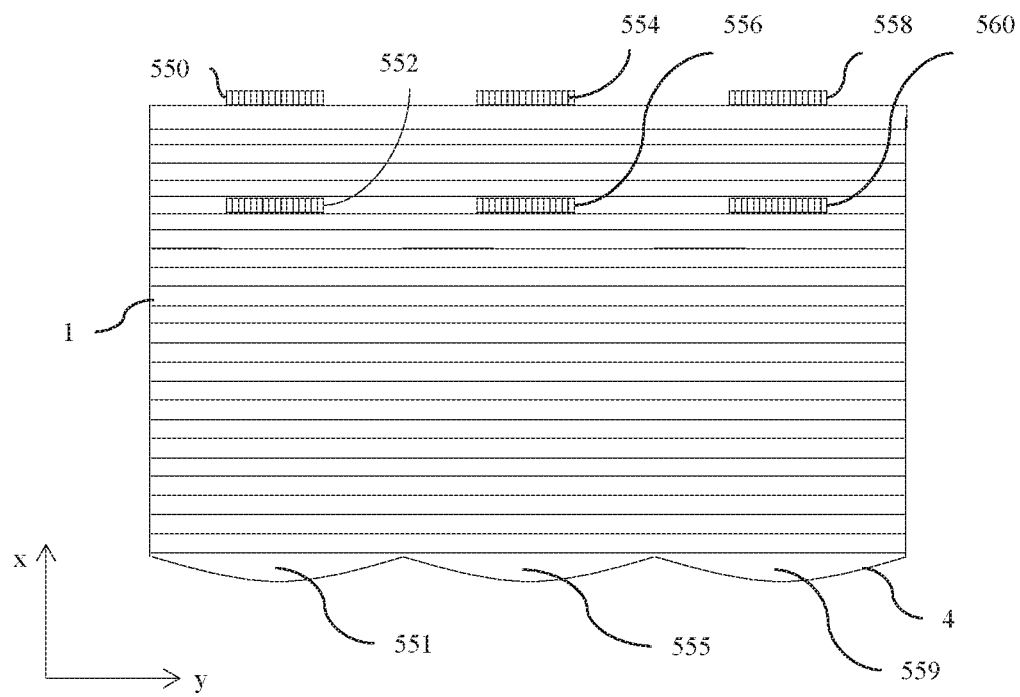
FIG. 28 is a schematic diagram illustrating a front view of a tiled directional light valve comprising mid-valve light input structures, in accordance with the present disclosure.

FIG. 28 is a schematic diagram illustrating a front view of a tiled directional light valve comprising mid-valve light input structures. Waveguide 1 tiles 551, 555, 559 may each have respective first light source arrays 552, 556, 560 and second light source arrays 550, 554, 558 arranged at respective different distances from the reflective ends 4 and achieving viewing windows similar to those shown in FIG. 27.

Figure 29:
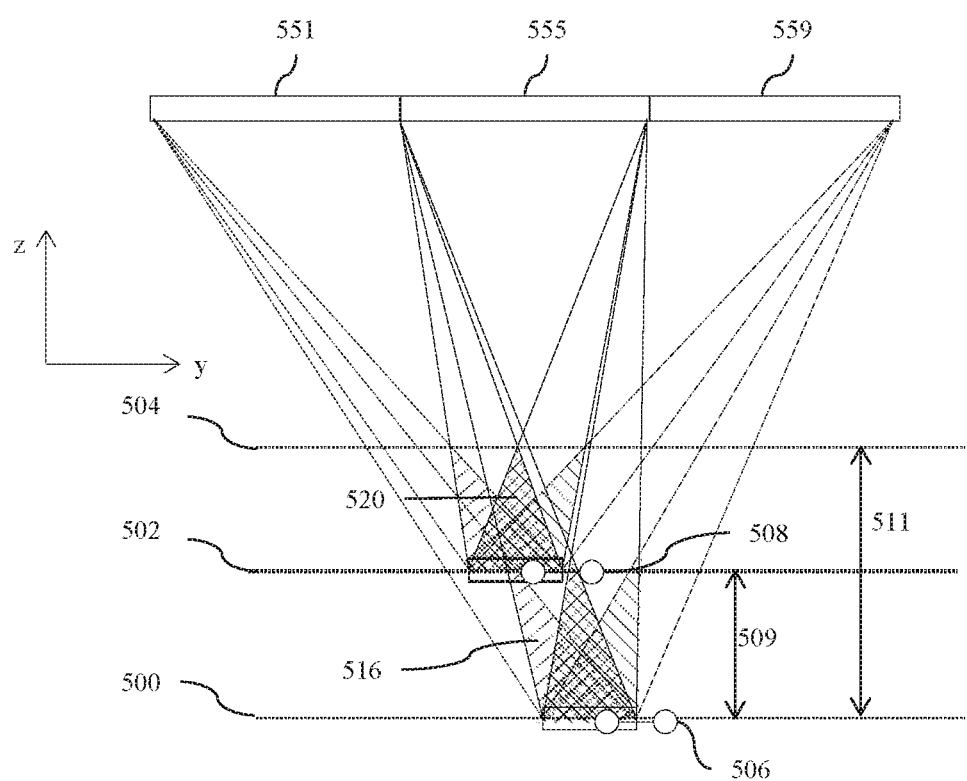
FIG. 29 is a schematic diagram illustrating a top view of a tiled directional light valve comprising mid-valve light input structures, in accordance with the present disclosure.

FIG. 29 is a schematic diagram illustrating a top view of a tiled directional light valve comprising mid-valve light input structures. Thus each tile 551, 555, 559 provides regions 516, 520 of extended viewing freedom over a display that is wider than the single tile of FIG. 27. By way of comparison, a single tile with the width of the combined tiles 551, 555, 559 may have substantially one third of the longitudinal viewing freedom in comparison to the arrangement of FIG. 29. Thus the longitudinal viewing freedom can be enhanced in displays with increased width, for example monitors and televisions.

Figure 30:
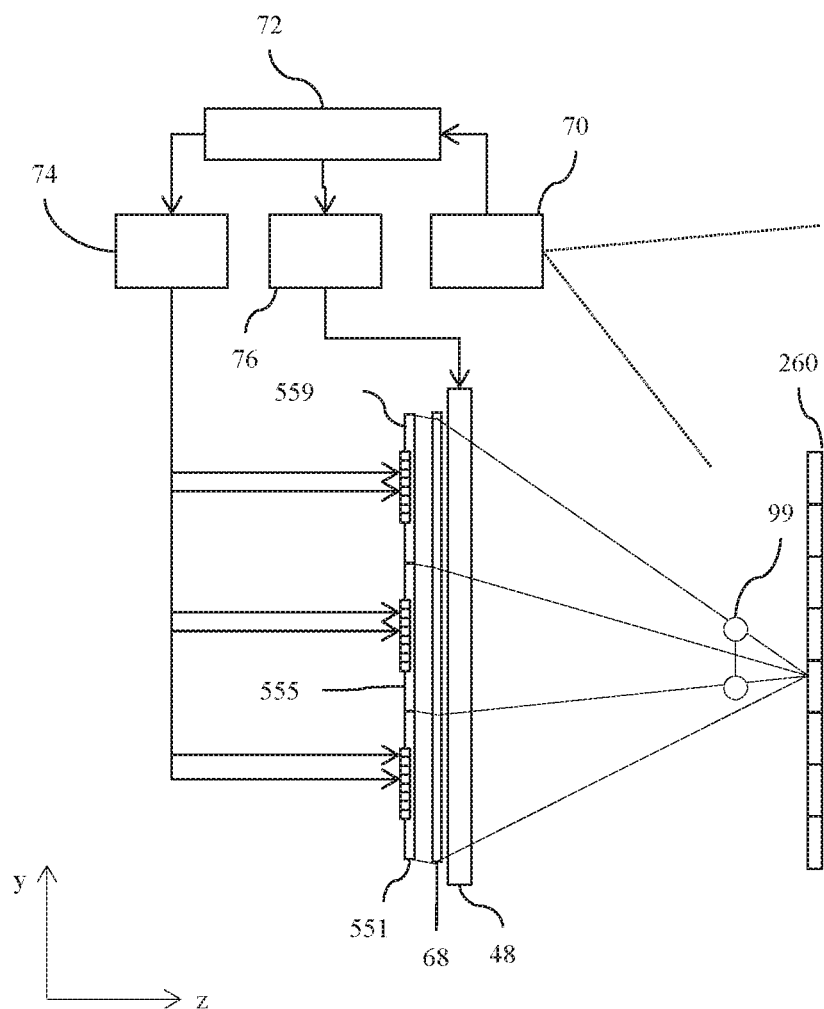
FIG. 30 is a schematic diagram illustrating a control system for a tiled directional light valve comprising mid-valve light input structures, in accordance with the present disclosure.

FIG. 30 is a schematic diagram illustrating a control system for a tiled directional light valve comprising mid-valve light input structures. In comparison to the arrangement of FIG. 13, control signals are provided by light source controller 74 to light source arrays 550, 552, 554, 556, 558, 560 in correspondence with measured lateral and longitudinal position of observer 99. Advantageously the viewing freedom of observer 99 can be substantially increased in comparison to arrangements with single light injection apertures.

The luminous emittance from light sources for directional backlights is constrained by the achievable output of the emitting technology such as LEDs. In an illustrative example, the luminous emittance of an LED may be limited to 30 lm per mm$^2$, Such LEDs cannot typically achieve optical windows that provide a display luminance of 500 nits for a transmissive TFT-LCD display of diagonal 50" when combined with desirable diffusion characteristics. It may be desirable to increase the area of displays while maintaining a high luminance output. Tiling of waveguides each with associated arrays of at least one light source can be used to deliver desirable luminance characteristics in large displays.

It may be desirable to achieve tiled arrays of waveguides in a manner that seams between the waveguides are not visible.

FIG. 31A is a schematic diagram illustrating a side view of a further tiled directional light valve comprising mid-valve light input structures and FIG. 31B is a schematic diagram illustrating a front view of a further tiled directional light valve comprising mid-valve light input structures. Thus the directional backlight may comprise plural sets of a waveguide 250, 252 and an array of at least one light source 258, 259 each arranged in the same manner, the waveguides 1 being tiled. The waveguides may include waveguides that are tiled in a direction perpendicular to the lateral direction with their ends opposite from the reflective end abutting at line 254. A light barrier may further be incorporated at line 254 to prevent leakage between the respective waveguides 250, 252. Alternatively the first and second waveguides 250, 252 may be integrally formed. Advantageously the seam between tiled arrays of waveguides can be reduced or eliminated.

Figure 32:
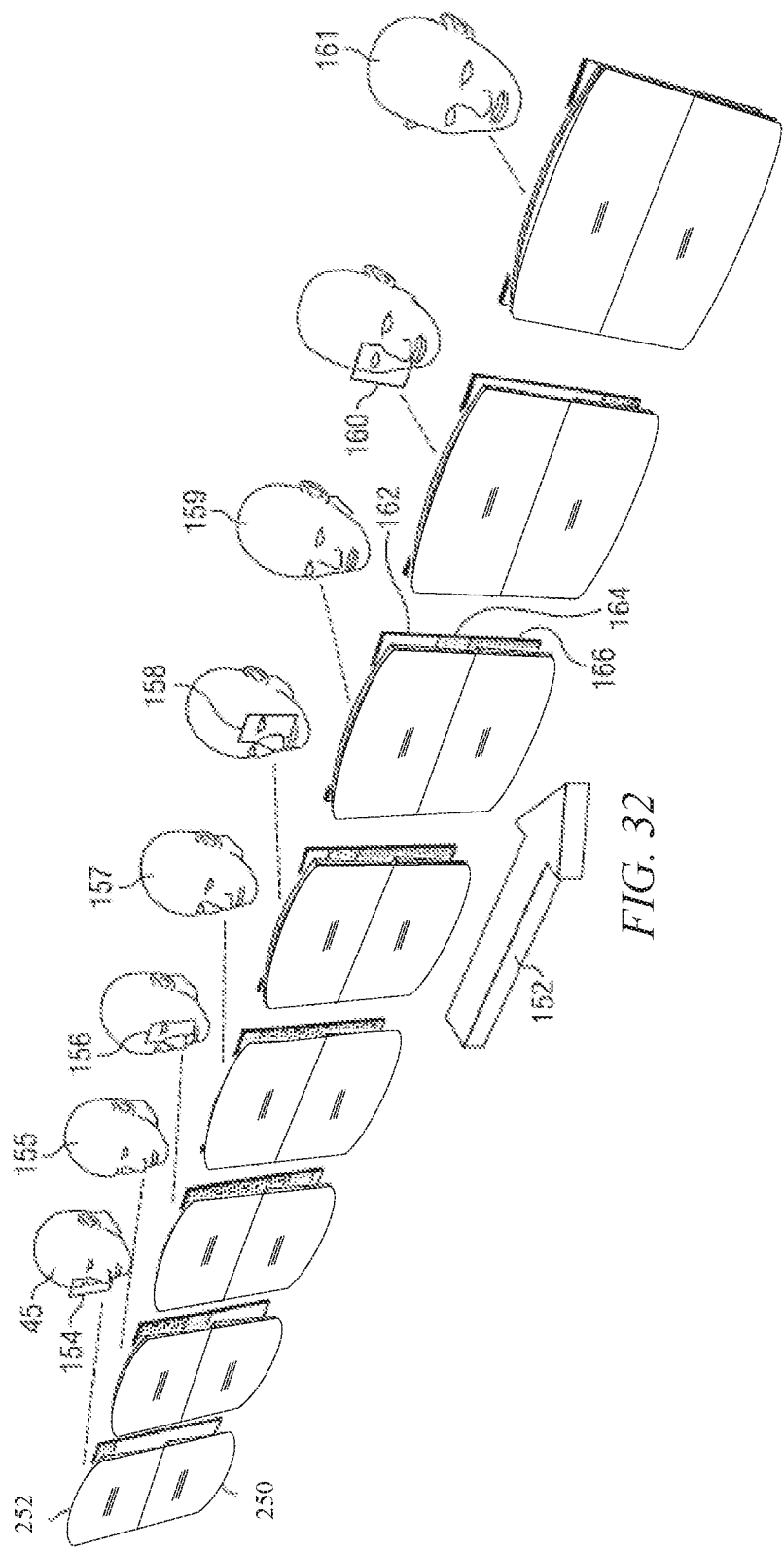
FIG. 32 is a schematic diagram illustrating a scanned illumination directional display comprising tiled directional light valves comprising mid-valve light input structures, in accordance with the present disclosure.

In field sequential autostereoscopic displays, separated top and bottom illumination may significantly improve illumination duty cycle as half-height regions of a line-by-line updated LCD may achieve settled imagery for a significant proportion of the overall frame time. The operation of an offset stacked light emitting element array within an autostereoscopic display system is illustrated schematically in FIG. 32 using the tiled arrangement of FIGS. 31A-B. In a first time slot, the SLM 48 is showing right eye image 162 over most of its height except for the top portion which may include a switching region 164. Thus observer at time slot 154 may have the right eye window illuminated by just the bottom waveguide 250. In the next time slot the display shows a mixture of right image 162, mixed image 164 and left image 166. In time slot 156, the left image appears at the top of the display with mixed region at the bottom so that waveguide 252 may illuminate the left eye window and optical valve 104 may be un-illuminated. In time slot 157 both top and bottom of the display show mixed images so both optical valves may be un-illuminated. In time slot 158 the bottom valve may illuminate the left window, in time slots 159 and 161 neither optical valve may be illuminated, and in time slot 160 the top optical valve 100 may be illuminated for the right eye window. Thus, through the timing sequence each eye may view the left and right eye from the top and bottom of the array of optical valves. Advantageously display brightness may be increased by using larger illumination slot times, and display cross talk may be reduced.

Figure 33:
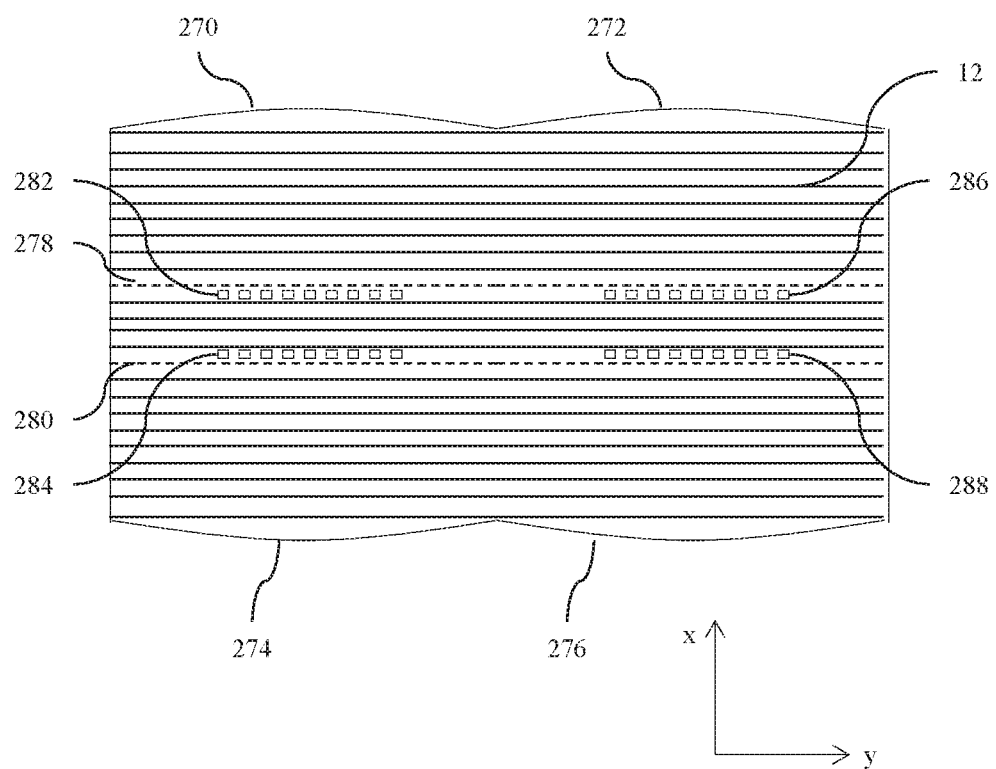
FIG. 33 is a schematic diagram illustrating a front view of a further tiled directional light valve comprising mid-valve light input structures, in accordance with the present disclosure.

FIG. 33 is a schematic diagram illustrating a front view of a further tiled directional light valve comprising mid-valve light input structures. The waveguides 1 thus include waveguides that are tiled in the lateral direction. Waveguides 270, 272 and 274, 276 may be respectively tiled as pairs in the lateral direction and the pairs may be tiled in the orthogonal direction in a similar manner to that shown in FIG. 31B. The light extraction features 12 may alternatively be curved. Advantageously a large display can be arranged with low seam visibility.

Figure 34:
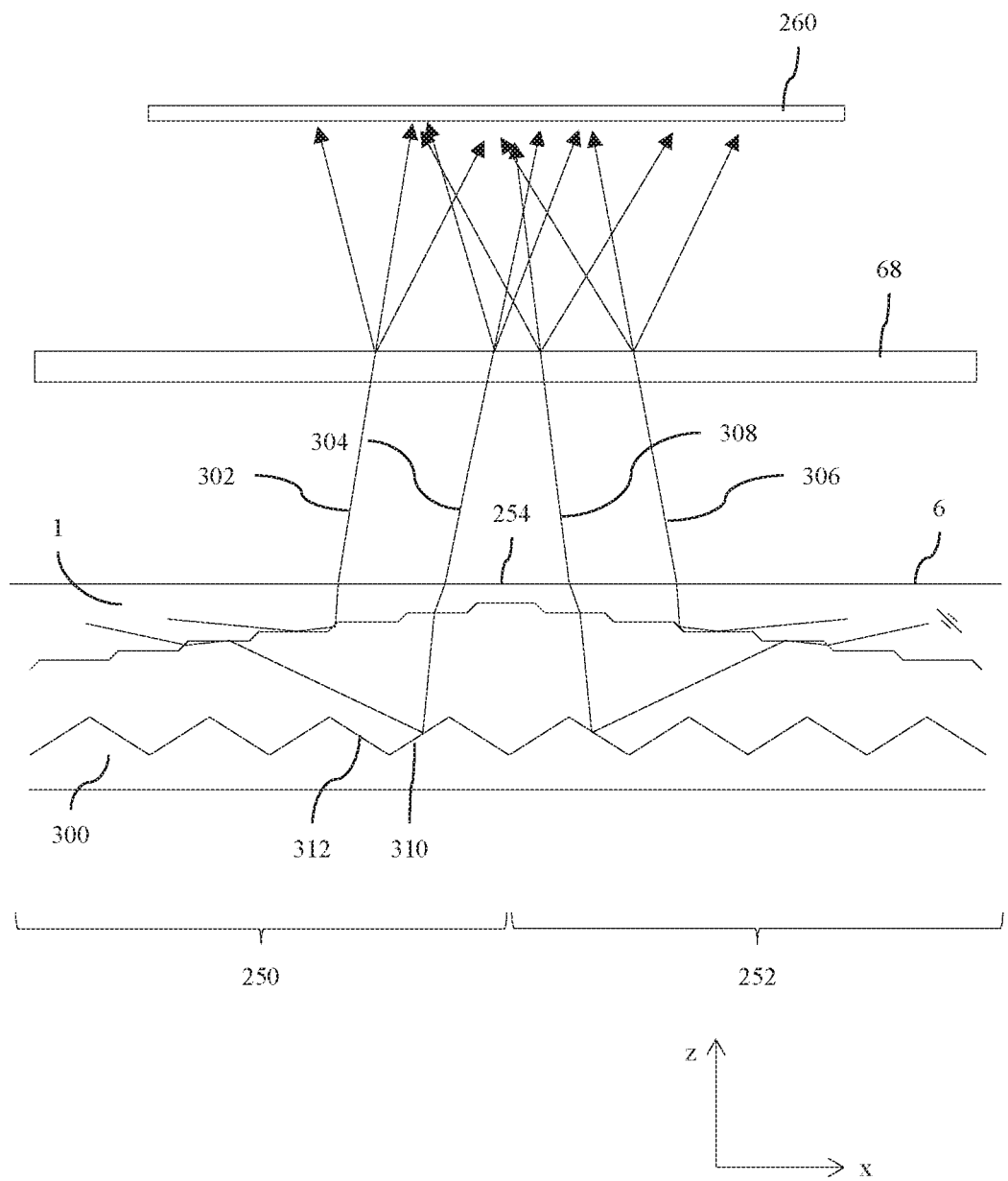
FIG. 34 is a schematic diagram illustrating a side view of part of a tiled directional light valve comprising a reflector element, in accordance with the present disclosure.

FIG. 34 is a schematic diagram illustrating a side view of part of a tiled directional light valve comprising a rear reflector as described in U.S. patent application Ser. Nos. 13/939,053 and 14/186,862, both of which are herein incorporated by reference in their entireties. The directional backlight may further comprise a respective rear reflector 300 arranged behind each of the parts 250, 252 of the second guide surface, each rear reflector 300 comprising an array of reflective facets 312, 310 arranged to reflect light rays 304, 308 from the at least one light source, that is transmitted through a plurality of facets 12 of the waveguide 1, back through the waveguide 1 to exit through the first guide surface 6 into said optical windows 260, the rear reflectors 300 extending continuously behind the abutting ends in the region 254. Rays 302, 306 that are reflected by total internal reflection at the light extraction features 12 and combine with rays 304, 308 respectively to produce viewing windows 260 in combination with diffuser 68 that may be an asymmetric diffuser. Advantageously the rear reflector 300 may achieve further reduction of seam visibility between parts 250, 252. Further the luminance of the display may be increased.

Figure 35:
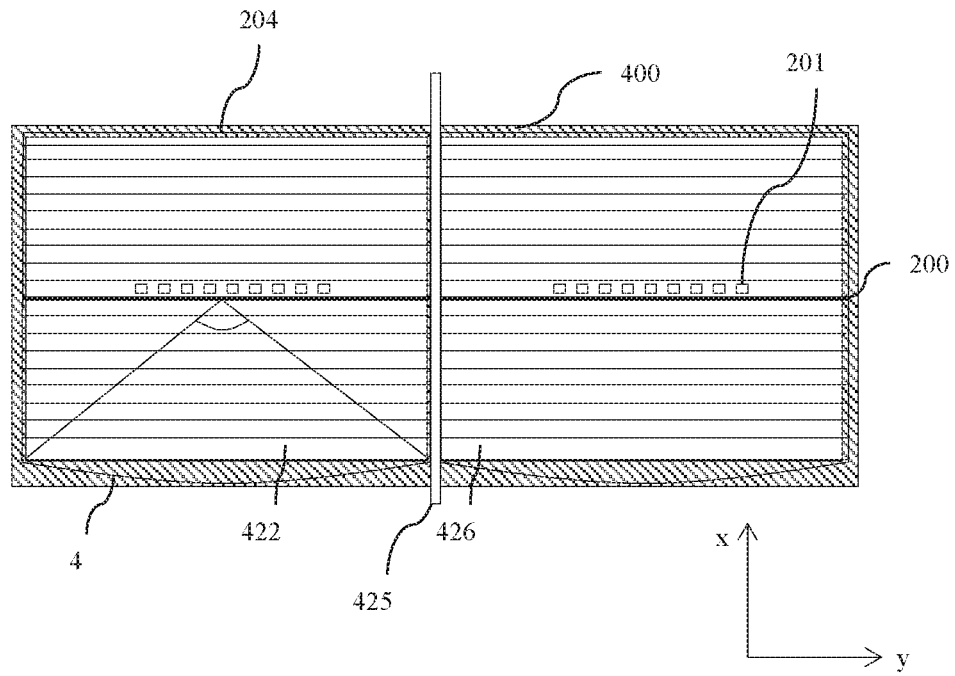
FIG. 35 is a schematic diagram illustrating a front view of a foldable directional display comprising mid-valve light input surfaces and arranged to achieve efficient illumination of the reflective end, in accordance with the present disclosure.

FIG. 35 is a schematic diagram illustrating a front view of a foldable directional display comprising mid-valve light input surfaces and arranged to achieve efficient illumination of the reflective end as described with reference to FIG. 14B. The waveguides 422, 426 that are tiled in the lateral direction are connected by a hinge 425 allowing folding of the waveguides 422, 426. In particular the aspect ratio of the individual waveguides 422, 426 may be approximately 8:9 so that when two waveguides are arranged next to each other the total aspect ratio is approximately 16:9.

Figure 36:
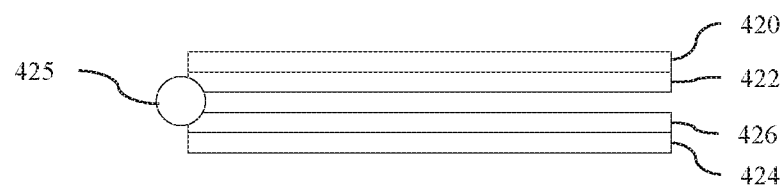
FIG. 36 is a schematic diagram illustrating a side view of a foldable display in a folded arrangement, in accordance with the present disclosure.

FIG. 36 is a schematic diagram illustrating a side view of a foldable display in a folded arrangement. Waveguides 422, 426 are arranged to illuminate spatial light modulator 420, 424 respectively and the assembly is provided with hinge 425. Advantageously a small display area can be provided when wide screen operation is not provided, for example in mobile display applications. The orientation of the hinge may be flipped so that the SLMs 420, 424 are protected in folded mode.

Figure 37:
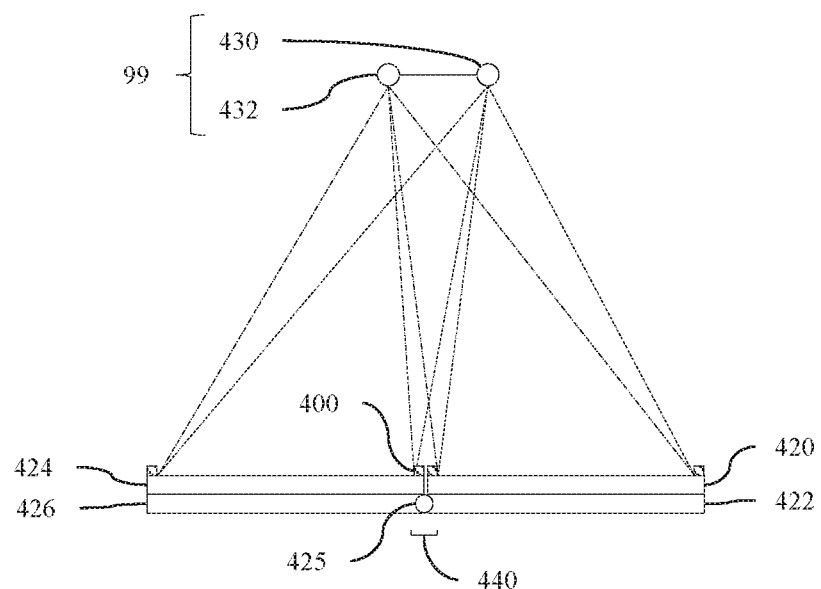
FIG. 37 is a schematic diagram illustrating a side view of a foldable display in an unfolded arrangement comprising a 2D image in the plane of the display, in accordance with the present disclosure.

FIG. 37 is a schematic diagram illustrating a side view of a foldable display in an unfolded arrangement comprising a 2D image in the plane of the display. Thus observer 99 with left and right eyes 430, 432 respectively can see the bezel 400 in the hinge region 440 and no image is visible for either eye in region 440.

Figure 38:
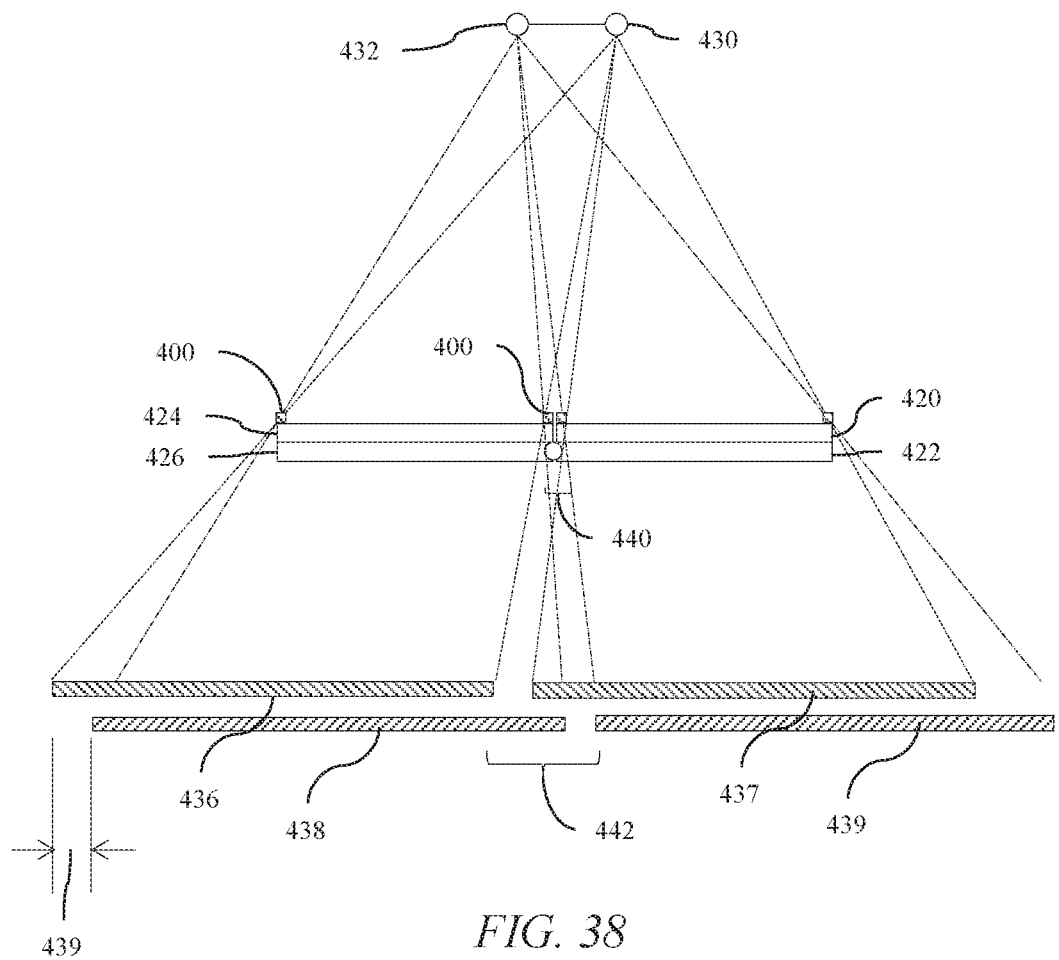
FIG. 38 is a schematic diagram illustrating a side view of viewing of a foldable display in an unfolded arrangement comprising an autostereoscopic image, in accordance with the present disclosure.

FIG. 38 is a schematic diagram illustrating a side view of viewing of a foldable display in an unfolded arrangement comprising an autostereoscopic image. The autostereoscopic image is arranged to provide substantially the same 2D image to each eye, with a lateral disparity 439 of all pixel points between left and right eye image data. Thus the left eye 430 sees the 2D image in positions 436, 437 and the right eye sees the 2D image in positions 438, 439 from spatial light modulators 424, 420 respectively. In this manner, region 442 behind the hinge is presented in a different position for each eye, and the observer may perceive continuous image data across the hinge region 440. Advantageously a foldable display with reduced hinge visibility is achieved.

Figure 39:
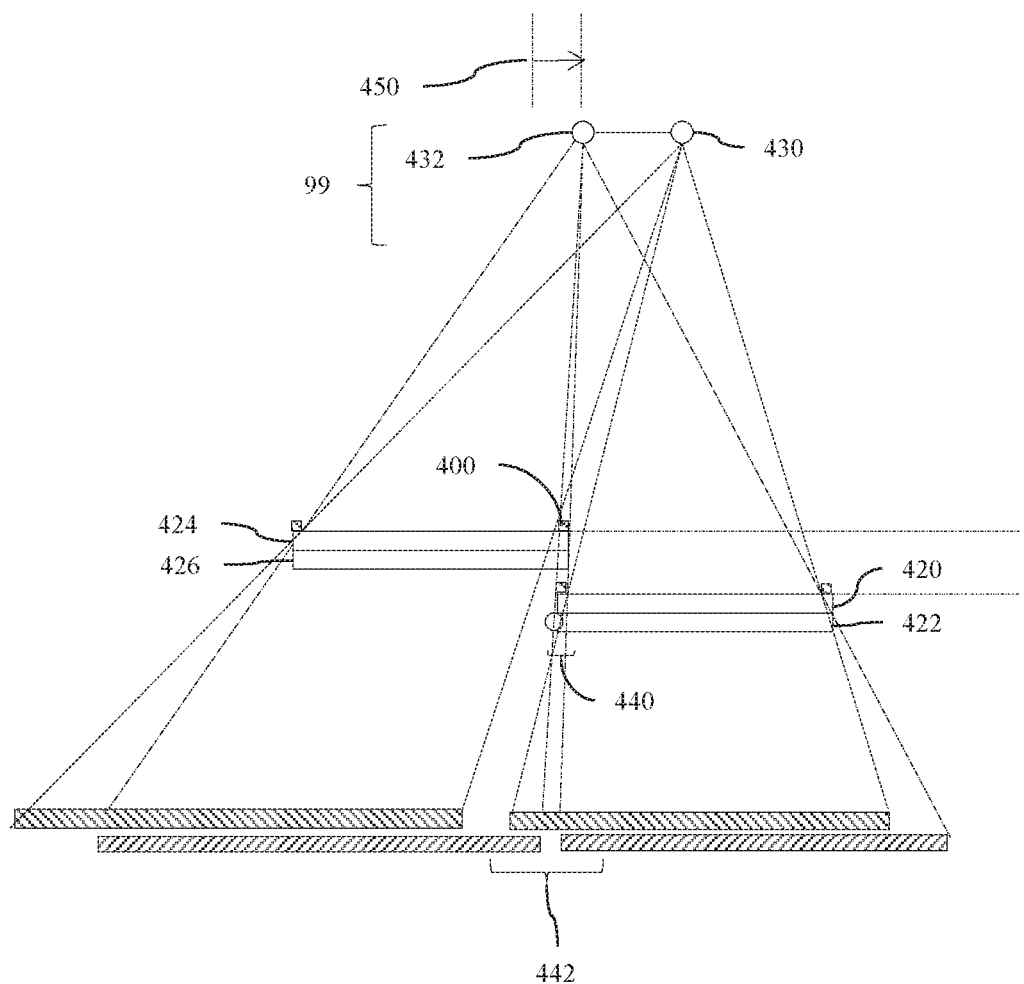
FIG. 39 is a schematic diagram illustrating a side view of viewing of a foldable display in an unfolded arrangement comprising an autostereoscopic image for an off-axis observer position, in accordance with the present disclosure.

FIG. 39 is a schematic diagram illustrating a side view of viewing of a foldable display in an unfolded arrangement comprising an autostereoscopic image for an off-axis observer position. The hinge of the unfolded display may be adjusted so that the SLMs 420, 424 are provided at different planes with respect to the observer 99. The disparity on the autostereoscopic displays 420, 422 and 424, 426 respectively may be adjusted so that the resulting autostereoscopic images are co-planar. Further the position 450 of the observer 99 may be tracked and the disparity data updated accordingly to achieve a look-around functionality for viewing the resultant 2D image.

Figure 40:
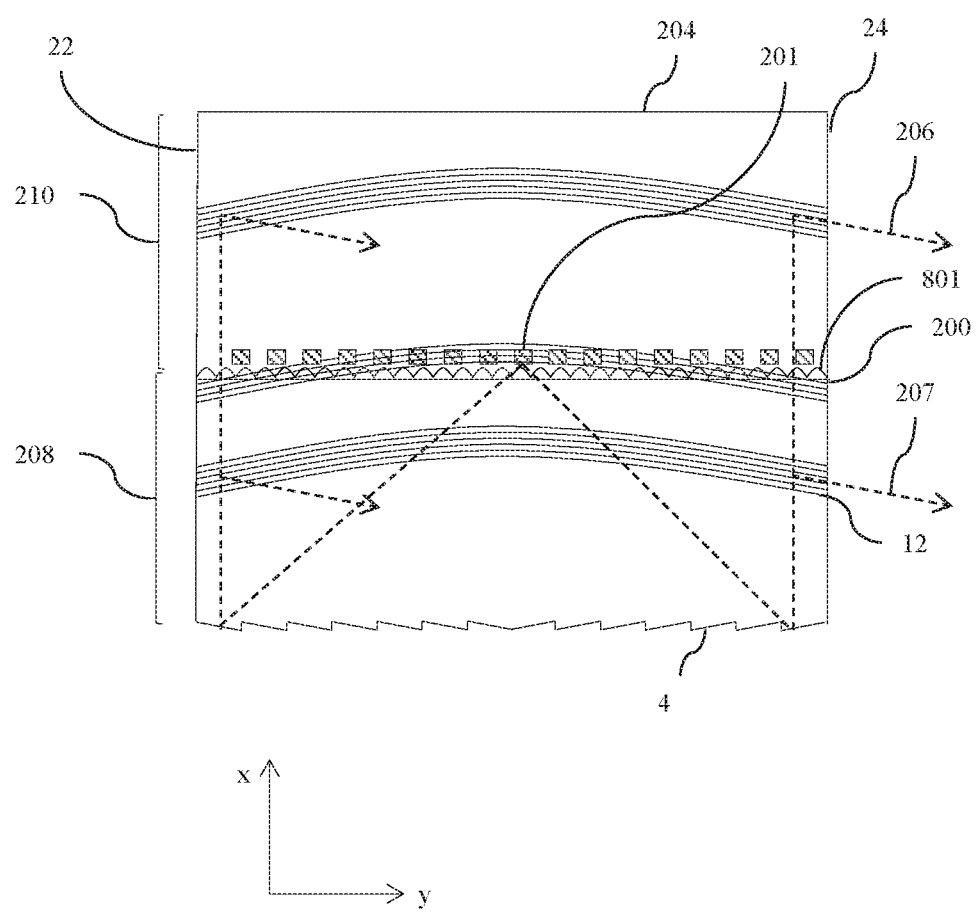
FIG. 40 is a schematic diagram illustrating in front view a directional backlights comprising a mid-valve light input structure, in accordance with the present disclosure.

FIG. 40 is a schematic diagram illustrating in front view a directional backlights comprising a mid-valve light input structure. Input facet 200 may comprise features 801 arranged to achieve increased uniformity of output illumination. Features 801 may comprise prisms, lenses, diffractive elements or other light distribution elements, particularly arranged to achieve modification of output directionality in the x-y plane, but also in the x-z plane. Further optical elements such as reflectors may be incorporated on sides 22, 24 to improve luminance uniformity. Advantageously display uniformity for mid-valve injection may be increased. Further side 4 may comprise a Fresnel mirror with advantageously reduced bezel width compared to the arrangement of FIG. 20 for example. Advantageously the present embodiments may achieve reduced bezel width in comparison to the arrangement of FIG. 11 for example.

Figure 41:
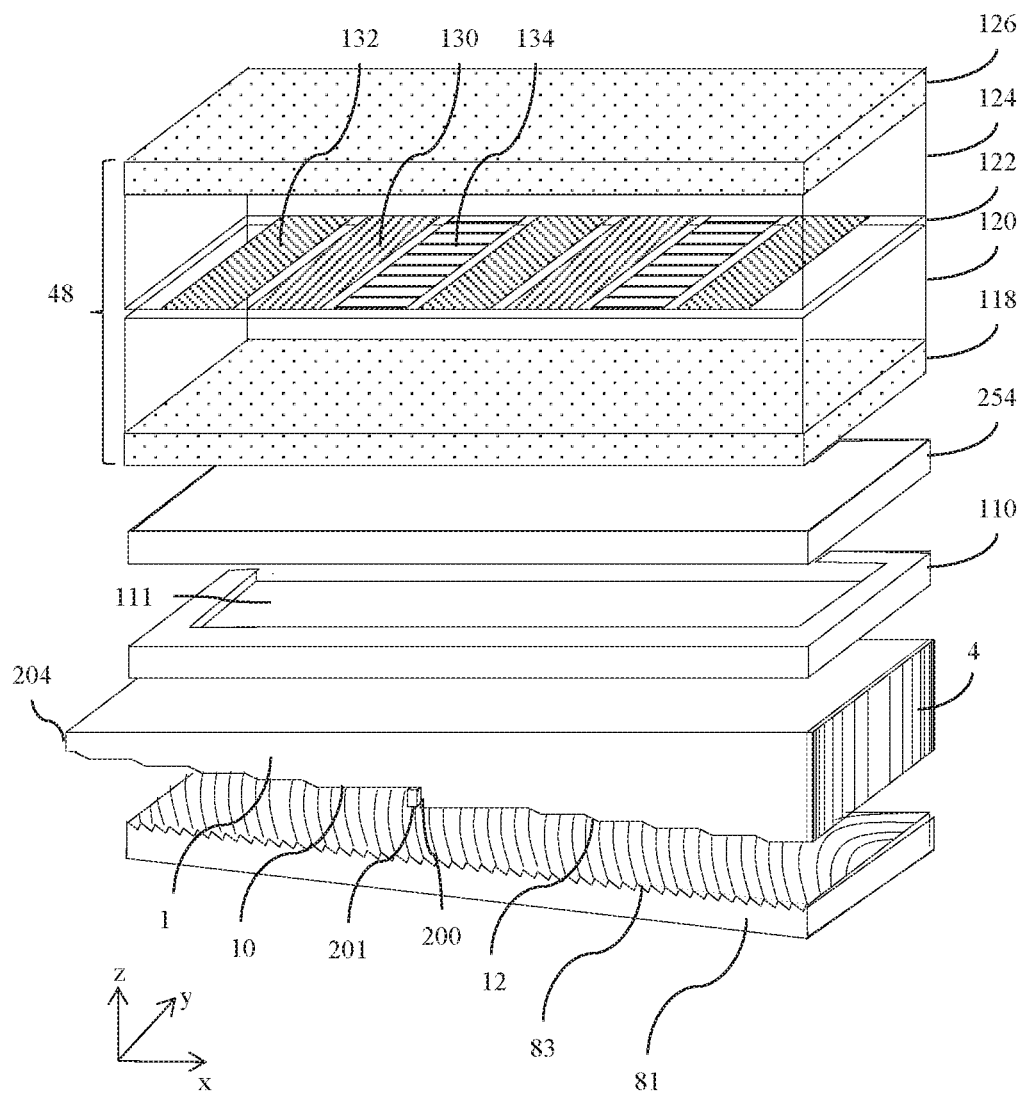
FIG. 41 is a schematic diagram illustrating in perspective view a directional display comprising a directional backlight comprising mid-valve light input structure, in accordance with the present disclosure.

FIG. 41 is a schematic diagram illustrating in perspective view a directional display comprising a directional backlight comprising mid-valve light input structure. Rear reflector 81 may comprise a microstructured surface 83 arranged to achieve increased reflectivity for light transmitted through features 12 of the light guide plate 1 and polarization recirculation for light reflected from optical stack 254 comprising a reflective polarizer. Stack 254 may further comprise diffuser and retarder layers. Shading layer 110 may be arranged to hide edge regions. Spatial light modulator 48 may comprise polarizer 118, substrate 120, liquid crystal layer 122 with pixel regions 130, 132, 134, substrate 124 and output polarizer 126

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

It should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A directional backlight comprising:
   a waveguide comprising first and second, opposed guide surfaces for guiding input light along the waveguide, wherein the second guide surface comprises at least two parts each extending partway along the waveguide, being separated perpendicular to a lateral direction by an input aperture; and
   an array of light sources arranged to generate input light and to inject the input light through the input aperture into the waveguide at respective input positions in the lateral direction across the waveguide, wherein
   the waveguide further comprises a reflective end arranged to reflect the input light back through the waveguide to each of the parts of the second guide surface,
   the first guide surface is arranged to guide light by total internal reflection,
   each of parts of the second guide surface comprises a plurality of light extraction features that extend linearly and parallel to each other and intermediate regions between the light extraction features that are arranged to direct light through the waveguide without extracting it, the light extraction features being oriented to deflect the input light after reflection from the reflective end in directions allowing exit through the first guide surface as output light through the first guide surface, and
   the reflective end has positive optical power in the lateral direction so that the waveguide directs the output light from the light sources into optical windows in output directions that are positioned in the lateral direction in dependence on the input position of the input light.

2. A directional backlight according to claim 1, wherein the array of light sources is disposed behind one of the parts of the second guide surface.

3. A directional backlight according to claim 2, further comprising a light shield arranged between the array of light sources and the one of the parts of the second guide surface behind which the array of light sources is disposed.

4. A directional backlight according to claim 1, further comprising a respective rear reflector arranged behind each of the parts of the second guide surface, each rear reflector comprising an array of reflective facets arranged to reflect light from the array of light sources, that is transmitted through the light extraction features of the waveguide, back through the waveguide to exit through the first guide surface into said optical windows.

5. A directional backlight according to claim 1, wherein the input aperture comprises an input facet extending between the two parts of the second guide surface, the array of light sources being arranged along the input facet.

6. A directional backlight according to claim 1, wherein the directional backlight further comprises an injection waveguide portion arranged between the array of light sources and the input aperture to guide input light from the array of light sources to the input aperture for injection of the input light through the input aperture.

7. A directional backlight according to claim 6, wherein the injection waveguide portion is a separate element from the waveguide.

8. A directional backlight according to claim 7, wherein the injection waveguide portion is index matched with the waveguide.

9. A directional backlight according to claim 6, wherein the injection waveguide portion is formed integrally with the waveguide.

10. A directional backlight according to claim 6, wherein the two parts of the second guide surface overlap in a direction along the waveguide.

11. A directional backlight according to claim 6, further comprising a light combiner arranged between the injection waveguide portion and the input aperture, and a further array of light sources arranged to generate input light at a predetermined input position in a lateral direction across the waveguide, the further array of light sources being arranged to inject the input light into the waveguide through the light combiner, the further array of light sources being closer to the reflective end than the first-mentioned array of light sources.

12. A directional backlight according to claim 1, wherein the directional backlight further comprises a further array of light sources arranged to generate input light at a predetermined input position in a lateral direction across the waveguide, the further array of light sources being arranged to inject the input light into the waveguide through the second guide surface partway along the waveguide at a position that is different from the first mentioned array of light sources.

13. A directional backlight according to claim 1, wherein the waveguide has a facing end facing the reflective end, and the directional backlight further comprises a further array of light sources that is arranged to inject further input light through the facing end into the waveguide.

14. A directional backlight according to claim 1, comprising plural sets of a waveguide and array of light sources each arranged in the same manner, the waveguides being tiled.

15. A directional backlight according to claim 14, wherein the waveguides include waveguides that are tiled in a direction perpendicular to the lateral direction with their ends opposite from the reflective end abutting.

16. A directional backlight according to claim 15, wherein the waveguides that are tiled are integrally formed.

17. A directional backlight according to claim 15, further comprising a respective rear reflector arranged behind each of the parts of the second guide surface, each rear reflector comprising an array of reflective facets arranged to reflect light from the array of light sources at least one light source, that is transmitted through the light extraction features of the waveguide, back through the waveguide to exit through the first guide surface into said optical windows, the rear reflectors extending continuously behind the abutting ends.

18. A directional backlight according to claim 14, wherein the waveguides include waveguides that are tiled in the lateral direction.

19. A directional backlight according to claim 18, wherein the waveguides that are tiled in the lateral direction are connected by a hinge allowing folding of the waveguides.

20. A directional backlight according to claim 1, wherein the second guide surface has a stepped shape comprising facets, that are said light extraction features, and the intermediate regions.

21. A directional backlight according to claim 1, wherein the array of light sources are arranged in a curve.

22. A display device comprising:
a directional backlight according to claim 1; and
a transmissive spatial light modulator arranged to receive the output light from the first guide surface and to modulate it to display an image.

23. A display apparatus comprising:
a display device according to claim 22; and
a control system arranged to selectively operate the light sources to direct light into varying optical windows corresponding to said output directions.

24. A display apparatus according to claim 23, being an autostereoscopic display apparatus wherein the control system is further arranged to control the display device to display temporally multiplexed left and right images and synchronously to direct the displayed images into optical windows in positions corresponding to left and right eyes of an observer.

25. A display apparatus according to claim 24, wherein
the control system further comprises a sensor system arranged to detect the position of an observer across the display device, and
the control system is arranged to selectively operate the light sources to direct the output light into at least one optical window selected in dependence on the detected position of the observer.

* * * * *